United States Patent
Bhattacharyya et al.

(10) Patent No.: US 12,523,567 B1
(45) Date of Patent: Jan. 13, 2026

(54) FIBER ROTATOR SYSTEM FOR SCALABLE AND AUTOMATED ALIGNMENT OF MULTIPLE POLARIZATION MAINTAINING FIBERS

(71) Applicant: Neptec OS, Inc., Fremont, CA (US)

(72) Inventors: Amartya Bhattacharyya, Milpitas, CA (US); Miao Qi, Milpitas, CA (US)

(73) Assignee: Neptec OS, Inc., Fremont, CA (US)

( * ) Notice: Subject to any disclaimer, the term of this patent is extended or adjusted under 35 U.S.C. 154(b) by 0 days.

(21) Appl. No.: 19/051,159

(22) Filed: Feb. 11, 2025

Related U.S. Application Data

(63) Continuation-in-part of application No. 18/737,846, filed on Jun. 7, 2024, now Pat. No. 12,223,673, which is a continuation of application No. 18/613,820, filed on Mar. 22, 2024.

(51) Int. Cl.
| | |
|---|---|
| *G02B 6/42* | (2006.01) |
| *G01M 11/00* | (2006.01) |
| *G01M 11/02* | (2006.01) |
| *G06T 7/73* | (2017.01) |

(52) U.S. Cl.
CPC .... *G01M 11/0257* (2013.01); *G01M 11/0221* (2013.01); *G01M 11/3181* (2013.01); *G06T 7/74* (2017.01); *G06T 7/75* (2017.01); *G02B 6/4227* (2013.01); *G06T 2207/20081* (2013.01); *G06T 2207/20084* (2013.01)

(58) Field of Classification Search
CPC .......... G02B 6/4227; G01M 11/0257
See application file for complete search history.

(56) References Cited

U.S. PATENT DOCUMENTS

| | | |
|---|---|---|
| 2003/0165283 A1 | 9/2003 | Huang |
| 2005/0254754 A1* | 11/2005 | Huang ............... G02B 6/2551 |
| | | 385/11 |
| 2012/0172700 A1 | 7/2012 | Krishnan |
| 2014/0363133 A1 | 12/2014 | Schwarzenbach |
| 2015/0131881 A1 | 5/2015 | Gnanamani |
| 2015/0238148 A1 | 8/2015 | Georgescu |
| 2021/0056293 A1 | 2/2021 | Yin |
| 2021/0150230 A1 | 5/2021 | Smolyanskiy |
| 2022/0301258 A1 | 9/2022 | Song |
| 2022/0350091 A1* | 11/2022 | Lawson ............... G02B 6/4221 |

* cited by examiner

*Primary Examiner* — Uyen Chau N Le
*Assistant Examiner* — Hoang Q Tran
(74) *Attorney, Agent, or Firm* — Adibi IP Group, PC; Amir V. Adibi; Andrew C. Palmer

(57) ABSTRACT

A fiber rotator system includes a clamp assembly and a fiber rotator assembly for aligning multiple optical fibers. The clamp assembly has a base with fiber channels, fiber clamps, and a guide assembly. The fiber rotator assembly includes a linear actuator and wheel clamps, each aligning with a fiber base channel. Each fiber clamp includes a jaw, connecting rod, spring, and handle, while each wheel clamp includes a linear actuator contactor, wheel jaw, fiber channel rod, and wheel guide. A fiber detection and alignment system analyzes fiber end faces and provides alignment data to a fiber rotator controller. In operation, each wheel clamp contacts and rotates with the linear actuator. The fiber rotator controller selectively engages and disengages the fiber clamps and wheel clamps to iteratively rotate and secure fibers until all fibers are aligned. The system scalably automates alignment of multiple polarization maintaining (PM) fibers with high precision.

19 Claims, 50 Drawing Sheets

X-RAY VIEW OF CLAMP ASSEMBLY    FRONT VIEW OF WHEEL CLAMP IN OPERATION

PANDA POLARIZATION-MAINTAINING OPTICAL FIBER

BOW-TIE POLARIZATION-MAINTAINING OPTICAL FIBER

FAST AXIS PM FIBER ALIGNMENT

SLOW AXIS PM FIBER ALIGNMENT

FIBER DETECTION AND ALIGNMENT SYSTEM

FIBER DETECTION NEURAL NETWORK SYSTEM

FIBER ALIGNMENT NEURAL NETWORK SYSTEM

TRAINING OF FIBER DETECTION NEURAL NETWORK

TRAINING OF FIBER ALIGNMENT NEURAL NETWORK

FIBER DETECTION

FIBER ALIGNMENT

AUTOMATIC FIBER ALIGNMENT

RAW DATA OBTAINED FROM IMAGING SYSTEM

SAMPLE RESULTS

SAMPLE RESULTS

ALIGNING MULTIPLE FIBERS USING FIBER ALIGNMENT SYSTEM (BEFORE ALIGNMENT)

MAPPING = [F, S, F, S, S, F, F, S, F, S, S, F]  ◄── 1601

**PACKAGED PM FIBER RIBBON
(PANDA TYPE)

MAPPING = [F, S, S, F, S, F, F, S, F, S, F, F]  ◄── 1701

**PACKAGED PM FIBER RIBBON
(BOW-TIE TYPE)

DETECTING AND ALIGNING ONE OR MORE FIBERS

FORMING PM FIBER RIBBON USING FIBER
DETECTION AND ALIGNMENT SYSTEM

FIBER ROTATOR SYSTEM

FORMING PM FIBER RIBBON USING FIBER
DETECTION AND ALIGNMENT SYSTEM

CLAMP ASSEMBLY

FRONT VIEW OF CLAMP ASSEMBLY

TOP VIEW OF CLAMP ASSEMBLY

SIDE VIEW OF CLAMP ASSEMBLY

ANOTHER PERSPECTIVE VIEW OF CLAMP ASSEMBLY

EXPLODED VIEW OF CLAMP ASSEMBLY

PERSPECTIVE VIEW OF CANTILEVERED
COMPONENT

TOP VIEW OF CANTILEVERED COMPONENT

FRONT VIEW OF CANTILEVERED COMPONENT

SIDE VIEW OF CANTILEVERED COMPONENT

ANOTHER SIDE VIEW OF CANTILEVERED
COMPONENT

PERSPECTIVE VIEW OF BASE

TOP VIEW OF BASE

FRONT VIEW OF BASE

SIDE VIEW OF BASE

FIBER CLAMP IN OPERATION

X-RAY VIEW OF FIBER CLAMP

X-RAY VIEW OF CLAMP ASSEMBLY

ANOTHER X-RAY VIEW OF CLAMP ASSEMBLY

ANOTHER X-RAY VIEW OF CLAMP ASSEMBLY

ANOTHER X-RAY VIEW OF CLAMP ASSEMBLY

PERSPECTIVE VIEW OF WHEEL CLAMP

ANOTHER PERSPECTIVE VIEW OF WHEEL CLAMP

FRONT VIEW OF WHEEL CLAMP IN OPERATION

SIDE VIEW OF WHEEL CLAMP

EXPLODED VIEW OF WHEEL CLAMP

FIBER ROTATOR CONTROLLER

TOP VIEW OF FIBER ROTATOR SYSTEM

BOTTOM VIEW OF FIBER ROTATOR SYSTEM

BOTTOM PERSPECTIVE VIEW OF FIBER ROTATOR SYSTEM

SIDE VIEW OF FIBER ROTATOR SYSTEM

FIBER ROTATOR SYSTEM FOR SCALABLE AND AUTOMATED ALIGNMENT OF MULTIPLE POLARIZATION MAINTAINING FIBERS

CROSS REFERENCE TO RELATED APPLICATIONS

This application is a continuation-in-part of, and claims the benefit under 35 U.S.C. § 120 from, nonprovisional U.S. patent application Ser. No. 18/737,846, entitled "Fiber Detection And Alignment System," filed on Jun. 7, 2024, now U.S. Pat. No. 12,223,673. U.S. patent application Ser. No. 18/737,846 is a continuation of, and claims the benefit under 35 U.S.C. § 120 from, nonprovisional U.S. patent application Ser. No. 18/613,820, entitled "Fiber Detection And Alignment System," filed on Mar. 22, 2024. The subject matter of each of the foregoing documents is expressly incorporated herein by reference.

TECHNICAL FIELD

The present invention relates generally to fiber optics, and more specifically, to fiber optic alignment.

BACKGROUND INFORMATION

Optical fibers are commonly used in communications applications. Optical fibers are desirable because they generally provide high bandwidth and low signal loss over long distances. In silicon photonics, silicon is used as an optical medium to transfer information. Silicon photonics is of particular interest in applications that require high speed and energy-efficient data transmission. Polarization-maintaining (PM) optical fibers are commonly used in silicon photonic applications. To achieve coupling efficiency between laser diodes in silicon photonics chips and PM optical fibers, and to preserve polarization states, PM optical fibers must be accurately aligned.

SUMMARY

A system includes an imaging system and a fiber detection and alignment system. The fiber detection and alignment system includes one or more neural networks trained to detect one or more end faces of polarization-maintaining (PM) fiber captured in an image and to predict a rotation angle and direction of rotation that will align each PM fiber to an associated reference key. For each fiber in the image, the system predicts the rotation angle and direction of rotation to align the slow or fast axis of the PM fiber to the associated reference key.

A PM fiber has stress rods that define a slow axis. A fast axis is perpendicular to the slow axis. In various applications, a single PM fiber is placed in a connector or multiple fibers form a multi-fiber array. Each fiber must be appropriately aligned. The system provides an efficient and scalable way to manufacture PM fiber arrays and fiber ribbons.

The end face of the PM fiber refers to the terminal surface of the fiber. Light enters or exits the fiber via the end face. The orientation of the end face is important because PM fibers are designed to preserve the polarization state of the light that propagates through the PM fibers. PM fibers are specially constructed of birefringent materials. Optical properties of PM fibers cause different polarization modes to propagate at different speeds through the PM fibers.

For optimal PM fiber performance, light must enter PM fiber in alignment with one of its principal polarization axes. The principal polarization axes are typically aligned along the slow and fast axes of the fiber.

Inspecting the end face of a PM fiber under a microscope can reveal the orientation of the fast and slow axes. Alignment of the fast and slow axes are often indicated by referring to a key or a flat side on a fiber connector. This visual indicator helps in aligning the fiber correctly with the light source or other optical components. Such alignment ensures that the desired polarization state is maintained throughout the optical system.

In operation, the imaging system of the fiber detection and alignment system generates an image of an end face of a fiber to be aligned. The image may include end faces of one or more fibers. For example, the imaging system includes a microscope having one or more magnification stages used to obtain the image of one or more end faces of fiber. The fiber detection and alignment system uses the image to generate fiber detection information and fiber alignment information. The fiber detection information identifies one or more end faces of fibers in the image. For example, the fiber detection information includes one or more bounding boxes overlaid above the end face of each fiber in the image. The fiber alignment information indicates how to rotate or adjust each fiber such that each fiber is aligned as desired in the specific application. For example, the fiber alignment information includes rotation angle and direction of rotation for each fiber that will align a fast or slow axis of each fiber to a reference key. The novel system provides a scalable technique to automatically align PM fiber.

In one embodiment, a system includes an imaging system, a fiber detection and alignment system, and a display. The fiber detection and alignment system includes one or more neural networks trained to detect an end face of a fiber in an image and to predict a rotation angle and direction of rotation that will align fiber to a desired axis. In operation, fiber detected in the image is identified on the display via a bounding box overlaid above detected fiber. The rotation angle and direction of rotation is overlaid above the image. A confidence score is optionally provided along with each prediction. The confidence score represents how likely the bounding box contains a fiber end face. In the case of images having multiple fibers, each end face in the image is identified by a bounding box and a predicted rotation angle and direction of rotation is provided.

In another embodiment, a system includes an imaging system, a fiber detection and alignment system, and a fiber rotator. The fiber detection and alignment system includes one or more neural networks trained to detect an end face of a fiber in an image and to predict a rotation angle and direction of rotation that will align a fast or slow axis of the fiber to a reference key. In operation, the fiber rotator rotates fiber using detected fiber coordinates and predicted rotation angle and direction of rotation information. For each detected fiber, a confidence score is generated indicating how likely a predicted bounding box contains a fiber end face. If any confidence score is below a configurable threshold TH1, then a flag is generated for further operator intervention or quality control process. In the case of images having multiple fibers, the fiber rotator rotates each fiber using the detected fiber coordinates and predicted rotation angle and direction of rotation information. The process is repeated until all fibers are aligned. If the alignment process repeats more times than a configurable threshold TH2, then a flag is generated for further operator intervention or quality control process.

In other embodiments, non-neural network-based techniques are used to identify fiber end faces and predict rotation angle and direction information from an image. In one embodiment, a support vector machine (SVM) algorithm is used to identify fiber end faces and predict rotation angle and direction information from an image. In one embodiment, a K-Nearest Neighbors (KNN) algorithm is used to identify fiber end faces and predict rotation angle and direction information from an image. In another embodiment, a vision based large multimodal model (LMM) is used to identify fiber in an image and generate alignment instructions. An image having one or more fiber end faces is supplied to the LMM along with a prompt. The LMM identifies fiber end faces in the image and predicts rotation angle and direction information for each detected fiber end face. One or more various other artificial intelligence methods are usable to identify fiber end faces and predict rotation angle and direction information from an image.

A fiber rotator system includes a clamp assembly and a fiber rotator assembly. The clamp assembly has a base, a plurality of fiber clamps, and a guide assembly. The base includes a plurality of fiber channels, each configured to receive an optical fiber. The guide assembly is disposed above the base and provides structural support and alignment for the fiber clamps. The fiber rotator assembly includes a linear actuator and a plurality of wheel clamps. The wheel clamps are disposed above the linear actuator and rotate in response to actuation of the linear actuator. The fiber rotator assembly also includes a plurality of fiber wheel channels, each aligning with a corresponding fiber base channel.

During operation, the clamp assembly and fiber rotator assembly work together to selectively rotate and secure optical fibers for precise alignment. The fiber rotator controller receives fiber alignment information from a fiber detection and alignment system, which analyzes fiber end faces to determine alignment status. When a fiber is misaligned, the fiber rotator controller maintains the fiber clamp in a disengaged state and engages the corresponding wheel clamp to rotate the fiber using the linear actuator. Once a fiber reaches proper alignment, the fiber rotator controller disengages the wheel clamp and engages the fiber clamp to secure the fiber in place. This process repeats iteratively until all fibers are aligned. In various embodiments, the fiber rotator controller uses any suitable hardware to engage and disengage the fiber clamps and wheel clamps.

The clamp assembly secures optical fibers in place once alignment is achieved. The fiber clamps each include a jaw, a connecting rod, a spring, and a handle. The clamp jaws engage fibers against the base when the handles are pressed. The guide assembly, which consists of interlocking cantilevered components, ensures structural stability and proper positioning of the fiber clamps. In some embodiments, the base is configured for attachment to an optical breadboard, providing a stable platform for fiber manipulation.

The fiber rotator assembly enables controlled rotation of fibers for alignment. Each wheel clamp includes a linear actuator contactor, a wheel jaw, a fiber channel rod, and a wheel guide. The wheel clamps engage fibers and rotate them as the linear actuator extends and retracts. The fiber rotator controller regulates the engagement and disengagement of the wheel clamps based on alignment data received from the fiber detection and alignment system. The fiber rotator assembly allows for precise, automated adjustment of multiple PM fibers simultaneously, improving efficiency and accuracy in fiber alignment processes.

The fiber rotator system is used to clamp and align multiple (two or more) PM fibers in a single assembly simultaneously. Each PM fiber can be rotated and aligned without removing the other PM fibers from the assembly. Once a PM fiber is aligned, it remains aligned while other PM fibers become aligned. This significantly reduces the amount of time and effort required to align each individual PM fiber. Prior to the novel fiber rotator system, aligning multiple (two or more) PM fibers simultaneously was a significant challenge in the field. Conventional methods of aligning PM fibers are not automated or easily scalable.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1A:
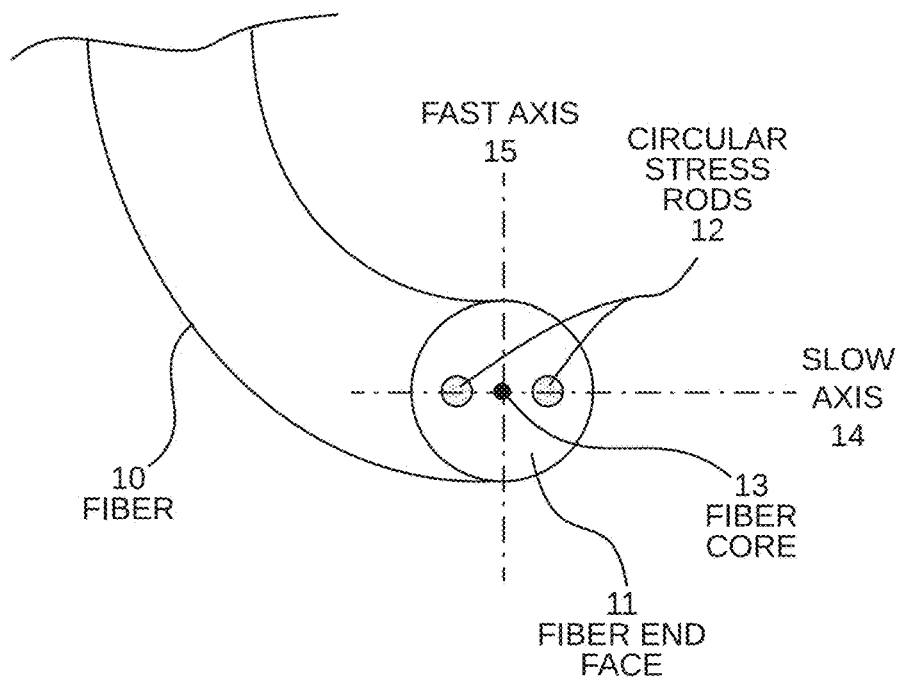
FIG. 1A is a diagram of PANDA type Polarization-maintaining (PM) fiber 10.

FIG. 1A is a diagram of PANDA type polarization-maintaining (PM) fiber 10. The PM fiber 10 includes an end face 11. The end face 11 refers to a terminal surface of the PM fiber 10 where light enters or exits the fiber 10. Stress rods 12 and a fiber core 13 are visible on the end face 11. The fiber core 13 need not be visible on the end face 11 for the novel systems and techniques disclosed herein to be utilized. A slow axis 14 is defined by a center line through the stress rods 12. A fast axis 15 is defined as being perpendicular to the slow axis 14.

Figure 1B:
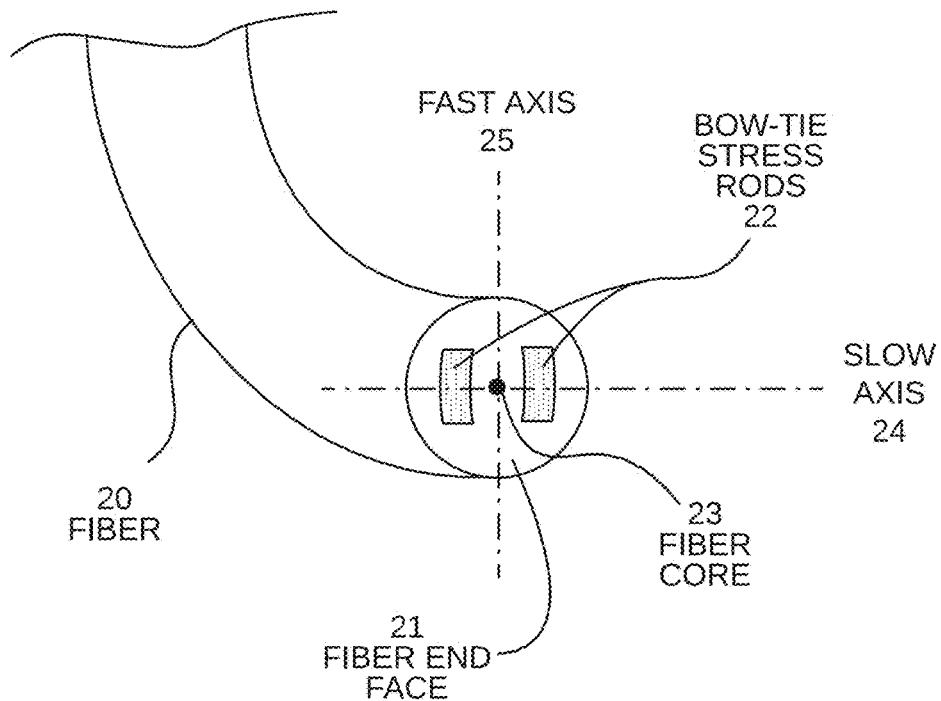
FIG. 1B is a diagram of Bow-Tie type Polarization-maintaining (PM) fiber 20.

FIG. 1B is a diagram of Bow-Tie type polarization-maintaining (PM) fiber 20. The fiber 20 includes an end face 21 and a fiber core 23. Stress rods 22 and the fiber core 23 are visible on the end face 21. The fiber core 23 need not be visible on the end face 21 for the novel systems and techniques disclosed herein to be utilized. The Bow-Tie type PM fiber 20 has trapezoidal shaped stress rods 21. A slow axis 24 is defined by a center line through the stress rods 22. A fast axis 25 is defined as being perpendicular to the slow axis 24. Although PANDA and Bow-Tie type PM fibers are common, it is appreciated that the novel systems and techniques disclosed herein may be used to align other types of PM fiber.

Figure 2A:
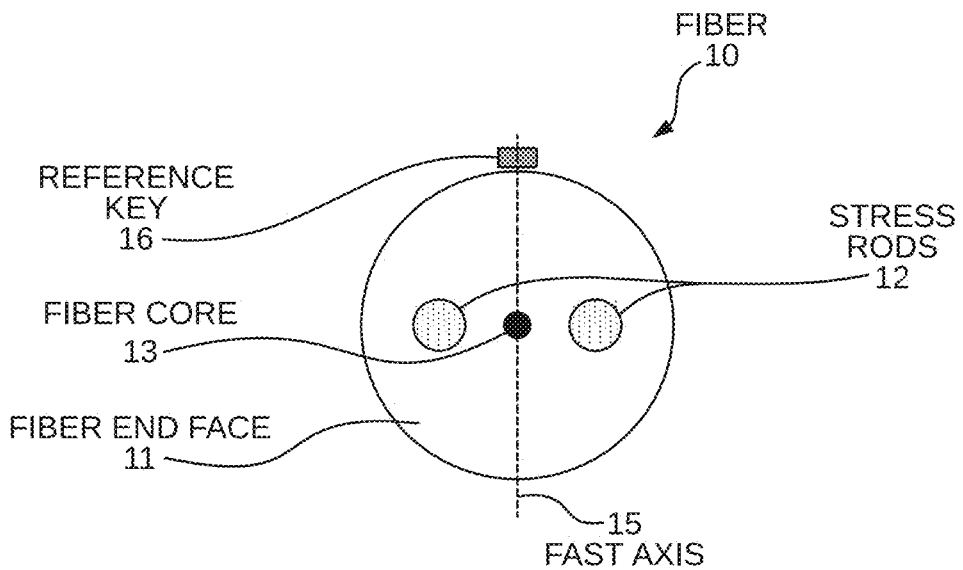
FIG. 2A is a diagram showing fast axis PM fiber alignment of the PM fiber 10.

FIG. 2A is a diagram that shows fast axis alignment of the PM fiber 10. A reference key 16 defines how the PM fiber 10 is oriented in relation to a desired axis. In this example of fast axis alignment, the reference key 16 is aligned with fast axis 15.

Figure 2B:
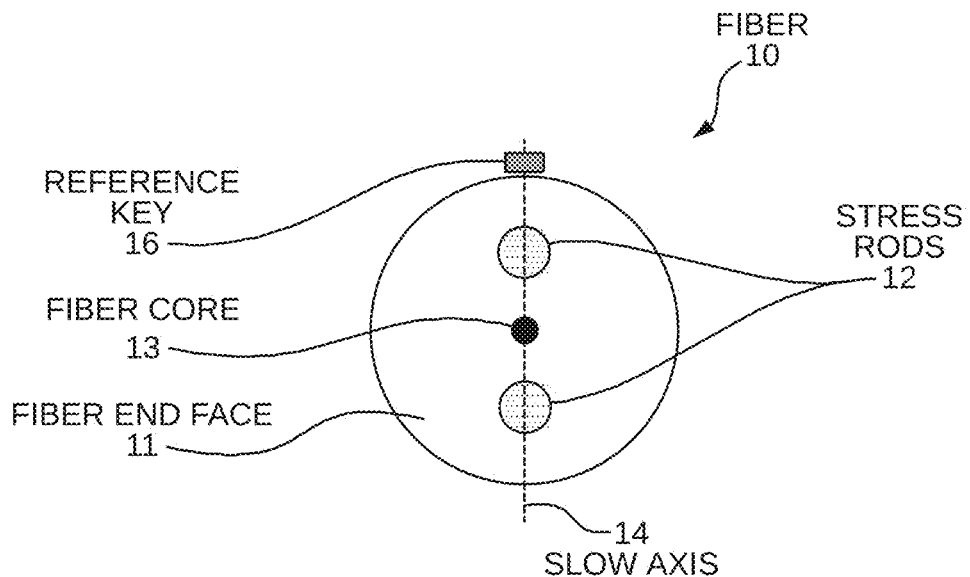
FIG. 2B is a diagram showing slow axis PM fiber alignment of the PM fiber 10.

FIG. 2B is a diagram that shows slow axis alignment of the PM fiber 10. A reference key 16 defines how the PM fiber 10 is oriented in relation to a desired axis. In this example of slow axis alignment, the reference key 16 is aligned with slow axis 14.

Figure 3:
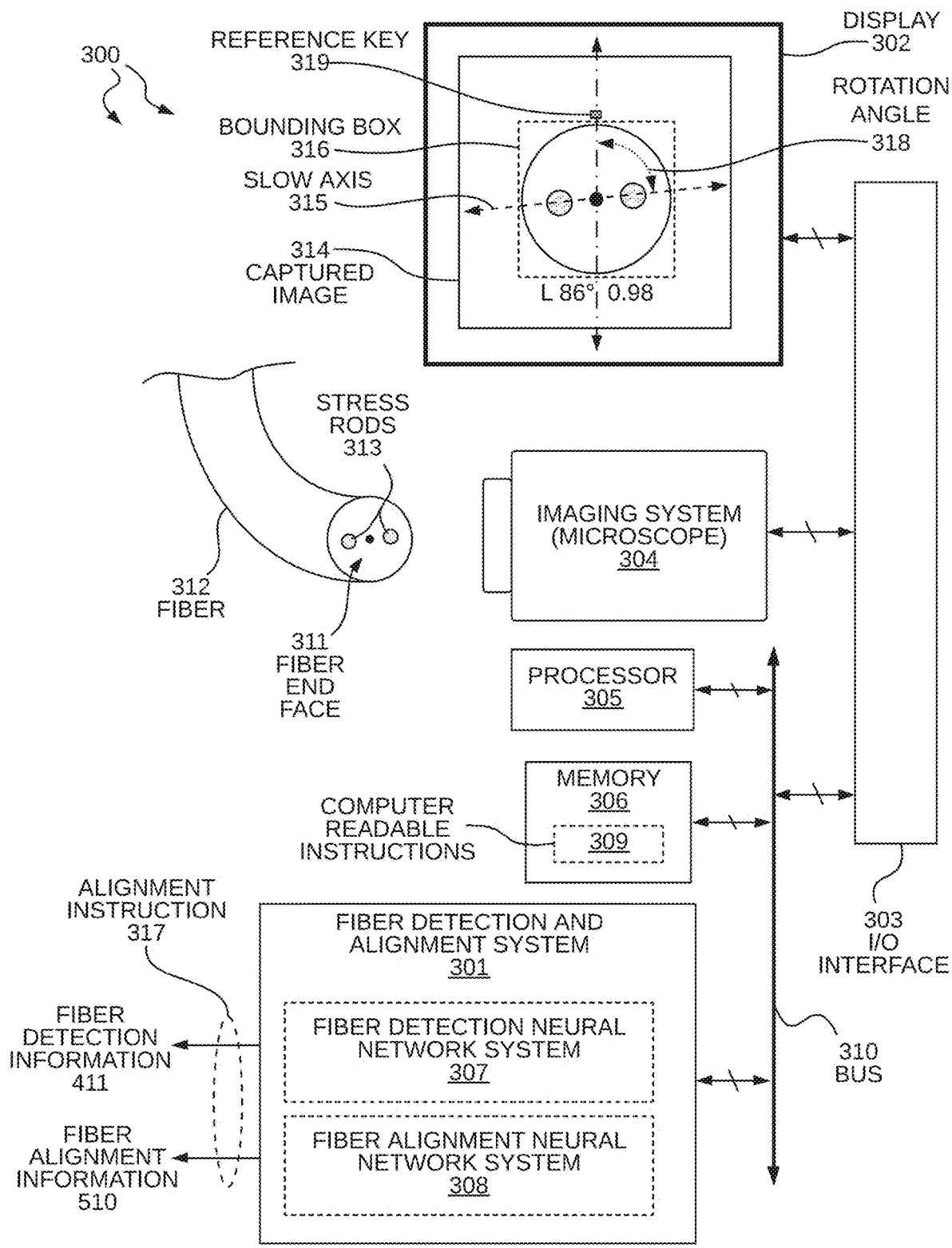
FIG. 3 is a diagram of a fiber detection and alignment system 300 in accordance with one embodiment.

FIG. 3 is a diagram of a system 300 having a fiber detection and alignment system 301 in accordance with one embodiment. The system 300 comprises display 302, interface 303, imaging system 304, processor 305, memory 306, and communication bus 310. The fiber detection and alignment system 301 comprises a fiber detection neural network system 307 and a fiber alignment neural network system 308.

The display 302 is any suitable hardware operable to present digital information to an operator, such as a display or virtual headset. The input/output interface 303 is any suitable hardware capable of interfacing with input or output devices, such as microscopes, cameras, touch displays, keyboards, networks, workstations, computers, laptops, and other devices. The imaging system 304 is any imaging hardware capable of obtaining images of fiber end faces. In one example, the imaging system 304 is a digital microscope that generates a magnified image of one or more fiber end faces. The processor 305 is any suitable processor capable of interpreting or executing instructions. Memory 306 is a computer-readable medium that includes any kind of computer memory such as floppy disks, conventional hard disks, CD-ROMS, Flash ROMS, non-volatile ROM, RAM, and non-volatile memory. Memory 306 stores an amount of computer readable instructions 309.

The fiber detection neural network system 307 and the fiber alignment neural network system 308 employ various artificial intelligence techniques to detect fiber and predict how to rotate fiber to be in desired alignment. It is appreciated that various machine learning techniques and/or deep learning models may be utilized to realize the fiber detection neural network system 307 and the fiber alignment neural network system 308. In one embodiment, the fiber detection neural network system 307 is realized using a "You only look once" (YOLO) state-of-the-art real-time object detection system and the fiber alignment neural network system 308 is realized using a residual convolution neural network (ResNet). In various embodiments, other artificial intelligence architectures are employed in identifying fiber end faces and predicting rotation angle information.

During operation of the system 300, the processor 305 interprets or executes computer readable instructions 309 stored in the memory 306 to control the imaging system microscope 304 to capture an image of an end face 311 of a fiber 312. The end face 311 includes stress rods 313. The captured image 314 is shown on the display 302.

Figure 14:
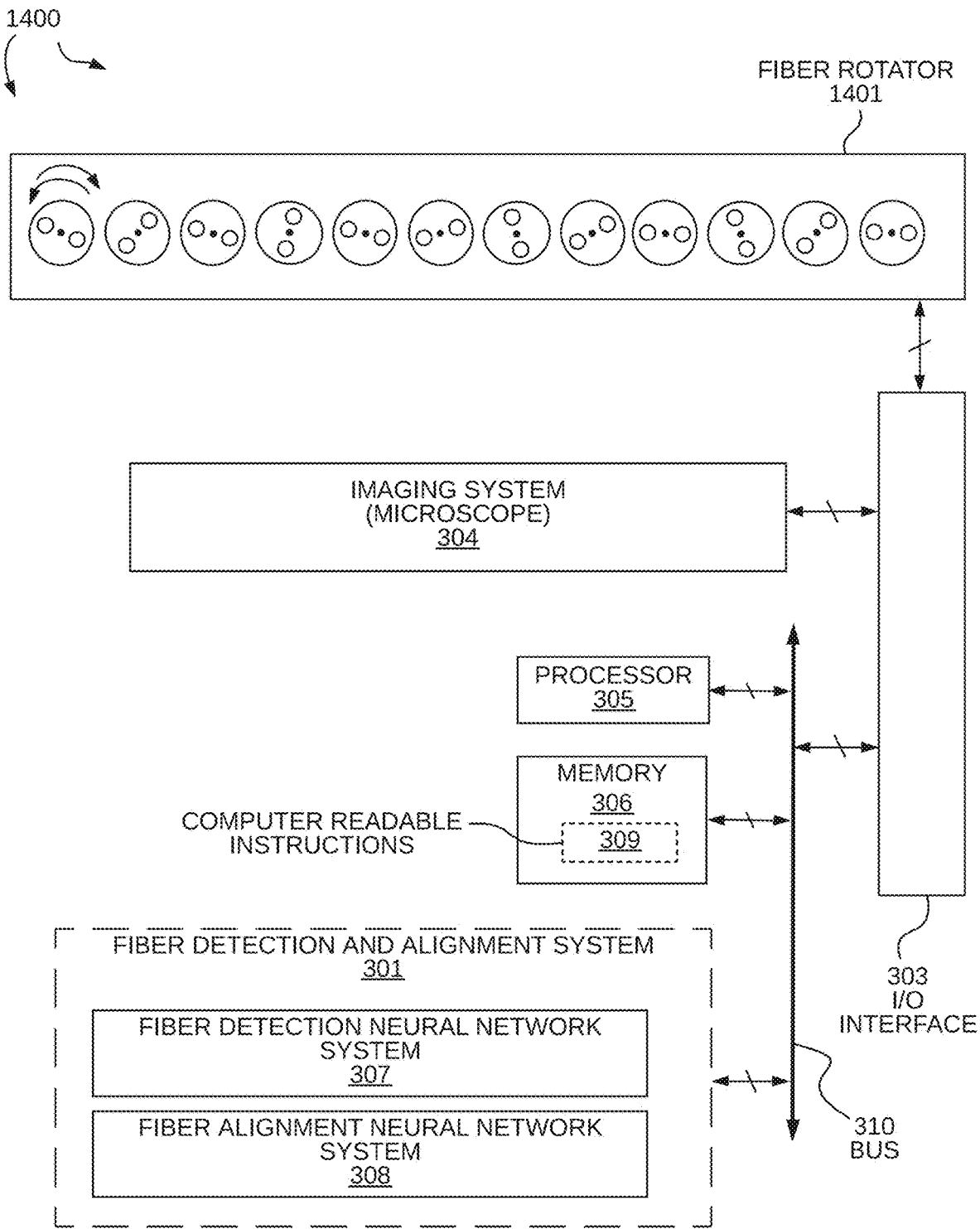
FIG. 14 is a diagram of a system 1400 having a fiber rotator 1401 operable to align a PM fiber array.
Figure 15:
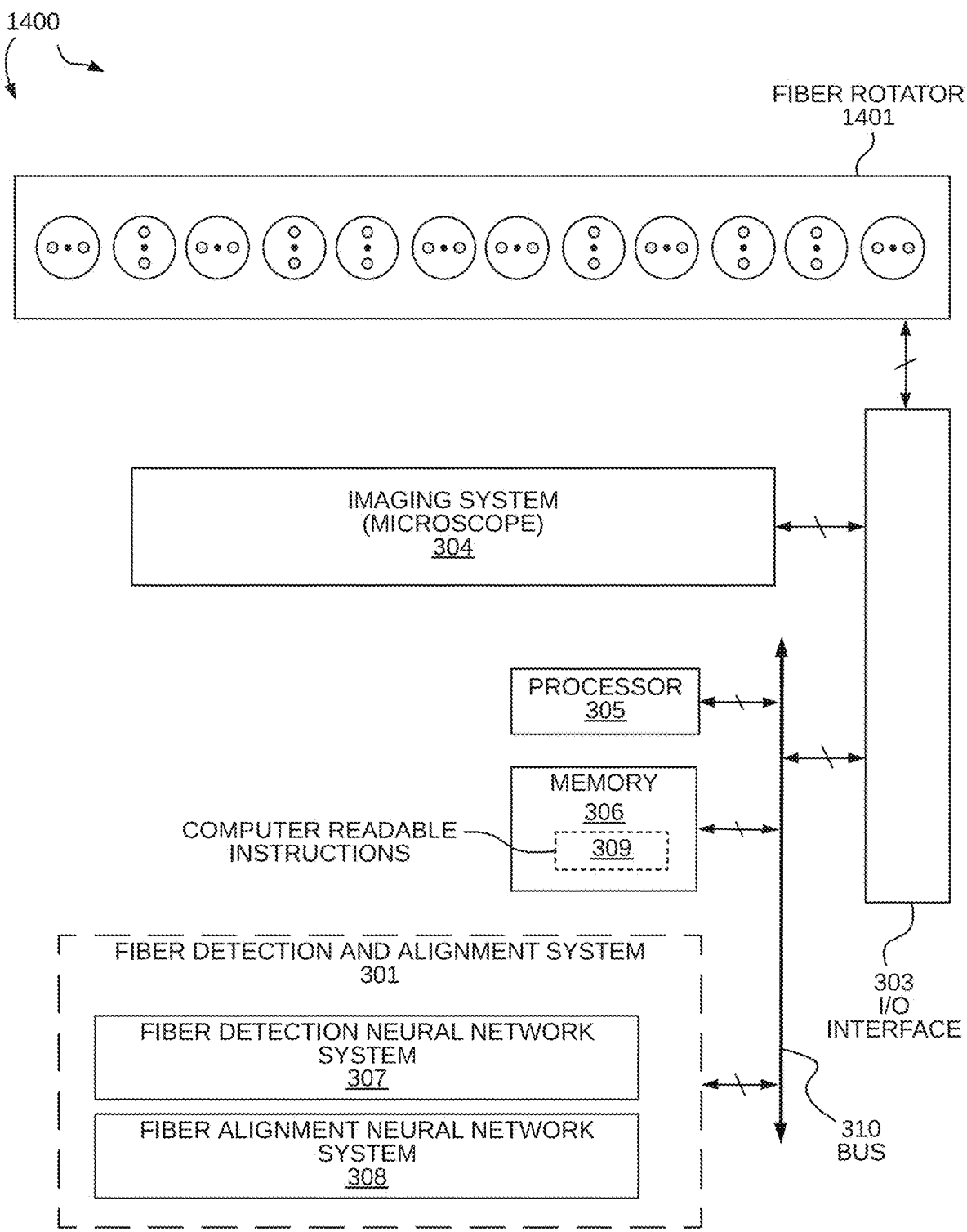
FIG. 15 is a diagram of the system 1400 after the fiber rotator 1401 aligns the PM fiber array.

The fiber detection neural network system 307 operates to detect the stress rods 313 within the captured image. In one embodiment, the fiber detection neural network system 307 defines a bounding box 316 around the captured fiber image. The fiber alignment neural network system 308 operates to determine a rotation angle 318 of a slow axis 315 in relation to a reference key 319. For example, as illustrated on the display 302, the detected rotation angle 318 is eighty-six degrees (86°) left (L) or counterclockwise for slow-axis alignment. The confidence score is shown as 0.98 indicating high confidence that the bounding box contains a fiber end face. Once the fiber detection neural network 307 detects the fiber and the fiber alignment neural network 308 predicts the alignment information, an alignment instruction 317 is generated that includes fiber detection information 411 and fiber alignment information 510. In this embodiment, the bounding box 316, the slow axis 315, and rotation angle 318 are shown on display 302 overlaid above the image 314 of the end face of the fiber 312. In other embodiments, bounding box 316, slow axis 315, and rotation angle 318 are not shown on display 302 and are instead routed to a mechanical rotator that automatically aligns fiber as shown in FIG. 14 and FIG. 15.

Figure 4:
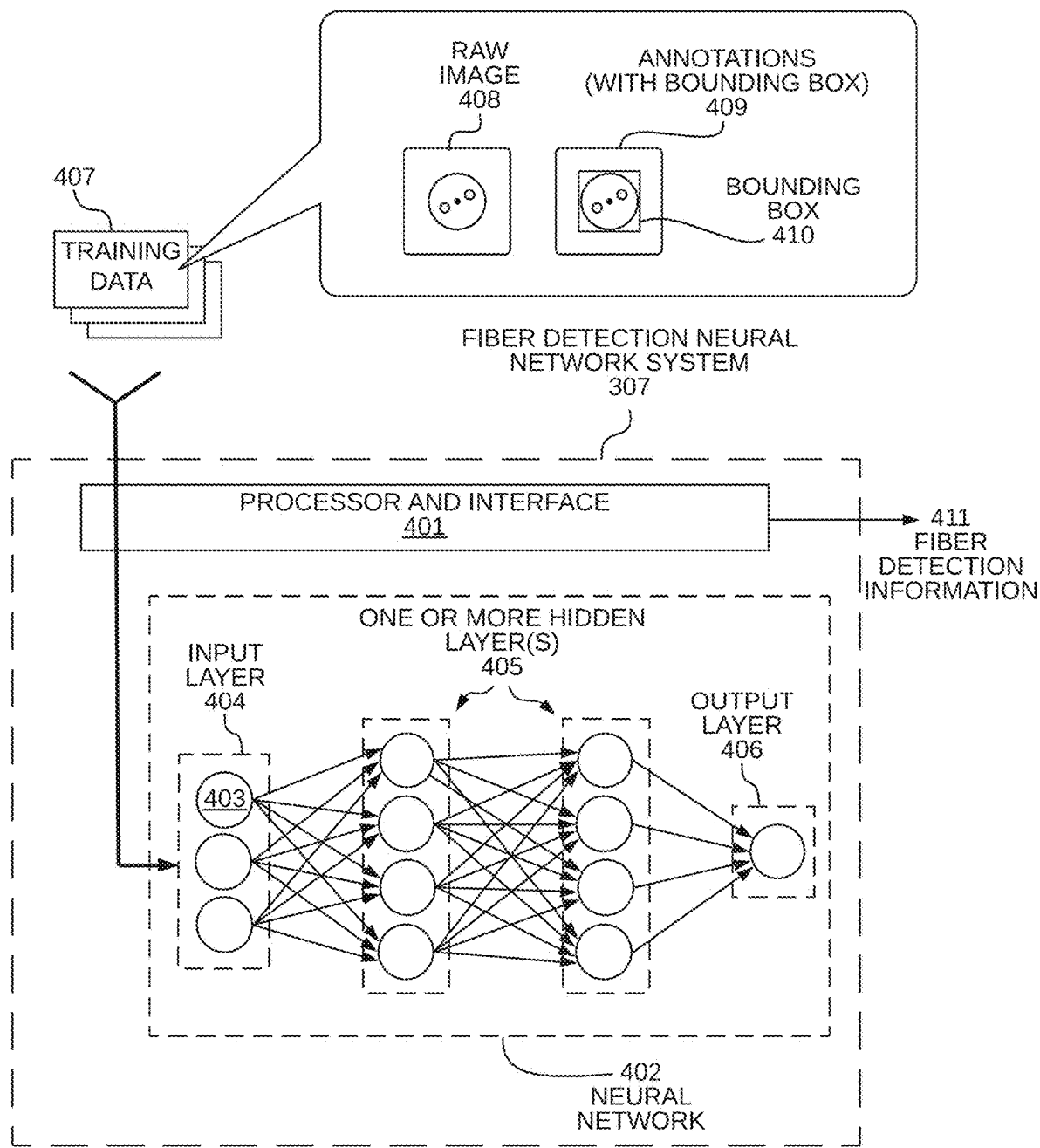
FIG. 4 is a detailed diagram of a fiber detection neural network system.

FIG. 4 is a detailed diagram of the fiber detection neural network system 307. The system 307 comprises a processor and interface 401 and neural network 402 having layers of nodes. Reference numeral 403 identifies a node of the neural network 402. The neural network 402 comprises an input layer 404, one or more hidden layers 405 and an output layer 406. Training data 407, comprising raw image data 408 and annotations 409 having a bounding box 410, is sent to the input layer 404 to train the neural network 402. For each fiber end face in the image, there is a corresponding bounding box in the annotation file. In one embodiment, the bounding box is stored in the format, "<object-class><x-center><y-center><width><height>", however bounding boxes may be stored in other formats. The processor and interface 401 output the determined fiber detection information 411 from the input data.

Figure 5:
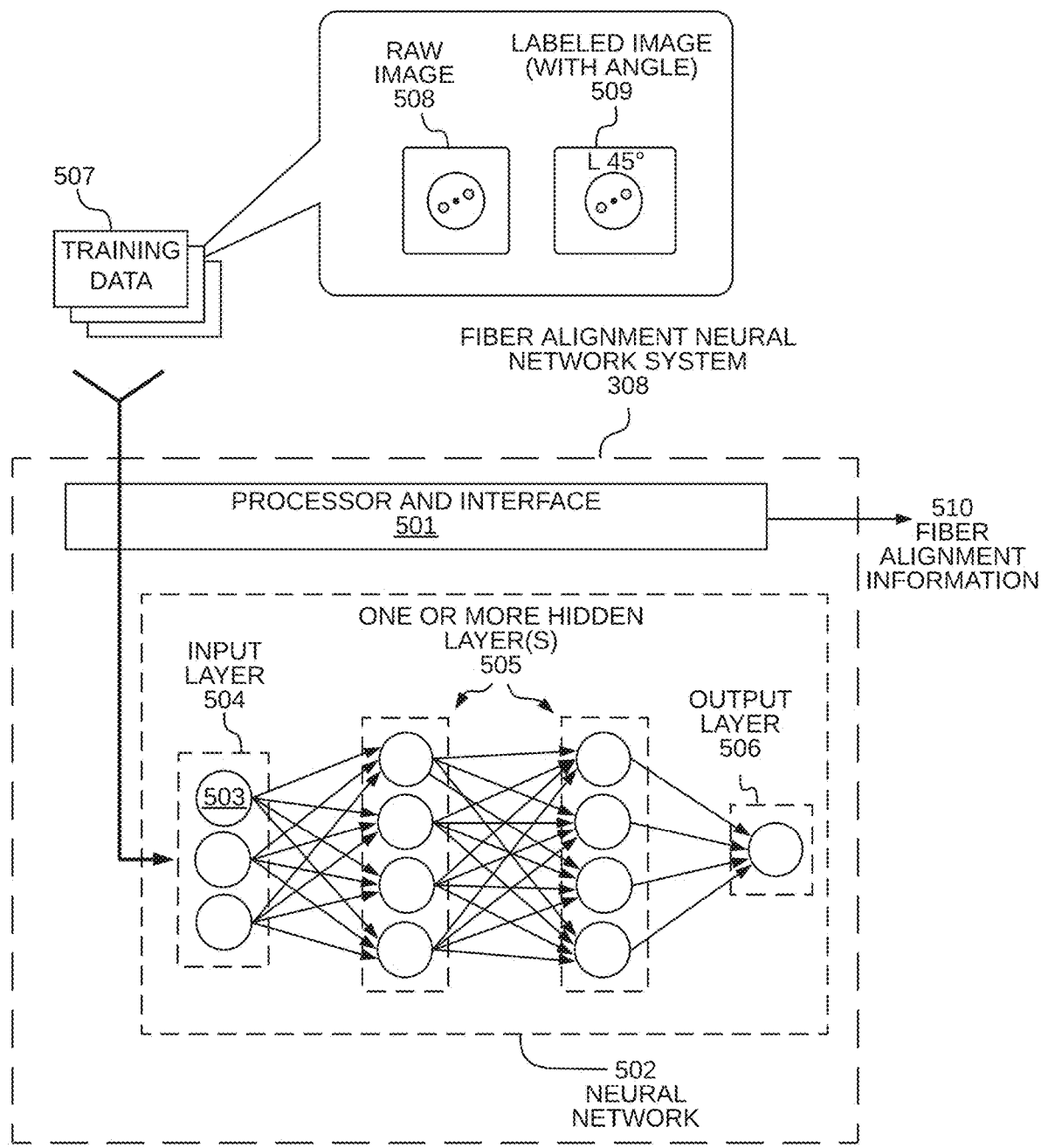
FIG. 5 is a detailed diagram of a fiber alignment neural network system.

FIG. 5 is a detailed diagram of the fiber alignment neural network system 308. The system 308 comprises a processor and interface 501 and neural network 502 having layers of nodes. Reference numeral 503 identifies a node of the neural network 502. The neural network 502 comprises an input layer 504, one or more hidden layers 505 and an output layer 506. Training data 507, comprising raw image data 508 and labeled image data (with rotation angle) 509 is sent to the input layer 504 to train the neural network 502. The processor and interface 501 output the determined fiber alignment information 510 from the input data.

Figure 6:
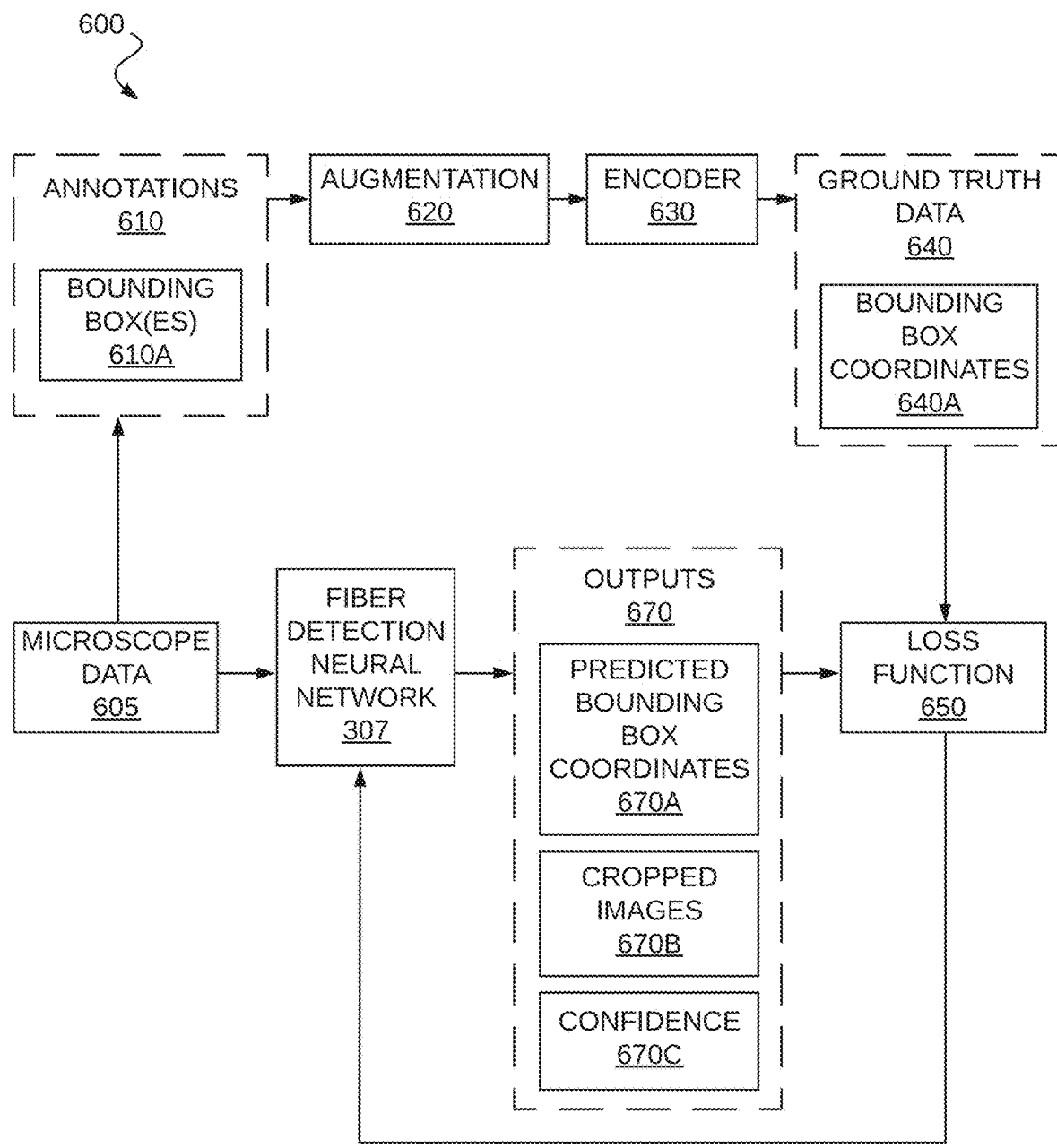
FIG. 6 is a block diagram showing how the fiber detection neural network system is trained in accordance with one training technique.

FIG. 6 is a block diagram showing how the fiber detection neural network system 307 is trained in accordance with one training technique. The training data includes captured microscope data 605. The microscope data 605 includes fiber end face data collected through any suitable data collection strategy. For each captured data 605, a corresponding annotation 610 is created. Annotation 610 is also referred to as a "label" or "labeled data" in the art. Annotation 610 includes bounding box(es) 610A for fiber end faces in the captured image. The annotation 610 is generated through online labeling tools or any other suitable annotation software.

To reduce the risk of model overfitting and increase model stability, data sets are artificially expanded with augmentation. Data augmentation 620 is done through online image augmentation applications, software programs, or built-in functions of computer vision models. Example augmentation techniques include rotation, flipping, distortion, brightness adjustment, contrast adjustment, and noise addition. An encoder 630 encodes annotations 610 as ground truth data 640 for fiber detection neural network 307. In this embodiment, bounding box(es) 610A are encoded as bounding box coordinates 640A for training. The feedback of loss function 650, a function that computes errors between predicted bounding box coordinates 670A and ground truth bounding box coordinates 640A, is used to update parameters of fiber detection neural network 307. The outputs 670 of fiber detection neural network 307 include predicted bounding box coordinates 670A of each detected fiber, cropped images 670B based on coordinates 670A, and a confidence score 670C. The confidence score 670C indicates how likely the predicted bounding box contains a fiber end face.

A threshold for the confidence score is adjustable based on different environments. For example, if the fibers are polished to have clearly visible stress rods and clean, a higher threshold could be set to avoid incorrect identification of fibers. In the case of automated fiber rotation, as in FIG. 14 and FIG. 15, thresholds are increased further to trigger operator intervention thereby ensuring quality control.

Figure 7:
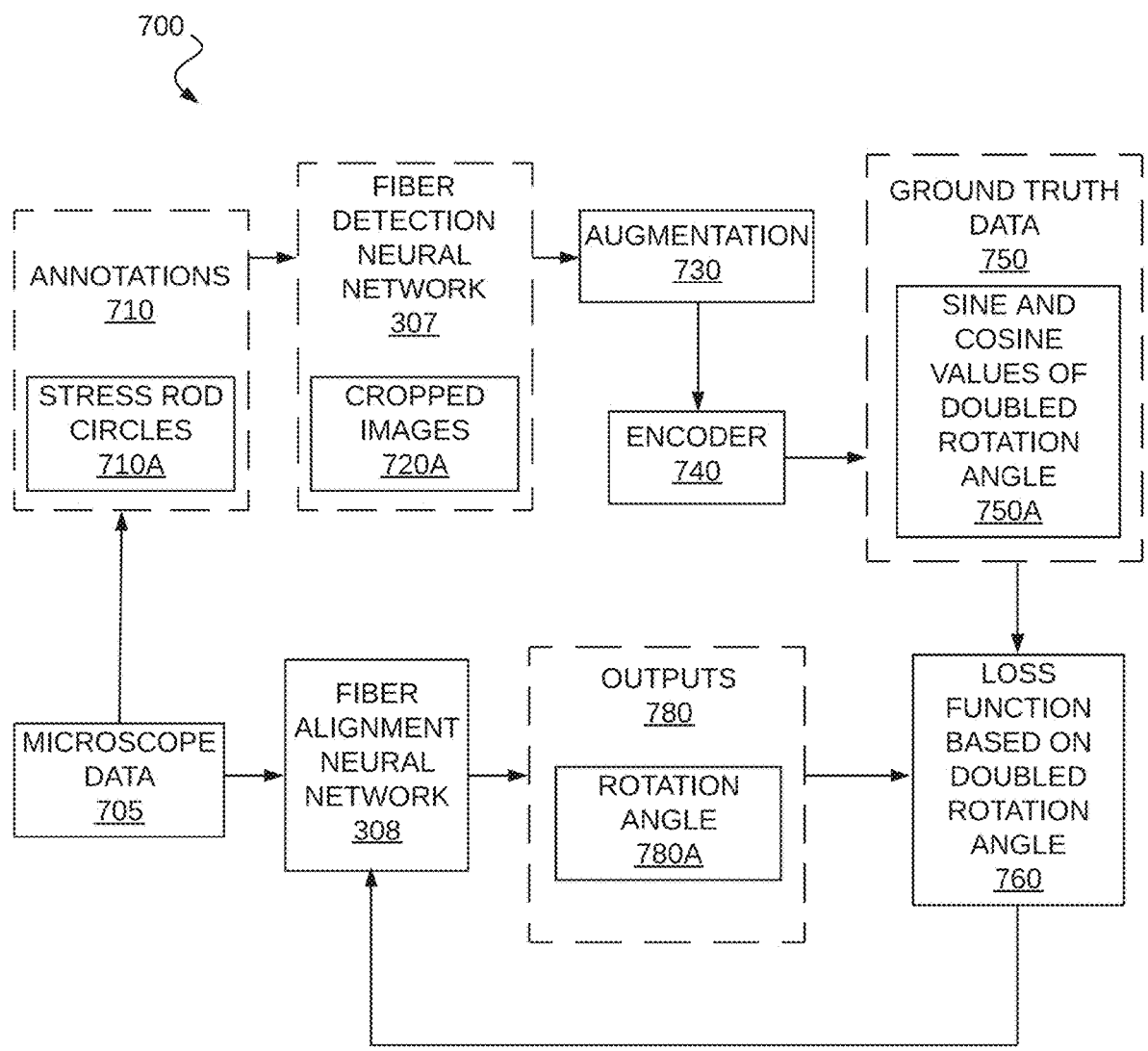
FIG. 7 is a block diagram showing how the fiber alignment neural network system is trained in accordance with one training technique.

FIG. 7 schematically illustrates method 700 for training the fiber alignment neural network 308 of the fiber detection and alignment system 301 of FIG. 3 according to embodiments of the present invention. The training data includes cropped image 720A, which are outputs from fiber detection neural network 307 using the captured microscope data 705, and augmented data through augmentation 730. For each captured data 705, a corresponding annotation 710 is created. The annotation 710 includes stress rod circles 710A, which further includes the center coordinate and radius of stress rods of captured stress rod circles. The annotation 710 are generated through online labeling tools or any other suitable annotation software suitable to define the centers of two stress rods, which are important for polarization-maintaining fiber alignments. For polarization-maintaining fiber alignments, the maximum rotation angle 318, which is the acute angle between a reference, index, or positioning key and the slow axis, is 90°. Thus, the label of each image becomes a real number belonging to the set (−90°, 90°].

To reduce the risk of model overfitting and increase model stability, the data sets are artificially expanded with augmentation. Data augmentation 730 is done through online image augmentation applications, software programs, or built-in functions of computer vision models. The use of augmentation techniques is limited in this embodiment to avoid image distortion. Techniques that may cause severe distortions or excessive augmentation are generally avoided due to undesirably impacting identification of stress rods. For example, severe image augmentation could result in too much brightness being added to the image thereby rendering both stress rods invisible. Additionally, for each of the original images captured from the microscope, the image is rotated multiple times from 0.1° to 359.9° to ensure a balance of labels in the training dataset.

An encoder 740 encodes annotations 710 as ground truth data 750 for neural network 308. In this example, stress rod circles 710A are transformed to a rotation angle between the line through the stress rod centers and the vertical axis of the coordinates and are encoded as the sine value $y_1$ and cosine value $y_2$ of doubled rotation angle θ for training.

$$\theta'=2\times\theta$$

$$y_1=\sin(\theta')$$

$$y_2=\cos(\theta')$$

In this example, sine and cosine values of the doubled rotation angle are used to update parameters of fiber alignment neural network 308. The sine and cosine values are used instead of the targeted rotation angle to obtain feedback from the loss function 760 that computes errors between predicted and ground truth sine and cosine values 750A. The outputs 780 of fiber alignment neural network 308 include predicted rotation angle $\theta_{pred}$ 780A that is transformed from predicted sine value $y_{1\_pred}$ and cosine value $y_{2\_pred}$ of doubled predicted rotation angle $\theta_{pred}$.

$$\theta'_{pred}=a\tan 2(y_{1\_pred}, y_{2\_pred})$$

$$\theta_{pred}=\frac{\theta'_{pred}}{2}$$

In this example, sine and cosine values of the doubled rotation angle are used instead of the rotation angle itself because fibers with misaligned angles of −90° and 90° have the same appearance. This avoids the discontinuity in predictions on images having the same appearance.

The deep neural networks of the fiber detection neural network 307 and fiber alignment neural network 308 are fine-tuned separately using additional images that contain situations not mentioned herein thus allowing adaptation to other user-specific cases.

Figure 8:
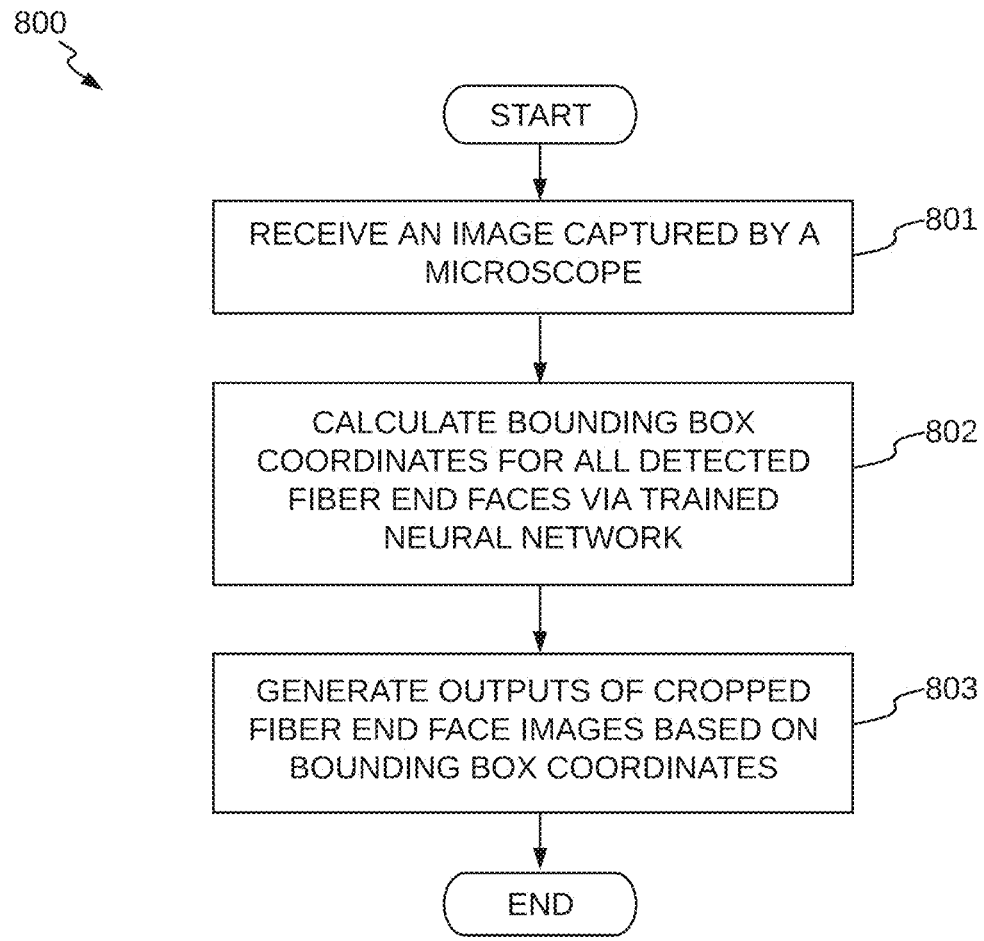
FIG. 8 is a flowchart of a method 800 for showing how the fiber detection neural network system generates fiber detection information in one embodiment.

FIG. 8 is a flowchart of a method 800 for how the fiber detection neural network system 307 generates fiber detection information in one embodiment. For example, the method 800 operates to generate cropped fiber end face images according to some embodiments. At step 801, an image input is received by fiber detection neural network 307. At step 802, the trained deep fiber detection neural network 307 calculates bounding box coordinates for each detected fiber end face in the input image and provides a confidence score. At step 803, a set of cropped images that include a single fiber end face is generated based on the estimated bounding box coordinates.

Figure 9:
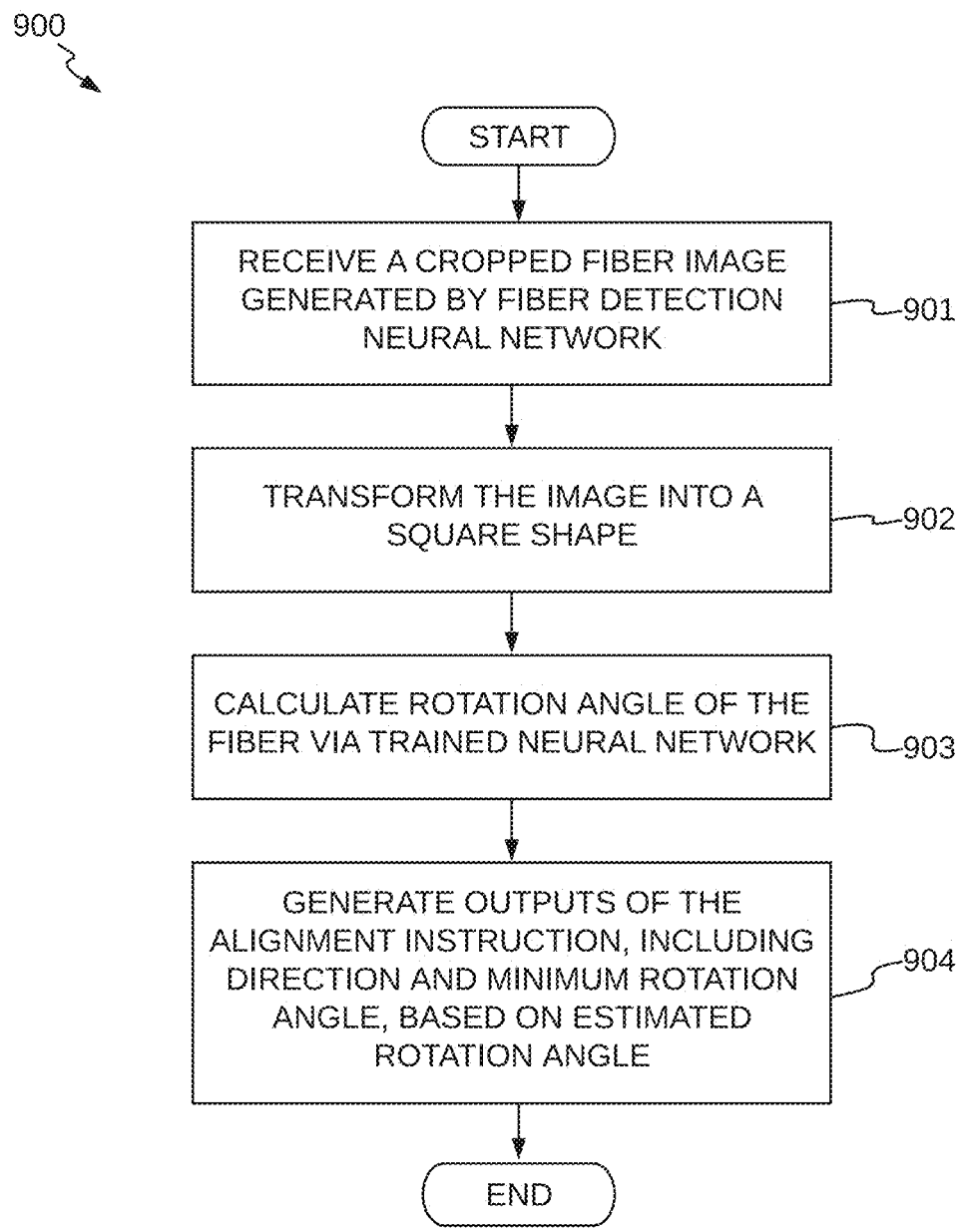
FIG. 9 is a flowchart of a method 900 for showing how the fiber alignment neural network system generates fiber alignment information in one embodiment.

FIG. 9 is a flowchart of a method 900 showing operation of the fiber alignment neural network 308 to generate alignment instructions according to some embodiments. At step 901, an image that contains a single fiber end face is received. Due to the properties of a deep neural network, to avoid aspect ratio changes that could distort the original image, a center square crop method is applied to the input image. The method picks the shorter side from the width and height of the input image and crops from both ends of the longer side. For example, if the input image is 640×480, a 480×480 image is cropped from the center. At step 902, the image is transformed into a square shape. At step 903, the trained fiber alignment neural network 308 calculates a rotation angle for the fiber in the image. At step 904, the rotation angle is further processed into an alignment instruction, consisting of a rotation angle and a direction. The instruction can be used to guide a fiber rotation device for automatic fiber alignment.

Figure 10:
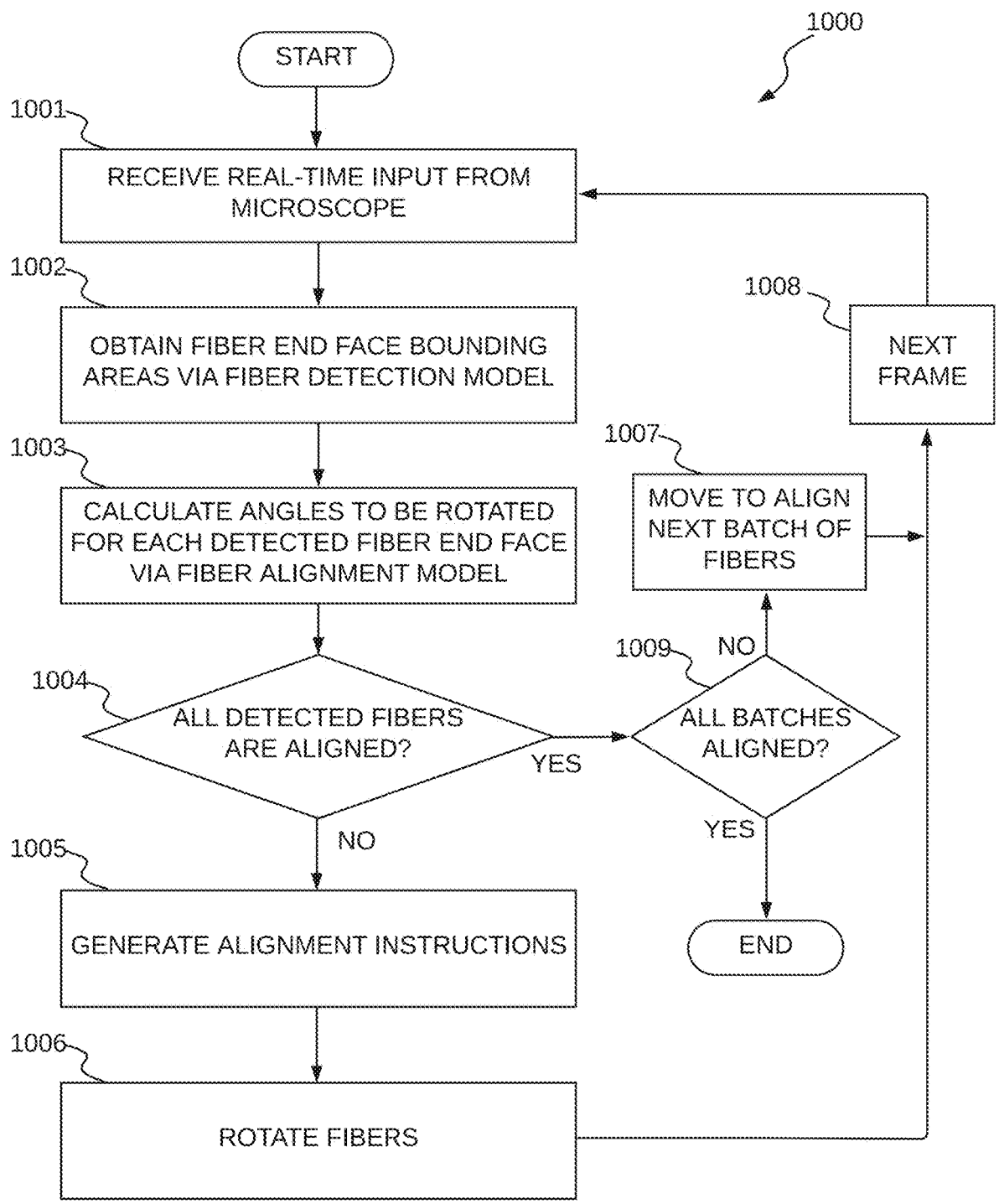
FIG. 10 is a flowchart of a method 1000 for automatic detection and alignment of one or more PM fibers using the fiber detection and alignment system 300.

FIG. 10 is a flowchart of a method 1000 for automatically aligning one or more PM fibers using the fiber detection and alignment system 300. For example, the method 1000 includes operations for operating the two-stage system 300 shown in FIG. 3.

At step 1001, a real-time input from a digital device that can capture fiber end face images is provided as input to the two-stage detection and alignment system 300. In one embodiment, the time interval to send the next live frame to the system 300 is decided by the operation time of a fiber rotation device.

At step 1002, the fiber detection neural network 307 labels the areas of detected fiber end face using bounding boxes and crops the bounded areas into images containing a single fiber end face.

At step 1003, fiber alignment neural network 308 takes the cropped image of output by fiber detection neural network 307 and predicts the misaligned angle for each detected fiber.

At step 1004, a determination is made as to whether any fiber is misaligned. When all misaligned angles are 0° or within a tolerance (e.g., 0.5°) from calculation of fiber alignment neural network 308, method 1000 proceeds to step 1007, where the fiber rotation device moves to the next batch of fibers. Otherwise, method 1000 proceeds to step 1005.

At step 1005, outputs from fiber detection neural network 307 and fiber alignment neural network 308 are put together to generate a set of instructions on how to rotate each detected fiber. The instructions comprise a position of the detected fiber end face, direction of rotation, and rotation angle.

At step 1006, based on the instructions from step 1005, the fiber rotation device rotates fibers simultaneously.

Every time that the fiber rotation device executes an operation, either after step 1007 or 1006, method 1000 will move to step 1008 to ask for the next frame from the digital camera or microscope and execute processes 1001-1003 until all fibers are aligned. For the same batch of fibers, processes 1001-1006 may be executed multiple times. For example, the fiber rotation device may not be able to accurately rotate the angle provided by the instruction due to mechanical capabilities or issues. At step 1009 a determination is made as to whether all fiber batches have been aligned. If all batches have been aligned, the method 1000 ends. If all batches have not been aligned, the method 1000 proceeds to step 1007.

To ensure that the system 300 can perform correctly under different conditions, especially for those conditions that are hard for the existing methods to work, a carefully designed data collection strategy plays a key role to help deep neural networks learn important features.

Figure 11:
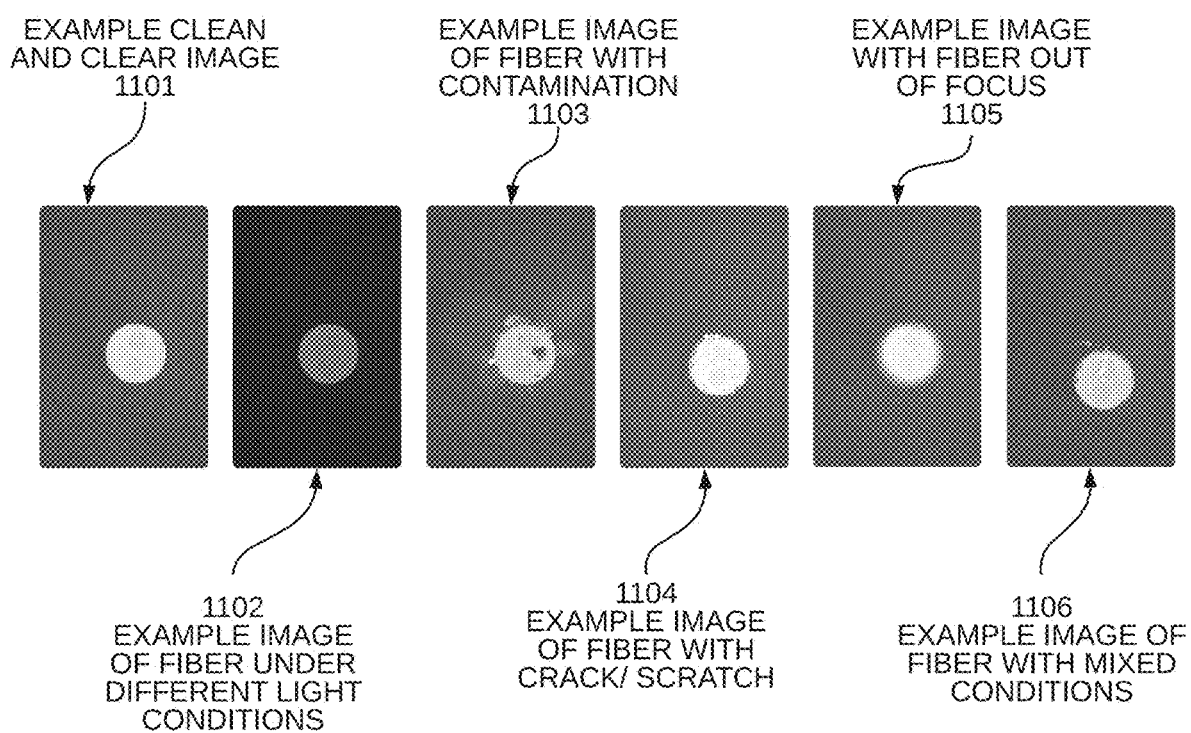
FIG. 11 shows an example of collected images under different conditions for training.

FIG. 11 shows an example of collected images under different conditions for training. For each fiber at a fixed position, which means that the misaligned angle between the reference key and the slow axis of fiber is the same, different conditions are applied. Various conditions are shown in FIG. 11, including clean and clear fiber end face 1101, clean and clear fiber end face under different light conditions 1102, contaminated fiber end face 1103, fiber end face with damages 1104, fiber end face out of focus 1105, and fiber end face under a combination of conditions 1106.

The sequential order to generate the training dataset is: (a) strip, cleave, and clean polarization-maintaining fibers to get a clear and clean fiber end face, (b) add contaminations such as dirt on the fiber end face, (c) remove contaminations and add scratch and/or cracks using polishing paper with different grade and grits, and (d) add contaminations again. For each step from (a) to (d), different light conditions, magnifications, and blur effects are applied additionally.

When labeling the images for deep neural network training in the fiber alignment neural network 308, the images with unclear or invisible stress rods cannot be identified directly from the image to calculate target misaligned angles. However, since the data collection strategy ensures each of these images has a corresponding clear and clean image (e.g., image 1101), the rotational alignment label can be obtained from that image.

Figure 12:
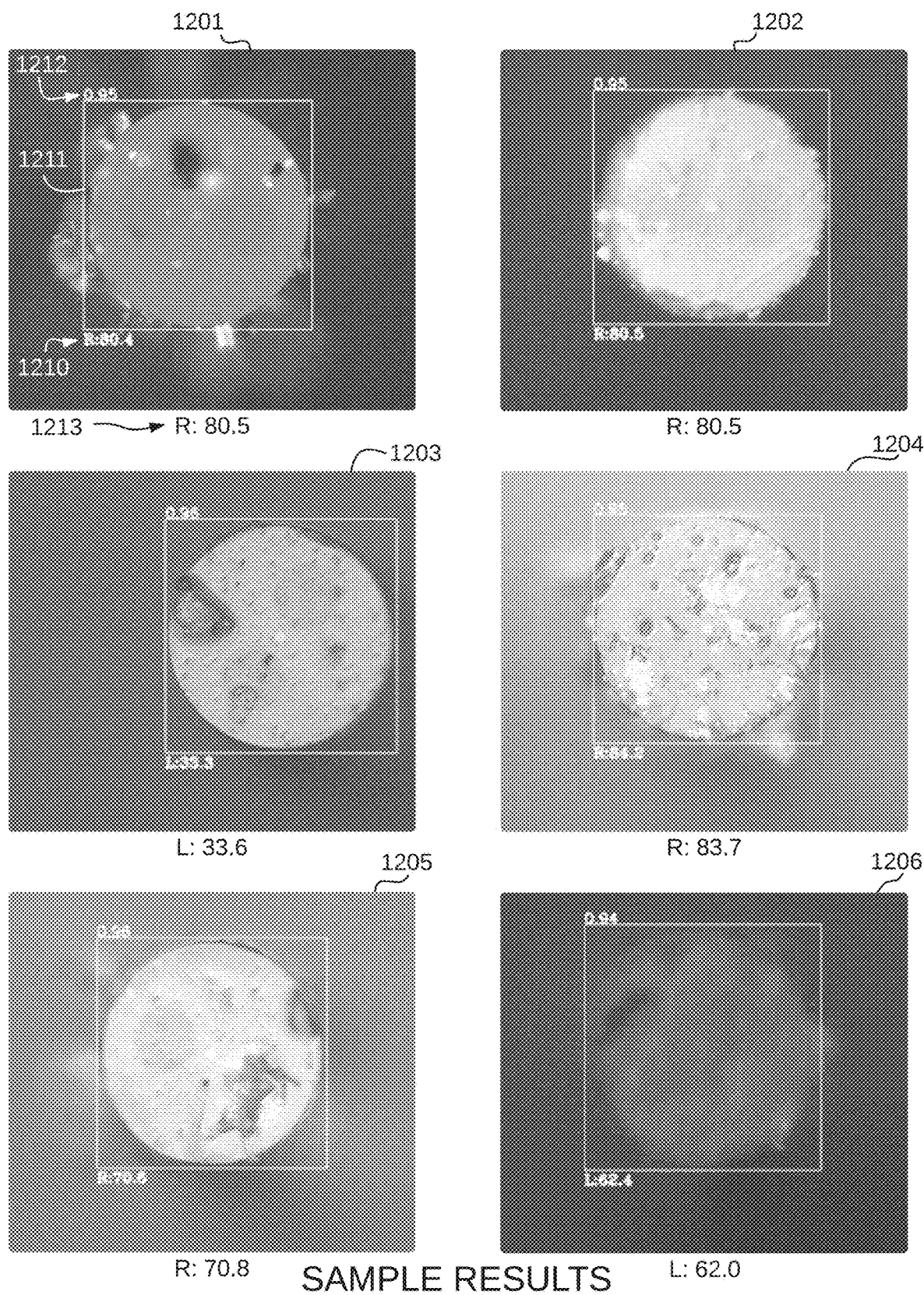
FIG. 12 shows model performance under different image and fiber conditions.

FIG. 12 shows model performance under different image and fiber conditions. For each fiber end face image, predicted misaligned angle information is presented overlaid above the image along with ground truth information, a predicted bounding box, and a confidence score. For fiber end face images with two detectable stress rods, such as in images 1201, 1202, and 1203, whatever the fiber end faces have contamination, cracks, scratches, or are under different illumination conditions, the difference between predicted rotation angle and true rotation angle is within 0.5°. For fiber end face images with one or more stress rods that are unclear, such as in images 1204, 1205, and 1206, the difference between predicted rotation angle and true rotation angle may be a little higher. In some images, one or both stress rods cannot be clearly detected or can be only partially detected by human eyes. For image 1201, reference numeral 1210 identifies predicted misaligned angle information ("R: 80.4"), reference numeral 1211 identifies a predicted bounding box, reference numeral 1212 identifies a confidence score ("0.95"), and reference numeral 1213 identifies ground truth information ("R: 80.5").

Most of the fiber end faces can be successfully detected and the misaligned angle can be accurately calculated with a tolerance of ±1°. The system is able to predict the rotation angle when fiber and/or image conditions are too hard for traditional methods to achieve the same target. Faulty fiber or image conditions usually means that two stress rods of fiber cannot be clearly detected in the image. From the perspective of fibers, contamination and/or damages on the fiber end face can prevent stress rods from being clearly detected. From the perspective of images, blurs, low contrast between stress rods and the rest of fiber, and low magnification of microscope all can make stress rods unclear or invisible. Various embodiments allow for automatic fiber alignment without excessive cleaning, polishing, or cleaving. This avoids very time consuming traditional methods and is not limited by the different magnification ratio or lighting conditions available in different digital cameras or microscopes thereby further reducing costs.

The disclosed system for automatic fiber alignment can be applied to different numbers of fibers under different conditions in real-time.

Figure 13:
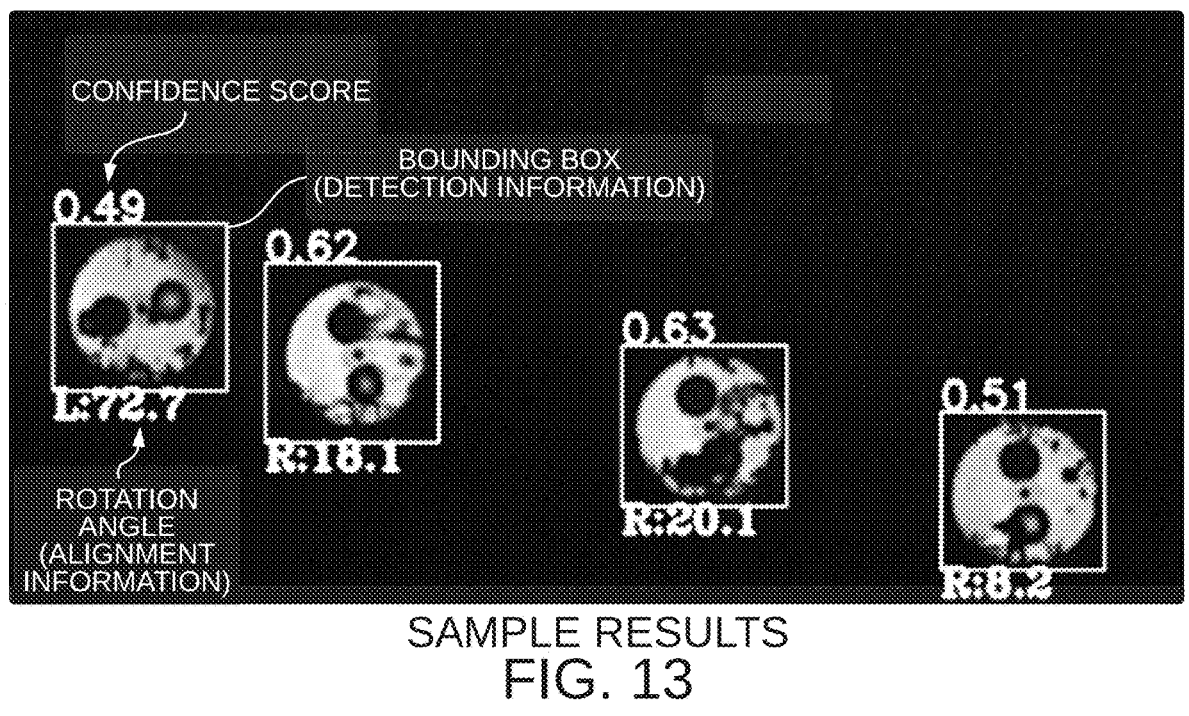
FIG. 13 shows model performance when multiple fibers are detected simultaneously.

FIG. 13 shows model performance when multiple fibers are detected simultaneously. The positions of four contaminated fiber end faces captured by the digital microscope are correctly detected and the misaligned angles are calculated. Thus, the system is able to align multiple fibers at the same time, which provides opportunities for producing polarization-maintaining fiber ribbons.

FIG. 14 is a diagram of a system 1400 having a fiber rotator 1401 operable to align a PM fiber array. In one embodiment, many of the components of system 1400 are the same as like-numbered components shown in FIG. 3. A fiber rotator 1401 is included that receives alignment instructions from the fiber detection and alignment system 301. The fiber rotator 1401 is controlled to rotate each fiber according to the alignment instructions. The fiber rotator 1401 is any suitable hardware operable to selectively rotate and adjust one or more optical fibers in relation to a respective reference key.

FIG. 15 is a diagram of the system 1400 after the fiber rotator 1401 aligns the multiple PM fiber array.

Figure 16:
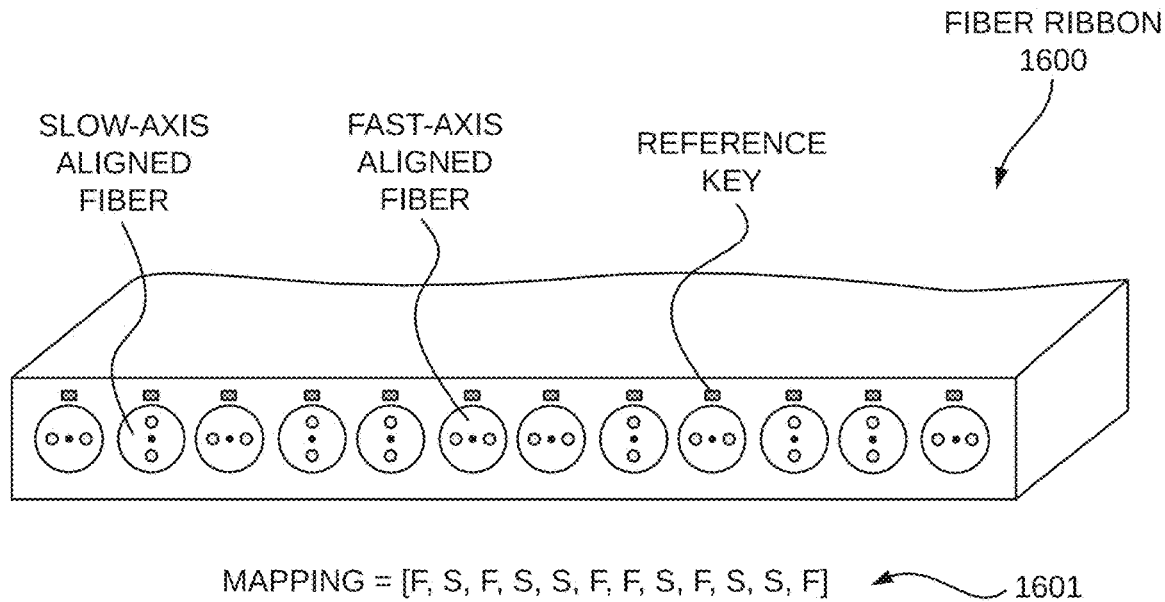
FIG. 16 is a diagram of a PANDA type PM fiber ribbon 1600.

FIG. 16 is a diagram of a PANDA type PM fiber ribbon 1600. As illustrated in FIG. 16, each fiber has been rotated to align a fast or slow axis of the fiber with a reference key. In this example, a mapping 1601 is provided that indicates the orientation of each fiber in the packaged arrangement. These novel systems and techniques can be applied to form packaged arrangements for PM fiber ribbon and PM fiber arrays.

Figure 17:
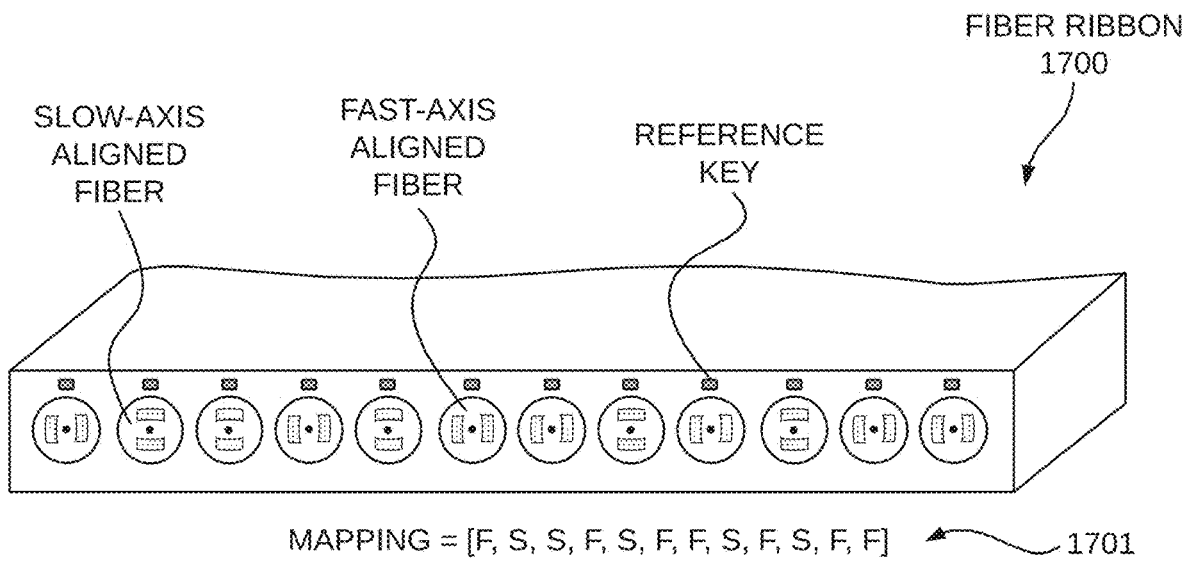
FIG. 17 is a diagram of a Bow-Tie type PM fiber ribbon 1700.

FIG. 17 is a diagram of a Bow-Tie type PM fiber ribbon 1700. As illustrated in FIG. 17, each fiber has been rotated to align a fast or slow axis of the fiber with a reference key. In this example, a mapping 1701 is provided that indicates the orientation of each fiber in the packaged arrangement. These novel systems and techniques can be applied to form packaged arrangements for PM fiber ribbon and PM fiber arrays.

Figure 18:
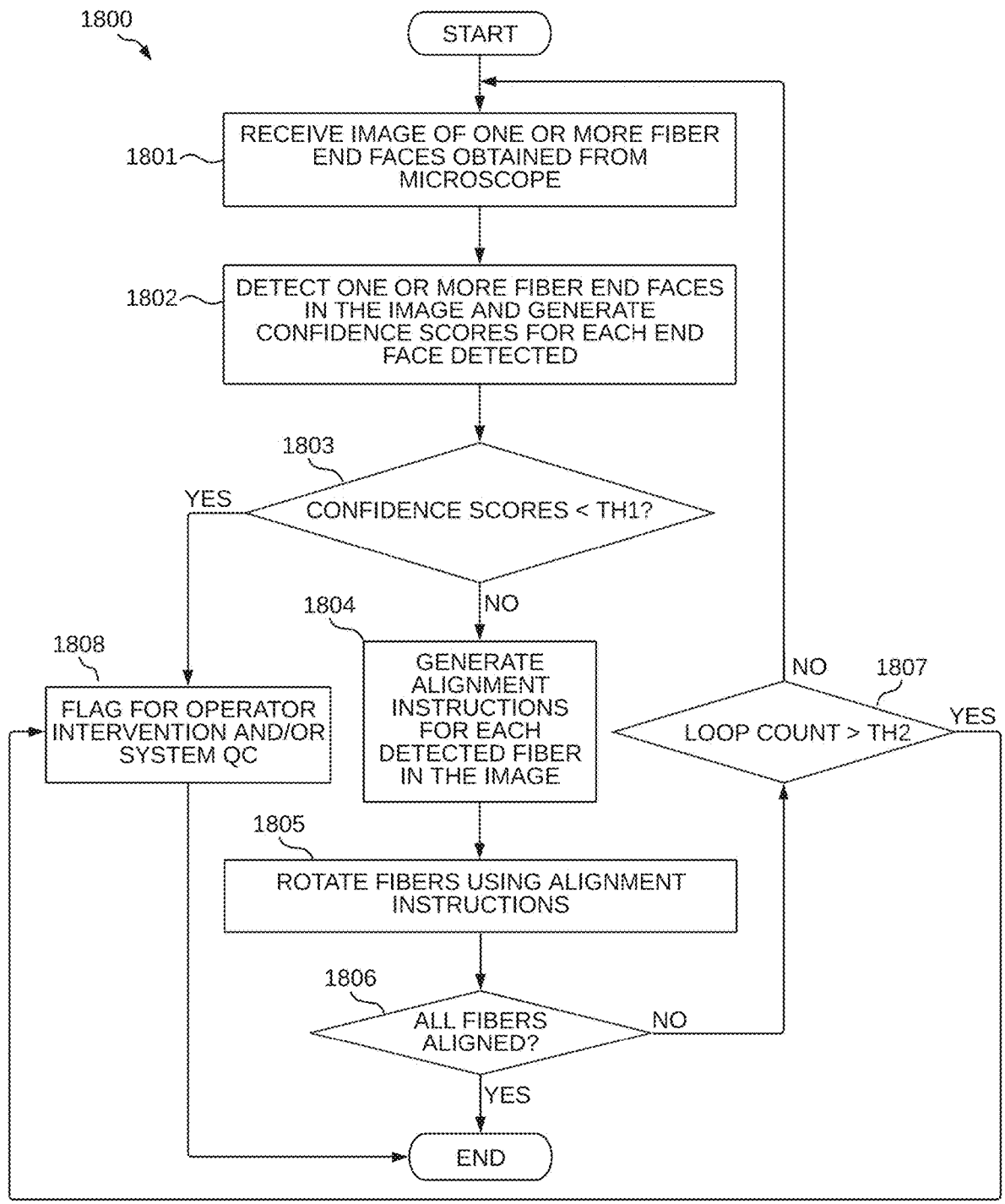
FIG. 18 is a flowchart of a method 1800 for detecting and aligning a fiber.

FIG. 18 is a flowchart of a method 1800 for detecting and aligning one or more fibers. For example, in one embodiment, the method 1800 is performed by the fiber alignment system shown in FIG. 14 and FIG. 15.

At step 1801, an image of one or more fiber end faces obtained via a microscope is received.

At step 1802, the end faces of the fibers in the image are detected. A confidence score is generated for each end face detected. In one embodiment, the confidence score indicates confidence that a bounding box surrounds an end face of a fiber. In other embodiments, the confidence scores indicate confidence in other predicted values.

At step 1803, each confidence score is evaluated to determine if a confidence is below a threshold TH1. If any of the confidence scores is less than the threshold TH1, then the method proceeds to step 1808 for operator intervention and/or quality control measures. If none of the confidence scores is less than the threshold TH1, then the method proceeds to step 1804. The threshold TH1 is configurable by an operator or system provider.

At step 1804, an alignment instruction is generated for each fiber from the image. For each detected fiber, the alignment instruction aligns an axis of each fiber to an associated reference key. The alignment instruction includes a rotation angle (e.g., degrees or radians) and direction (e.g., "clockwise/counterclockwise" or "right/left").

At step 1805, each fiber is rotated using the alignment instruction.

At step 1806, a check is performed to confirm that all fibers are aligned. This may be performed manually via an operator or automated using the system. If the fibers are all aligned, then the method terminates. If not all fibers are aligned, then the method proceeds to step 1807.

At step 1807, a check is performed to determine whether a number of times that the method has been repeated is greater than a threshold TH2 (e.g., 3 times). If the number of times that the method has been repeated is greater than the threshold TH2, then the method proceeds to step 1808. If the number of times that the method has been repeated is less than or equal to the threshold TH2, then the method repeats by proceeding to step 1801. The threshold TH2 is configurable by an operator or system provider.

At step 1808, a flag for operator intervention and/or system quality control is activated.

Figure 19:
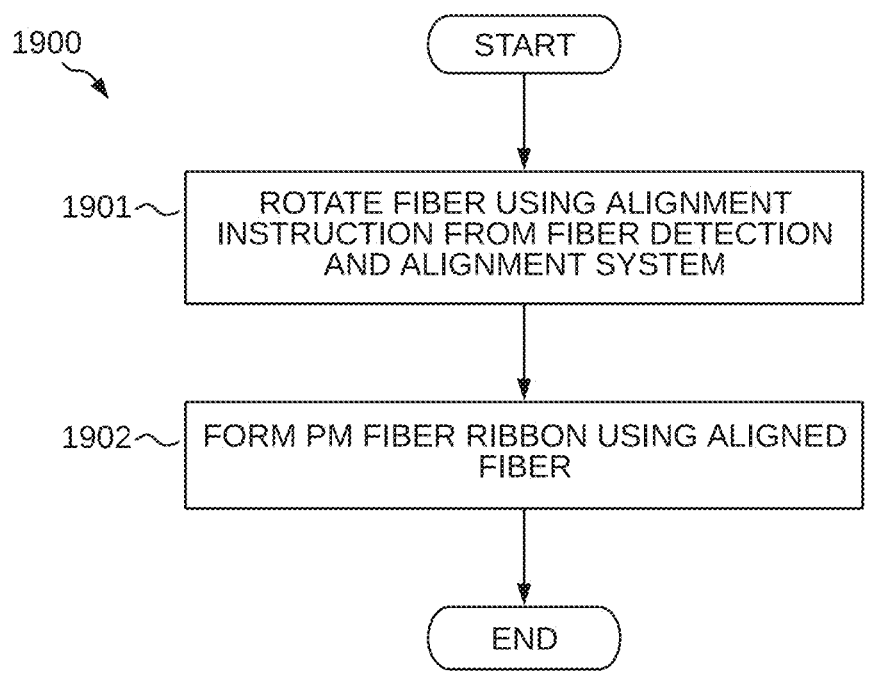
FIG. 19 is a flowchart of a method 1900 for forming a PM fiber ribbon using a fiber detection and alignment system.

FIG. 19 is a flowchart of a method 1900 for forming a PM fiber ribbon using a fiber detection and alignment system.

At step 1901, the PM fiber is rotated using alignment instructions from a fiber detection and alignment system.

At step 1902, the PM fiber is formed into a PM fiber ribbon. This method can be used to scalably package an arbitrary number of PM fibers into a PM fiber ribbon.

Although certain specific embodiments are described above for instructional purposes, the teachings of this patent document have general applicability and are not limited to the specific embodiments described above. In other embodiments, non-neural network-based techniques are employed to identify fiber end faces and predict rotation angle and direction information. For example, support vector machines (SVM), K-Nearest Neighbors (KNN), or other machine learning algorithms are used to identify fiber end faces and predict rotation angle and direction information instead of neural network based approaches. In another embodiment, a vision based large multimodal model (LMM) receives an image having one or more fiber end faces. The LMM is prompted to identify a fiber end face and to predict rotation angle and direction information for each detected fiber end face.

Figure 20:
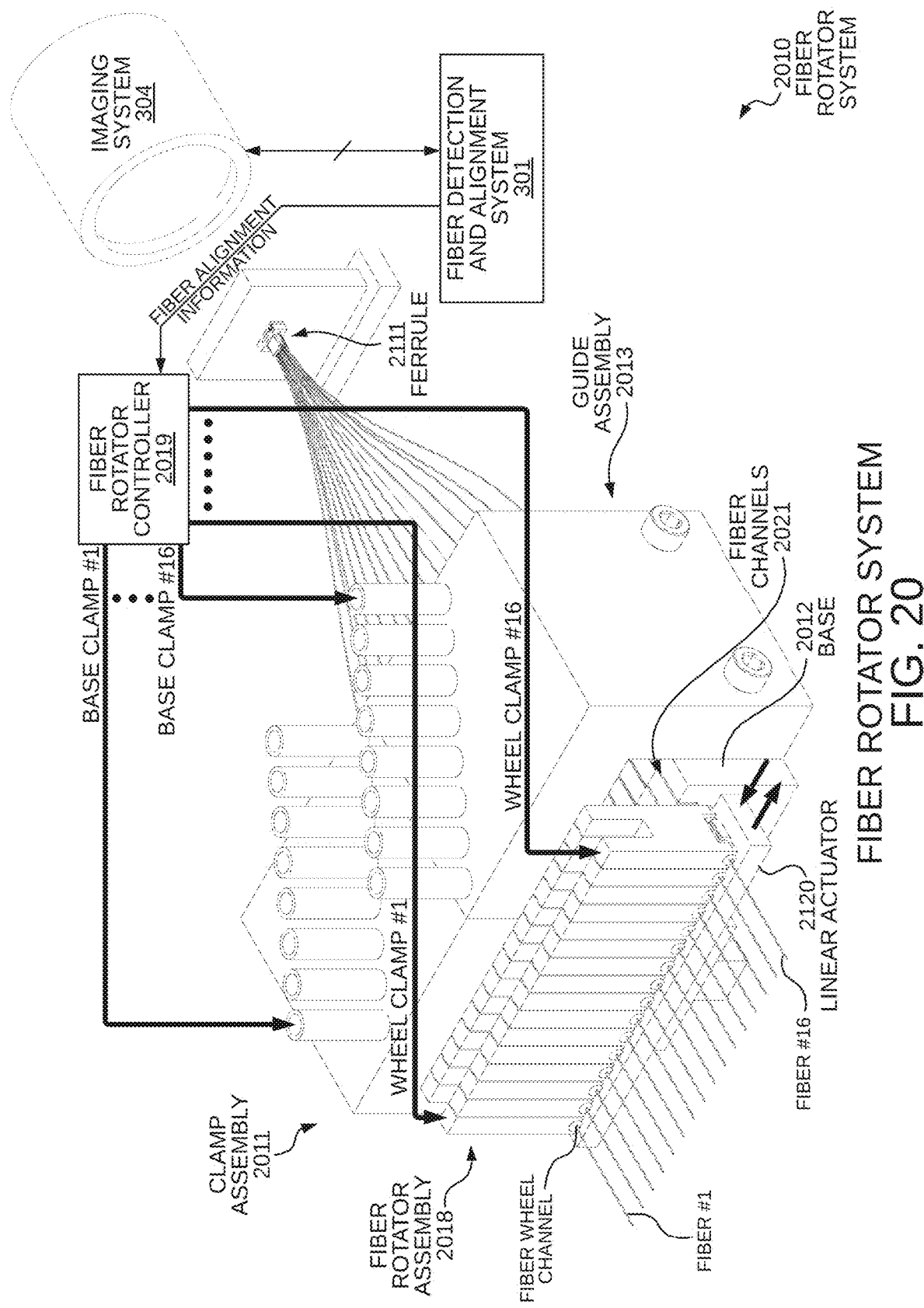
FIG. 20 is a diagram of a fiber rotator system in accordance with one embodiment that includes a clamp assembly, a fiber rotator assembly, and a fiber detection and alignment system.

FIG. 20 is a diagram of a fiber rotator system 2010 in accordance with one embodiment. The fiber rotator system 2010 includes a clamp assembly 2011 and a fiber rotator assembly 2018. The clamp assembly 2011 includes a base 2012, a plurality of fiber clamps, and a guide assembly 2013. The fiber rotator assembly 2018 includes a linear actuator 2120 and a plurality of wheel clamps. A fiber detection and alignment system 301 is used to determine fiber alignment and provide fiber alignment information to the fiber rotator controller 2019. The fiber rotator controller 2019 controls engagement and disengagement of the fiber clamps and wheel clamps. In addition, the fiber rotator controller 2019 also controls actuation of the linear actuator 2120.

The clamp assembly 2011 has a plurality of fiber channels 2021. Each of the fiber channels is configured to receive and support an optical fiber. The fiber rotator assembly 2018 has a plurality of fiber wheel channels. Each of the fiber wheel channels aligns with a respective fiber base channel. Each wheel clamp rotates an individual fiber along with the linear actuator 2120.

The optical fibers terminate at a ferrule 2111, where an imaging system 304 can observe stress rods within each optical fiber.

In some embodiments of a fiber rotator system, the clamp assembly is 3D printed and the fiber rotator assembly is machined.

Figure 21:
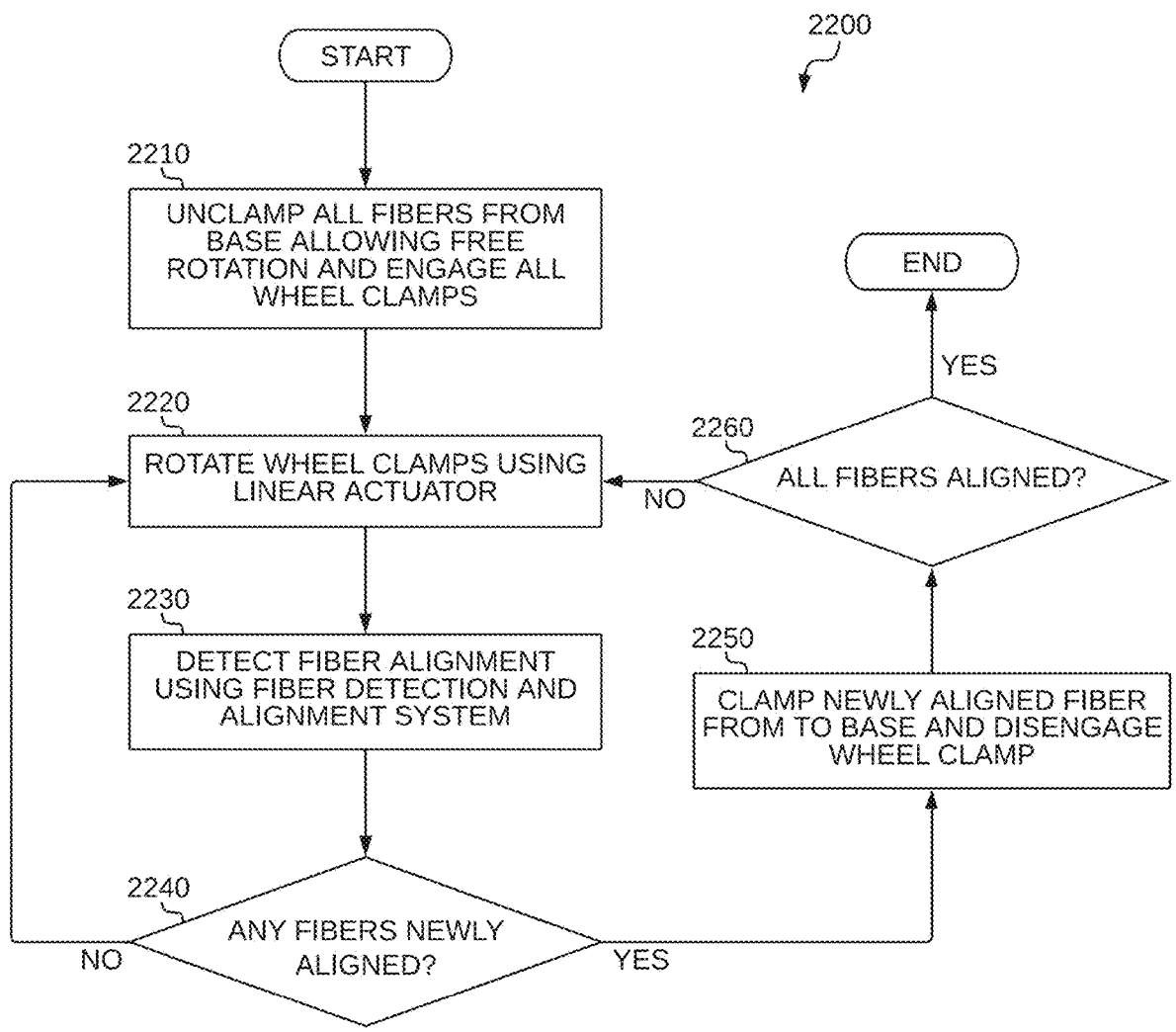
FIG. 21 is a flowchart illustrating a method for aligning polarization-maintaining (PM) fibers using the fiber rotator system and fiber detection and alignment system.

FIG. 21 is a flowchart of a method for forming a polarization-maintaining (PM) fiber ribbon using the fiber detection and alignment system.

In a first step 2210, all fibers are unclamped from the base, allowing free rotation, and all wheel clamps are engaged.

In a second step 2220, the wheel clamps are rotated using the linear actuator.

In a third step 2230, the fiber detection and alignment system detects fiber alignment.

In a fourth step 2240, it is determined if any fibers are newly aligned. If any fibers are newly aligned, the method proceeds to step 2250. If no fibers are newly aligned, the method returns to step 2220.

In a fifth step 2250, any fibers that are newly aligned are clamped to the base using the respective base clamps, and their respective wheel clamps are disengaged.

In a sixth step 2260, it is determined whether or not all fibers are aligned. If all fibers are aligned, the method halts. Otherwise, the method returns to step 2220.

Figure 22:
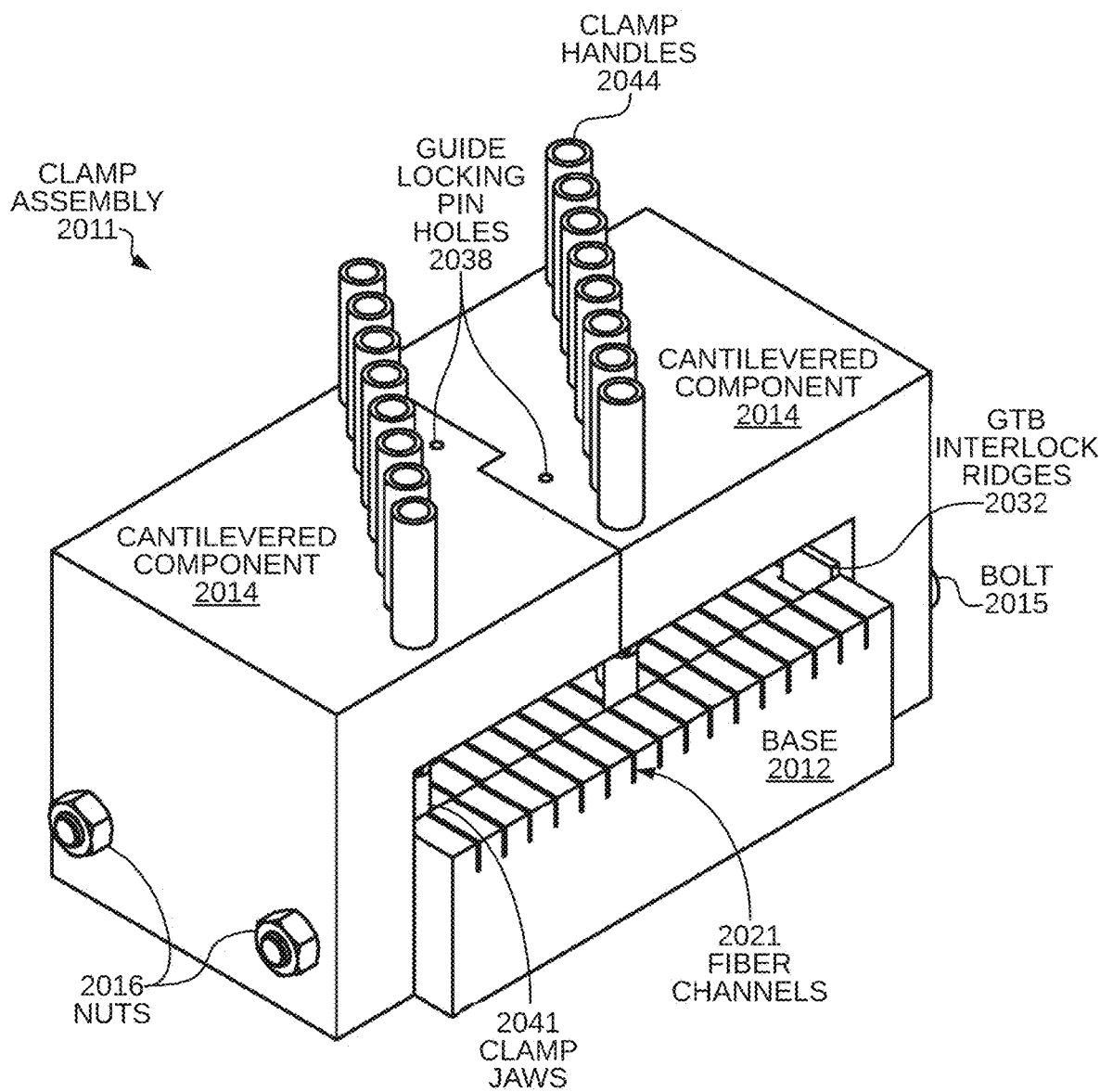
FIG. 22 is a perspective view of the clamp assembly, showing the base, fiber clamps, and cantilevered guide assembly.

FIG. 22 is a diagram of a perspective view of a clamp assembly 2011. The clamp assembly includes a base 2012 and a guide assembly 2013. The base 2012 comprises fiber channels 2021. Guide assembly 2013 comprises cantilevered components 2014, guide locking pin holes 2038. The clamp assembly further includes clamp handles 2044 and clamp jaws 2041. Guide-to-base interlock ridges 2032 secure the base and guide assembly together, and bolts 2015 and nuts 2016 fasten the structure.

In accordance with at least one novel aspect, the diagonal arrangement of fiber clamps allows for compact packing of fiber clamps to hold a multi-fiber cable. This novel diagonal arrangement minimizes distances between individual fibers. In addition, this compact packing ensures that the fiber rotator assembly 2018 is positioned sufficiently close to the clamp assembly 2011 to ensure each fiber can be rotated with precision and locked in place once aligned. If the fiber rotator assembly 2018 is over 100 mm from the clamp assembly 2011, the accuracy of fiber rotation is negatively affected.

Figure 23:
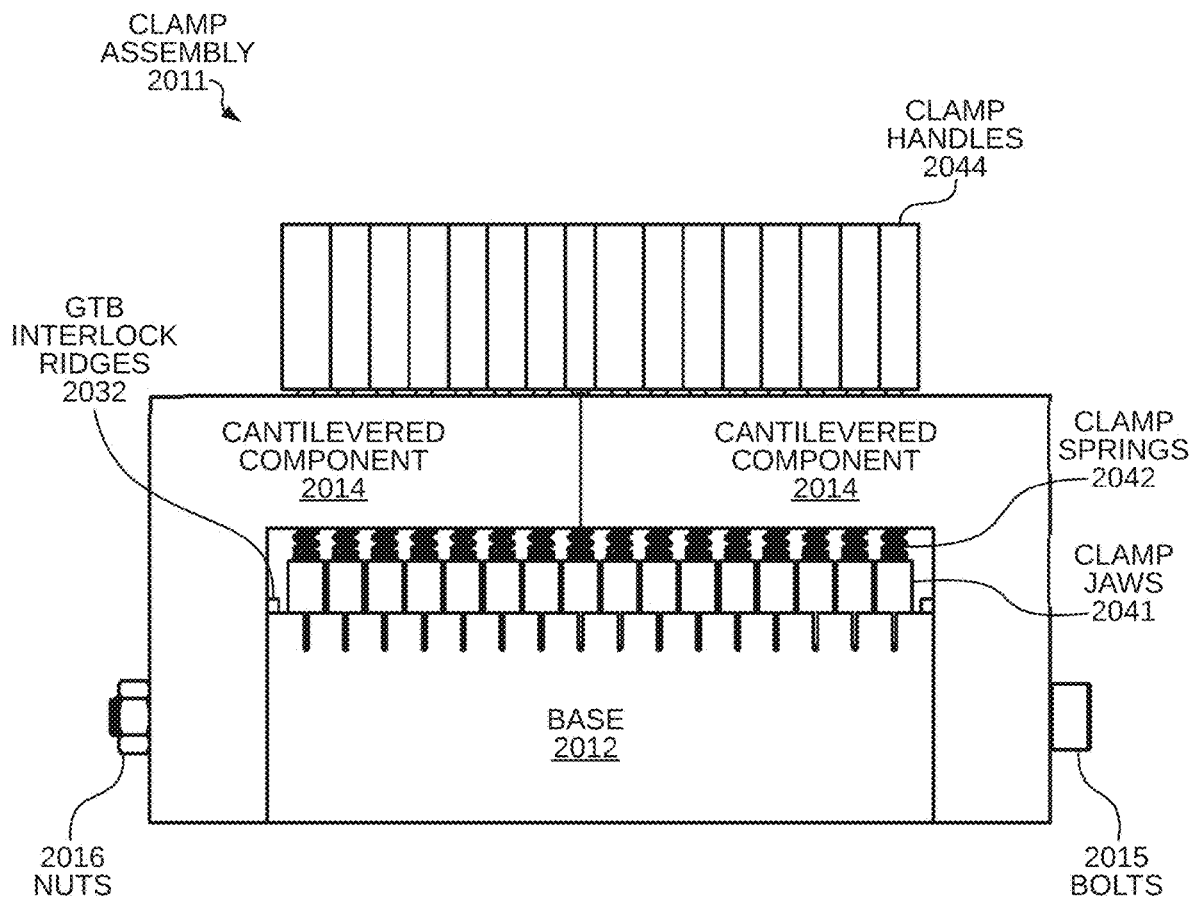
FIG. 23 is a front view of the clamp assembly, illustrating the cantilevered components, clamp jaws, clamp springs, and interlock ridges.

FIG. 23 is a front view of the clamp assembly 2011. This view shows the cantilevered components 2014 attached to the base 2012. The clamp handles 2044 and clamp jaws 2041 are visible, along with clamp springs 2042 that provide a clamping force. Guide-to-base interlock ridges 2032 are disposed along the guide assembly 2013.

Figure 24:
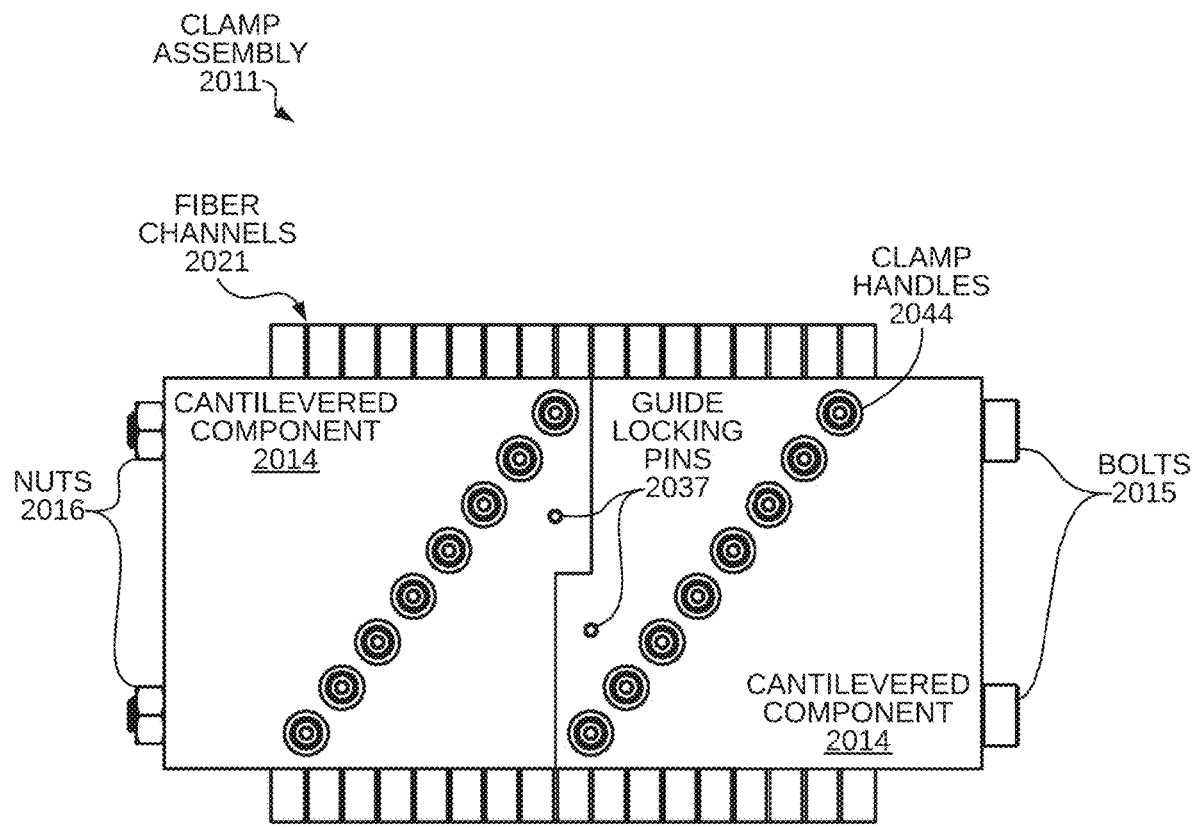
FIG. 24 is a top view of the clamp assembly, showing the fiber channels, guide locking pins, and attachment points.

FIG. 24 is a top view of the clamp assembly 2011. The fiber channels 2021 extend along the base 2012. The guide locking pins 2037 secure both cantilevered components 2014 together, forming guide assembly 2013. The bolts 2015 and nuts 2016 fasten the guide assembly and base together.

Figure 25:
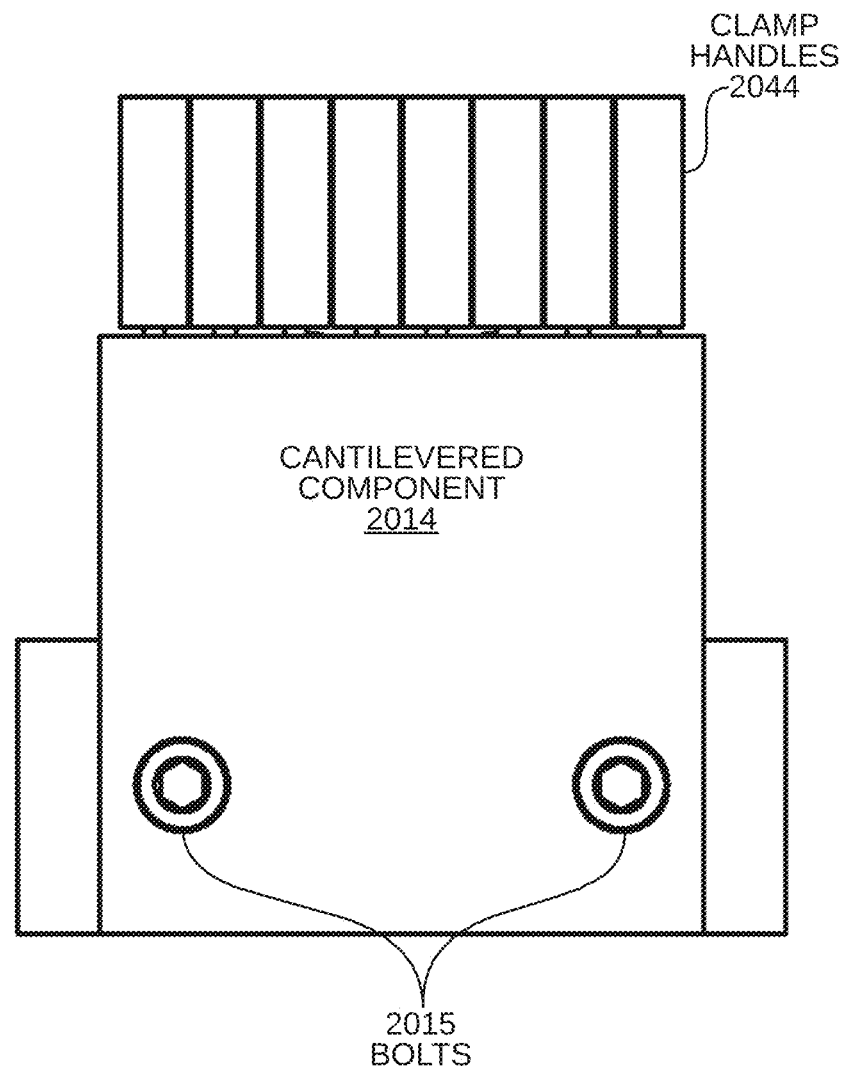
FIG. 25 is a side view of the clamp assembly, showing the clamp handles and structural arrangement.

FIG. 25 is a side view of the clamp assembly 2011. The clamp handles 2044 extend upward, allowing manual or automated engagement of the fiber clamps. The cantilevered components 2014 provide structural support.

Figure 26:
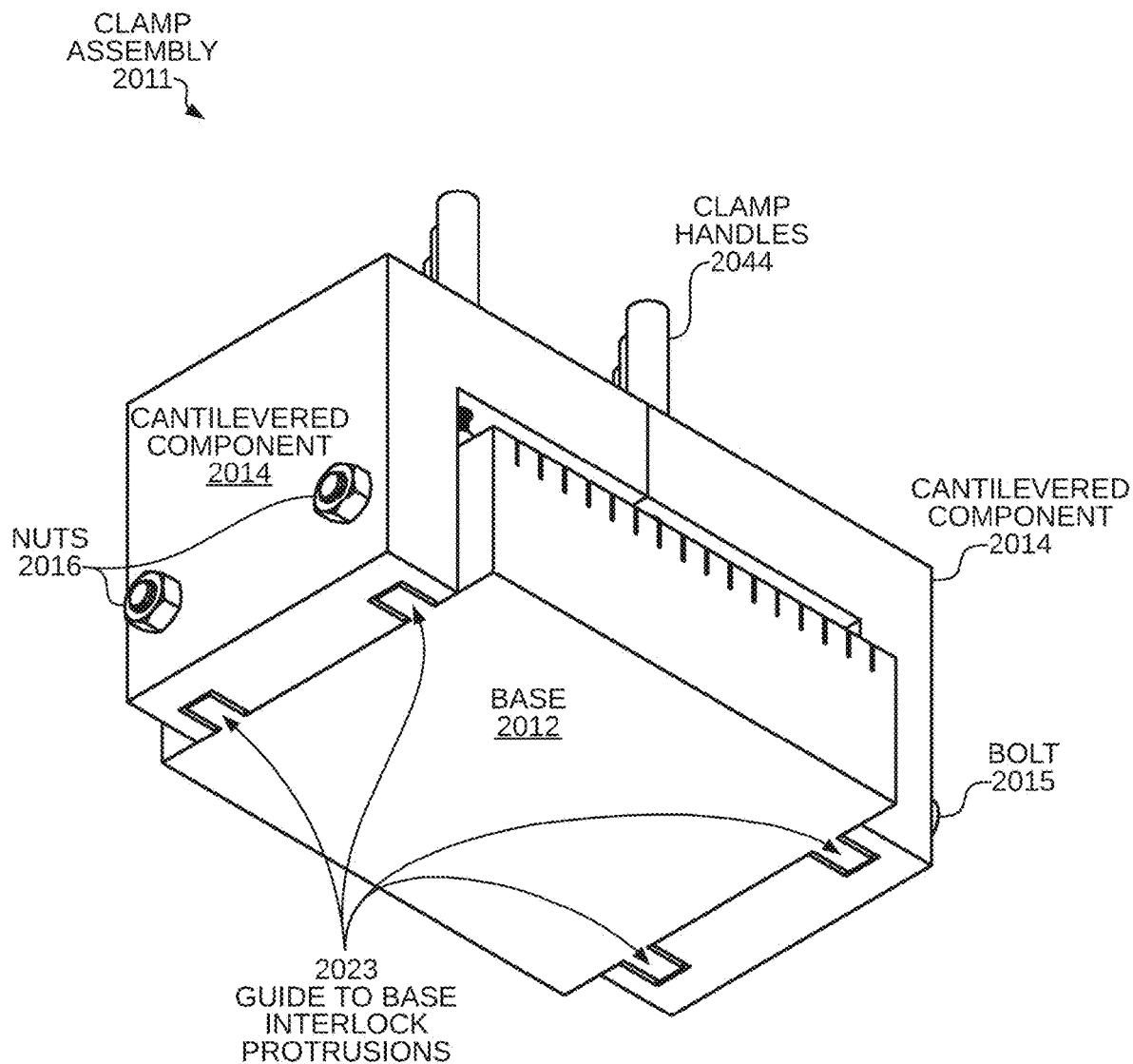
FIG. 26 is another perspective view of the clamp assembly, illustrating the guide-to-base interlock protrusions.

FIG. 26 is another perspective view of the clamp assembly 2011. Guide-to-base interlock protrusions 2023 facilitate secure attachment of the guide assembly 2013 to the base 2012.

Figure 27:
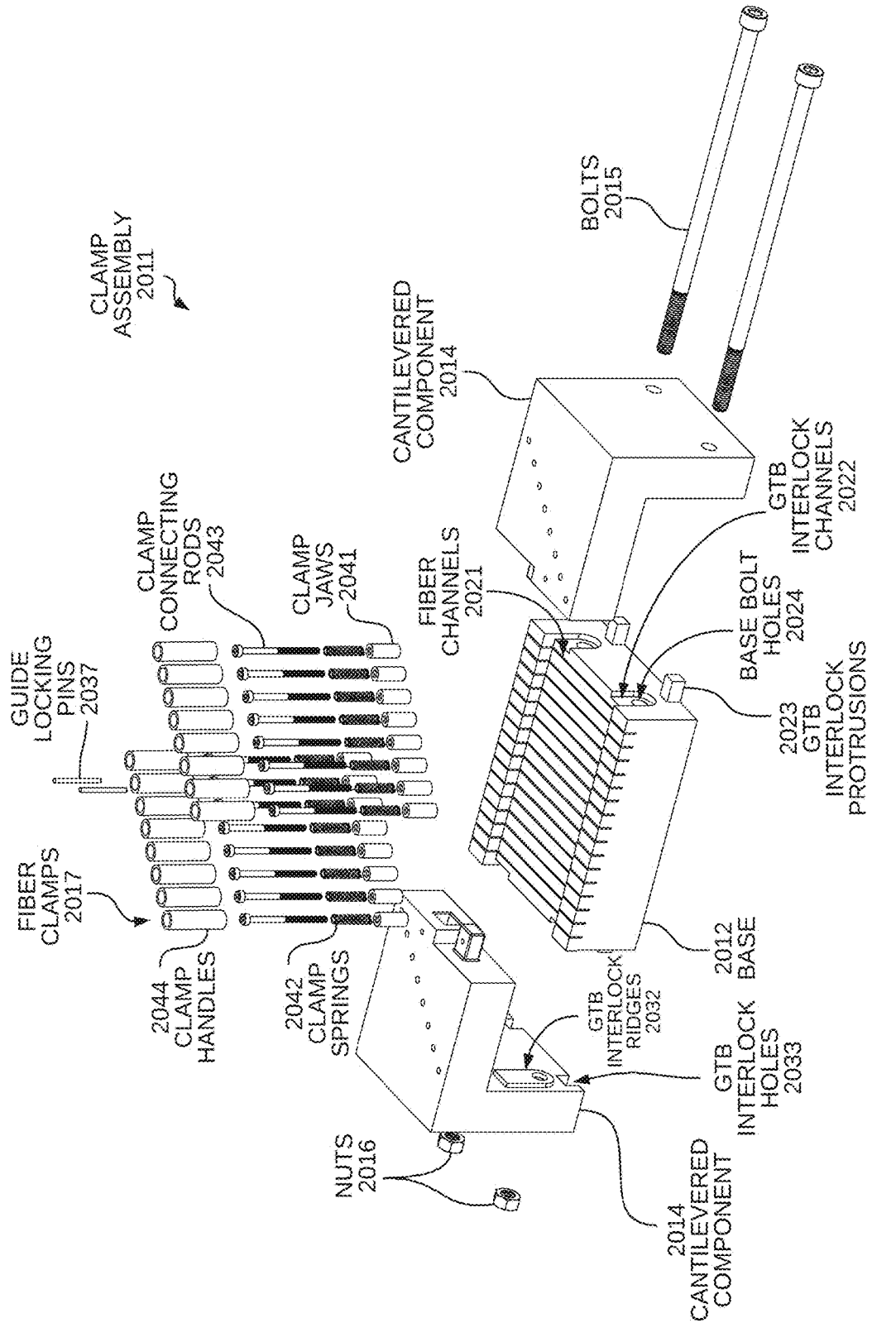
FIG. 27 is an exploded view of the clamp assembly, detailing the base, fiber clamps, guide assembly, and fastening components.

FIG. 27 is a diagram of an exploded view of a clamp assembly for holding PM fiber ribbons to be aligned. A clamp assembly comprises a base 2012, a guide assembly 2013, and a plurality of fiber clamps. In this embodiment, the guide assembly 2013 comprises two cantilevered components 2014, and the plurality of fiber clamps comprises sixteen fiber clamps 2017.

The base 2012 includes fiber channels 2021 and guide-to-base interlock channels 2022. The cantilevered components 2014 attach via guide-to-base interlock protrusions 2023. Guide locking pins 2037 further secure the structure. The fiber clamps 2017 each include a clamp jaw 2041, a clamp connecting rod 2043, a clamp spring 2042, and a clamp handle 2044.

Figure 28:
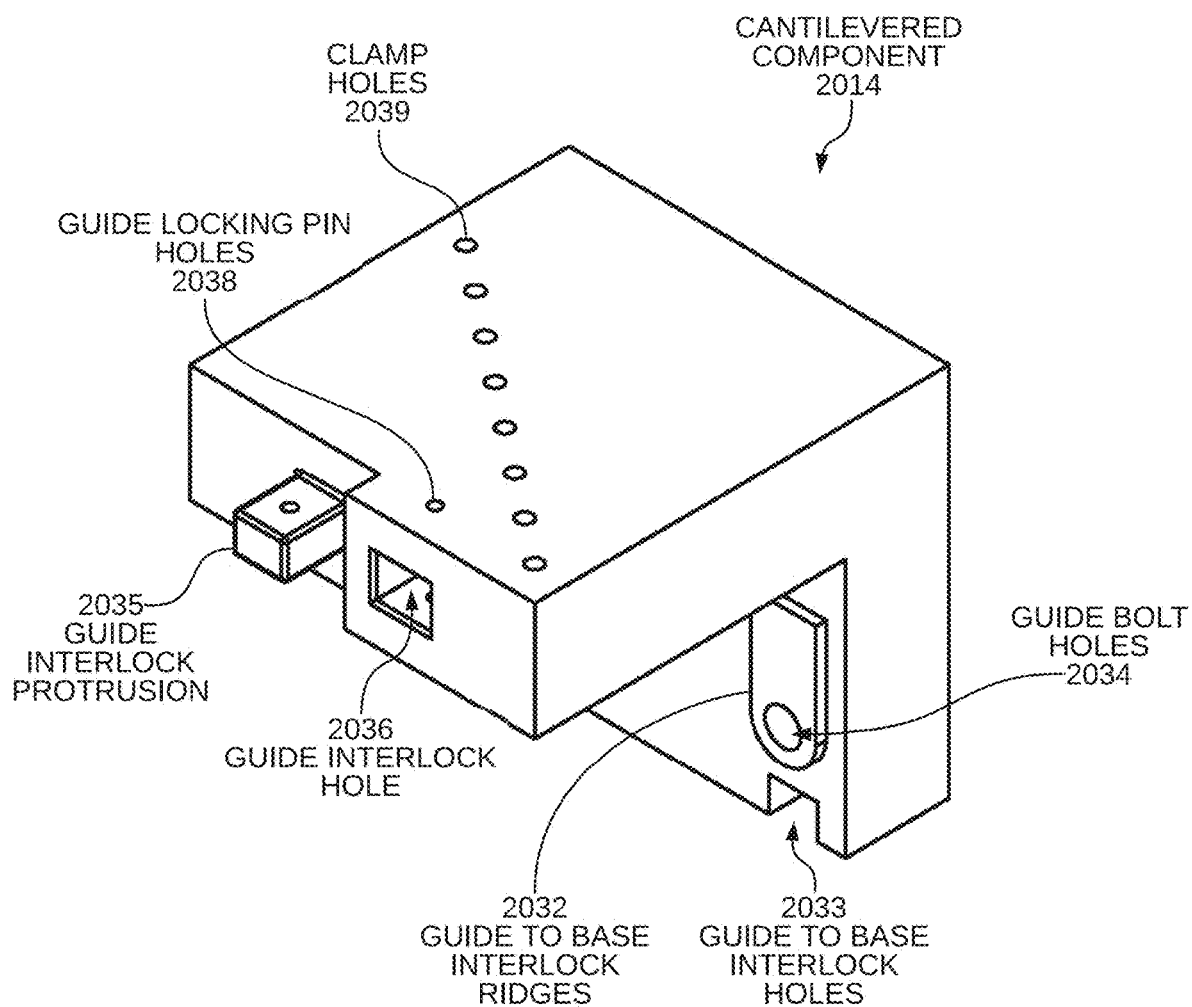
FIG. 28 is a perspective view of a cantilevered component used in the guide assembly, showing interlock ridges and mounting holes.

FIG. 28 is a diagram of a perspective view of a cantilevered component 2014 of a clamp assembly for holding PM fiber ribbons to be aligned. A pair of bolt holes 2034 allow for bolts 2015 to connect each cantilevered component 2014 to the base 2012. A plurality of clamp holes 2039 are positioned on the portion of the cantilevered component 2014 that is disposed above the fiber channels 2021 when the clamp assembly is assembled. These holes allow for each fiber clamp 2017 to move vertically independently of any other fiber clamp 2017.

A pair of guide interlock protrusions 2035 and guide interlock holes 2036 ensure a solid connection and prevent vertical misalignment between each cantilevered component 2014. An additional pair of locking pin holes 2038 allow a pair of locking pins 2037 to be inserted to prevent the cantilevered components 2014 from being pulled apart, ensuring horizontal alignment between the cantilevered components 2014.

Two systems of interlocks are used when connecting each cantilevered component 2014 to the base 2012. Each cantilevered component 2014 has two guide-to-base interlock ridges 2032 that interlock with two guide-to-base interlock channels 2022 on the base 2012 of the clamp assembly 2011. Additionally, two pairs of guide-to-base interlock protrusions 2023 located on the base 2012 interlock with a pair of guide-to-base interlock holes 2033 located on each cantilevered component 2014. These interlocks prevent the cantilevered components 2014 from being misaligned with the base 2012. These interlocks also ensure that the fiber clamps 2017 are held at a consistent height above the fiber channels 2021 in the base 2012. In some embodiments, only one system of interlocks is used to connect each cantilevered component 2014 to the base 2012. For example, some embodiments of cantilevered components 2014 do not include the interlocking ridges 2032.

Figure 29:
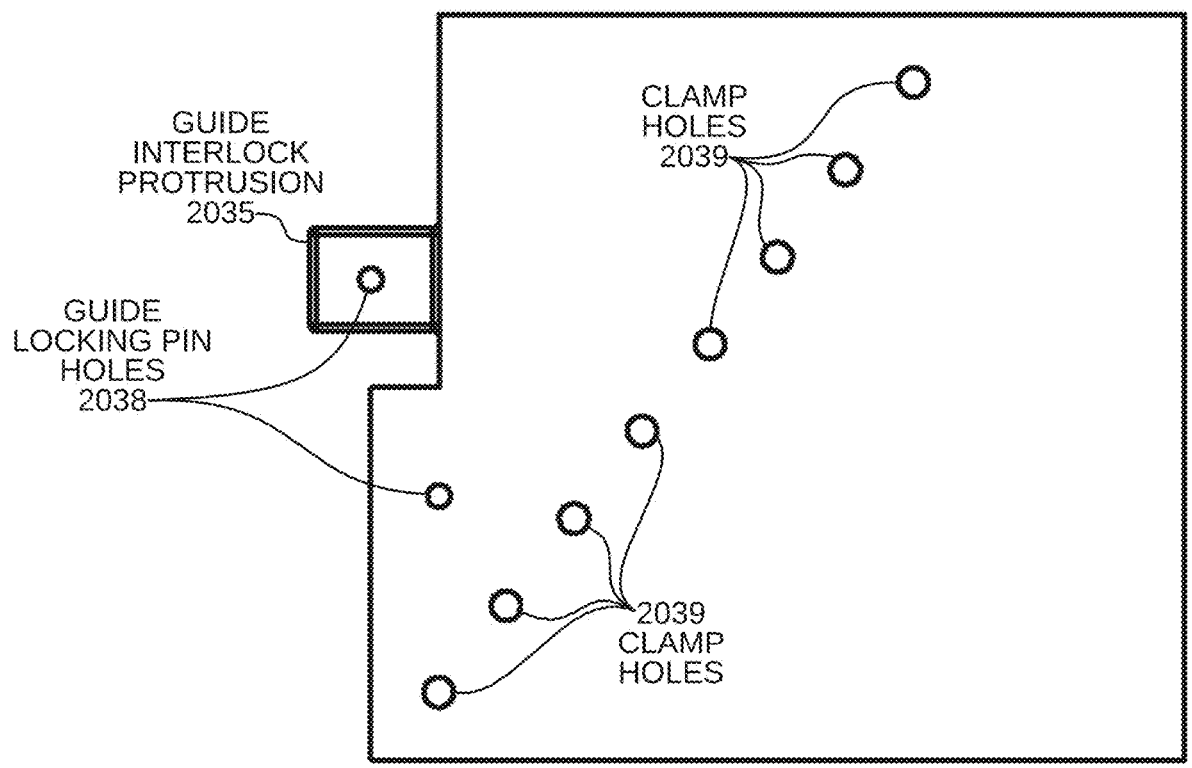
FIG. 29 is a top view of the cantilevered component, illustrating clamp holes and guide locking pin holes.

FIG. 29 is a diagram of a top view of a cantilevered component 2014. Guide interlock protrusion 2035 is shown with both guide locking pin holes 2038. Guide interlock protrusion 2035 fits within a guide interlock hole 2036 on the corresponding cantilevered component that connects to the shown cantilevered component 2014. Guide locking pin holes 2038 extend from the upper surface of cantilevered component 2014 at least partially through the guide interlock protrusion 2035. This allows for easy disassembly of the guide assembly while ensuring alignment between the cantilevered components 2014.

Clamp holes 2039 are arranged diagonally to allow the diameter of the clamp handles 2044 to be increased. This feature assists with ease of use and accessibility.

Figure 30:
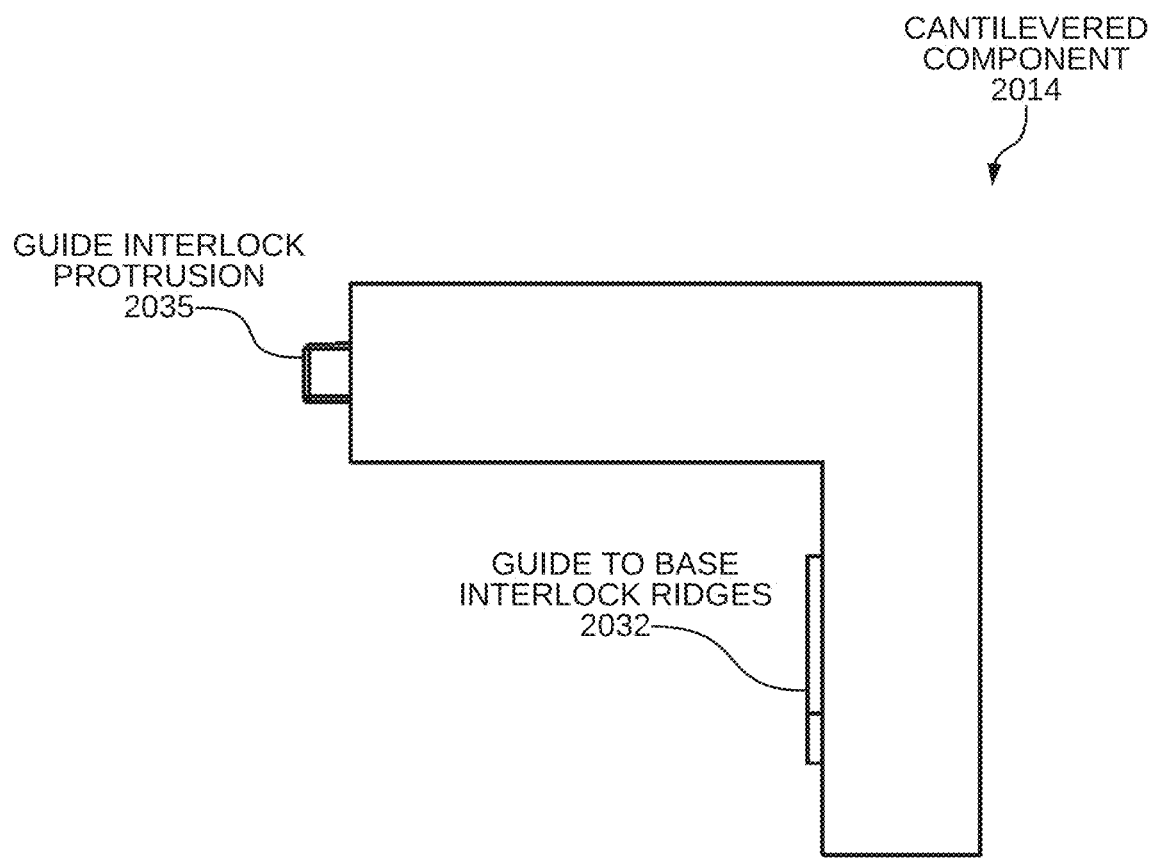
FIG. 30 is a front view of the cantilevered component, highlighting interlock ridges and the interlock protrusion.

FIG. 30 is a diagram of a front view of a cantilevered component 2014. The guide interlock protrusion 2035 extends into a guide interlock hole in a corresponding cantilevered component when the guide assembly 2013 is formed. This ensures that both cantilevered components are aligned with each other.

The guide-to-base interlock ridges 2032 extend into a guide-to-base interlock channel in the base 2012 when the clamp assembly is formed. This ensures that the fiber clamps 2017 are held at a consistent height above the fiber channels 2021 in the base 2012.

Figure 31:
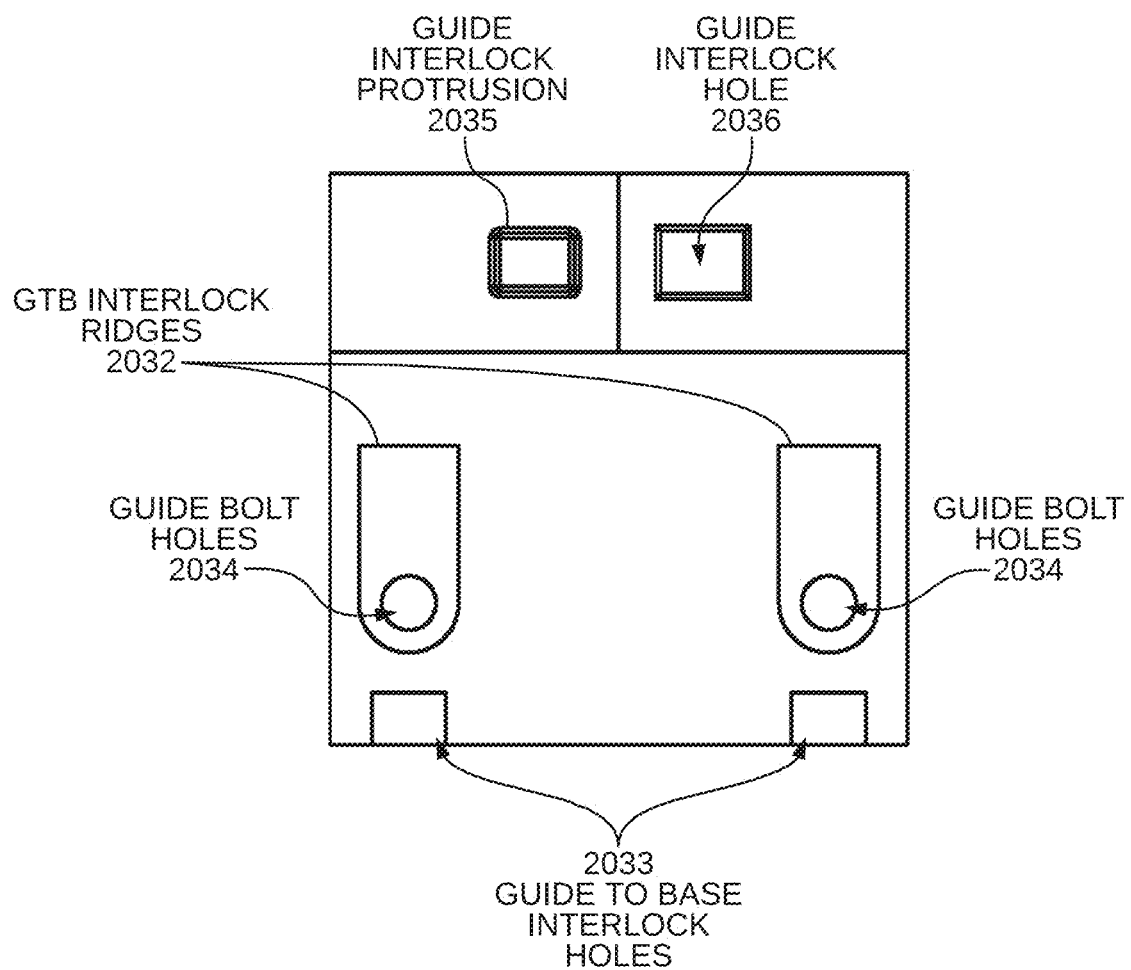
FIG. 31 is a side view of the cantilevered component, showing interlock holes and guide bolt holes.

FIG. 31 is a side view of a cantilevered component 2014. A pair of guide-to-base interlock holes 2033 are shown. A pair of guide-to-base interlock protrusions 2023 that extend from base 2012 align with the guide-to-base interlock holes 2033 to ensure that the guide assembly 2013 is aligned with the base 2012, and that fiber clamps 2017 are held at a consistent height above the fiber channels 2021.

A pair of guide bolt holes 2034 allow for bolts 2015 to extend through and connect base 2012 and both cantilevered components 2014. In some embodiments of a clamp assembly, no bolts 2015 are used. In such embodiments, no guide bolt holes 2034 will be present.

Figure 32:
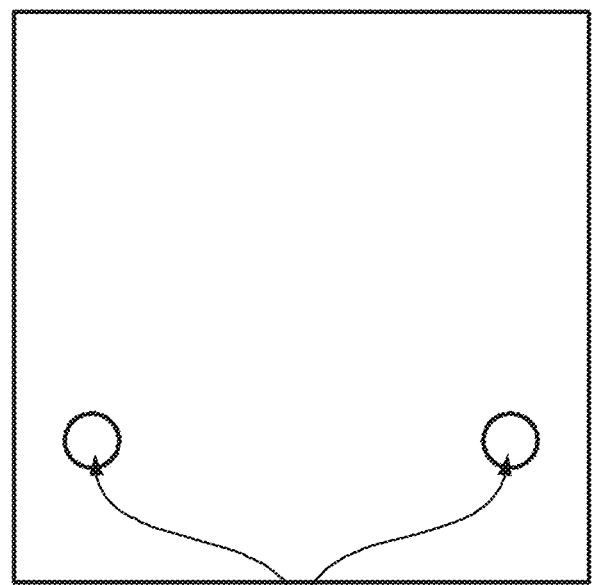
FIG. 32 is another side view of the cantilevered component, illustrating additional mounting features.

FIG. 32 is another side view of the cantilevered component 2014. Guide bolt holes 2034 are shown.

Figure 33:
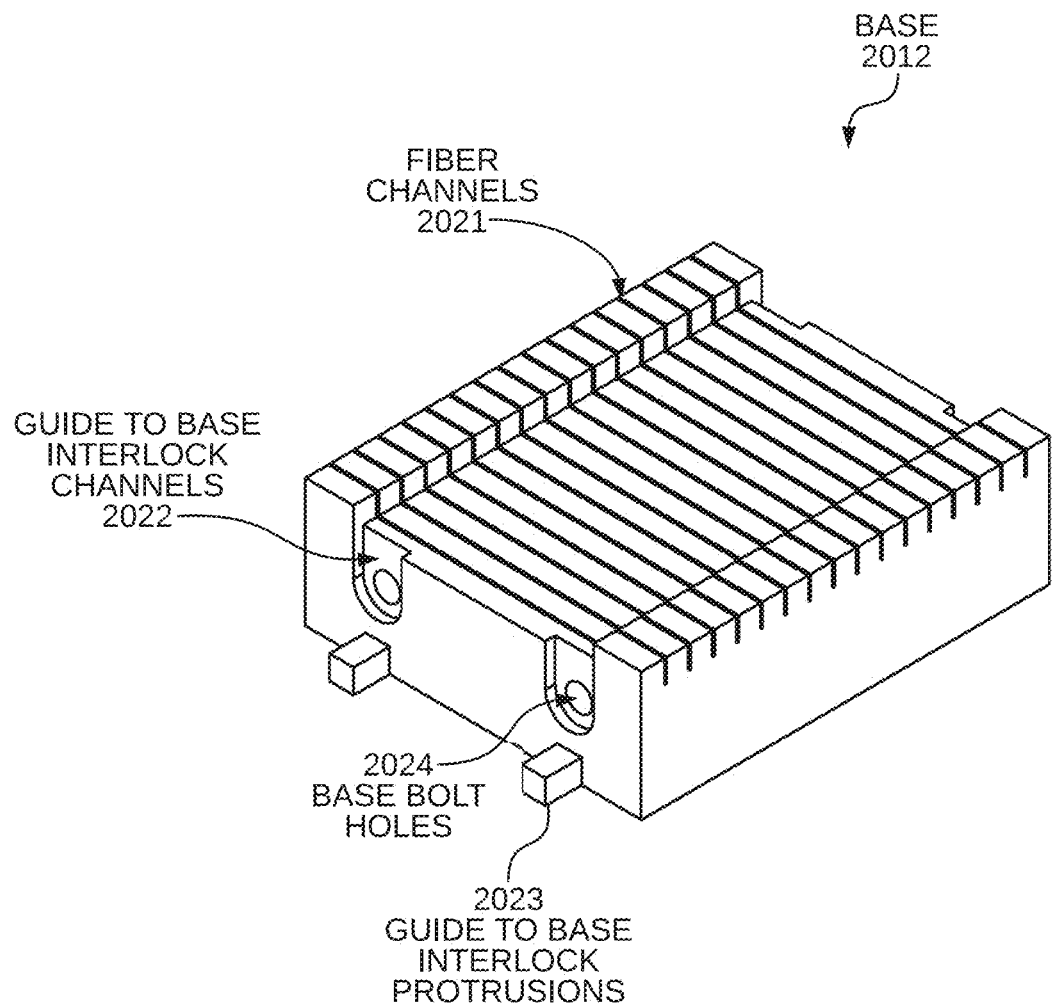
FIG. 33 is a perspective view of the base, showing fiber channels and interlock channels for attachment to the guide assembly.

FIG. 33 is a perspective view of the base 2012. The fiber channels 2021 run along the length of the base. In some embodiments, the profile of each fiber channel 2021 is a V-shape. In other embodiments, the profile is semi-circular. In yet other embodiments, the profile is any concave profile.

Guide-to-base interlock channels 2022 and guide-to-base interlock protrusions 2023 enable a guide assembly to be securely attached to the base 2012 by aligning with guide-to-base interlock holes 2033 on a guide assembly.

Figure 34:
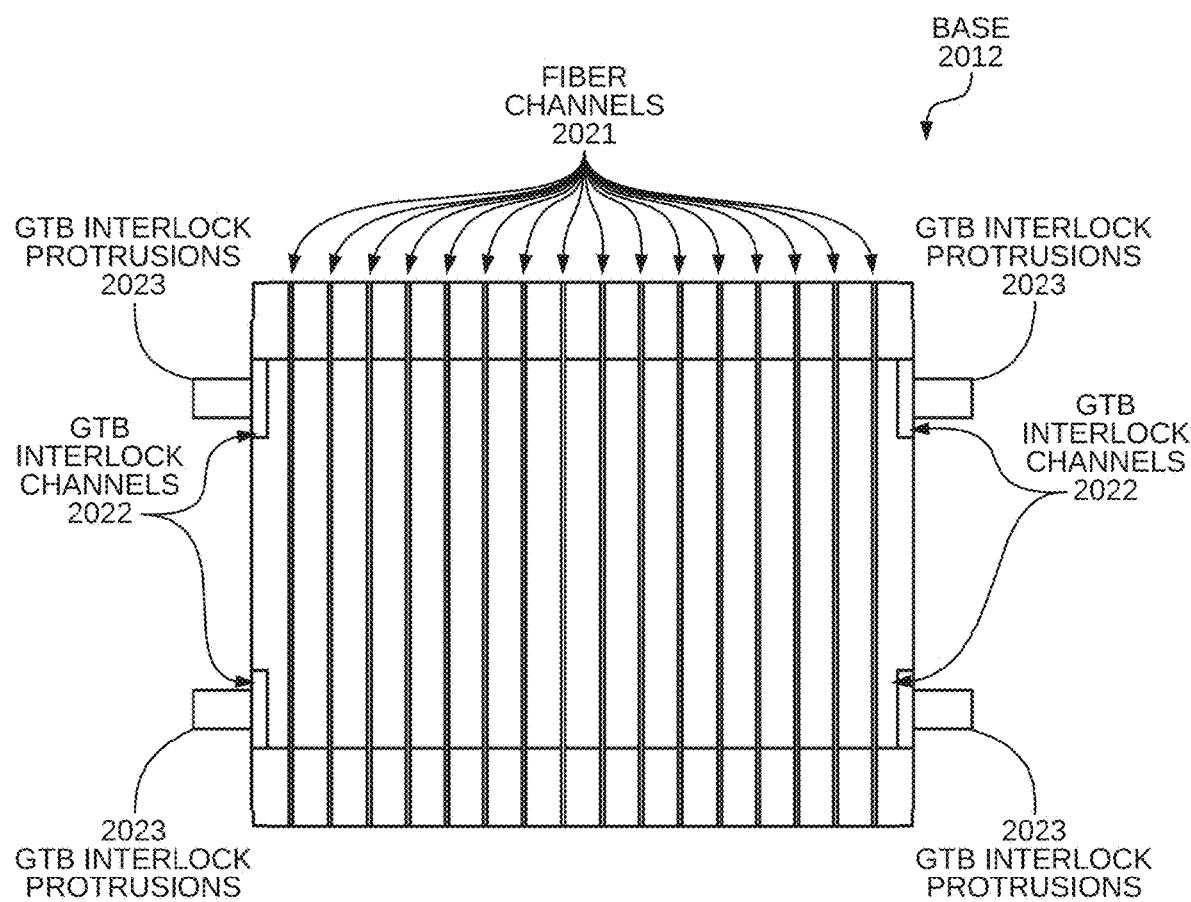
FIG. 34 is a top view of the base, illustrating the fiber channels and interlock protrusions.

FIG. 34 is a top view of the base 2012. The fiber channels 2021 and guide-to-base interlock channels 2022 align with the guide-to-base ridges present on a guide assembly.

Figure 35:
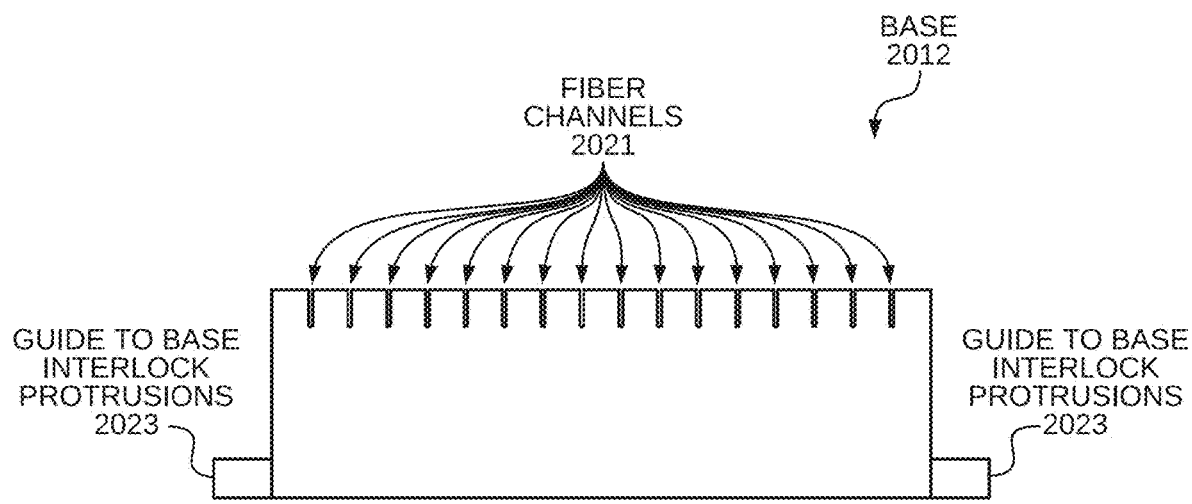
FIG. 35 is a front view of the base, showing the fiber channels and interlock mounting features.

FIG. 35 is a front view of the base 2012, showing the fiber channels 2021 and guide-to-base interlock protrusions 2023.

Figure 36:
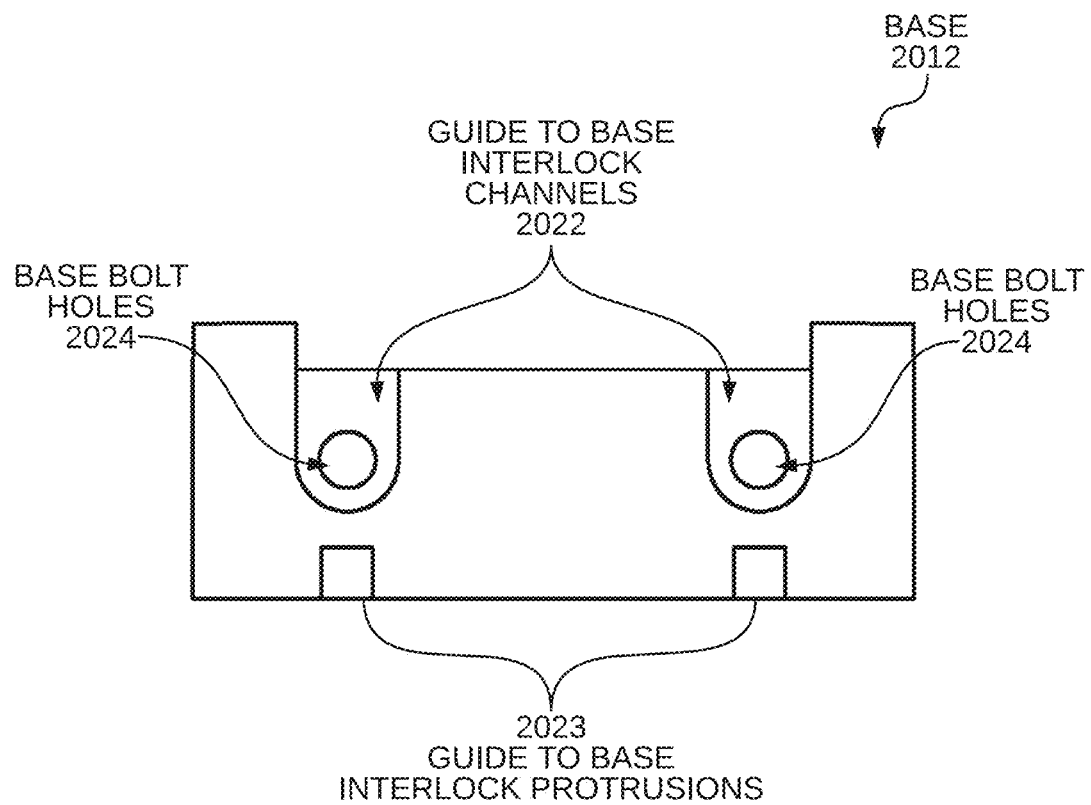
FIG. 36 is a side view of the base, highlighting the guide-to-base interlock protrusions and bolt holes.

FIG. 36 is a side view of the base 2012, highlighting the guide-to-base interlock protrusions 2023, guide-to-base interlock channels 2022, and base bolt holes 2024. Bolts 2015 connect the base 2021 to a guide assembly 2013 and extend through base bolt holes 2024.

Figure 37:
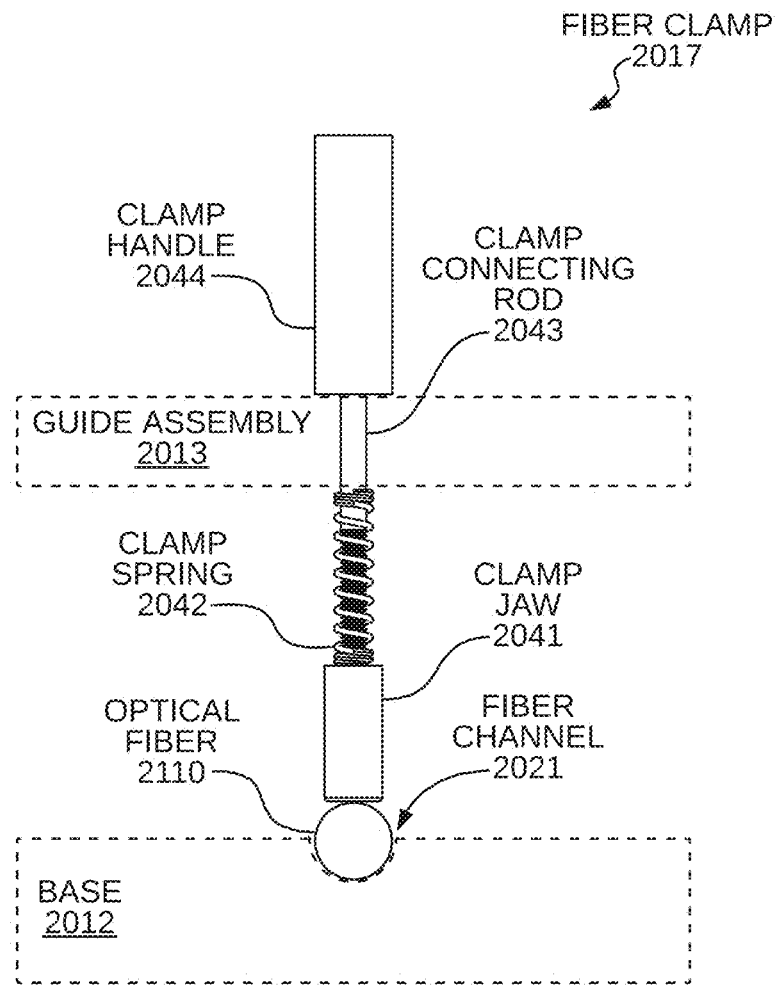
FIG. 37 is a perspective view of a fiber clamp, illustrating the clamp jaw, connecting rod, spring, and handle.

FIG. 37 is a diagram of a fiber clamp 2017 in operation. The fiber clamp includes a clamp jaw 2041, a clamp connecting rod 2043, a clamp spring 2042, and a clamp handle 2044. The clamp spring 2042 pushes the clamp jaw 2041 into an optical fiber 2110 by pressing against a guide assembly 2013. The clamp handle 2044 is connected to the clamp jaw 2041 via a clamp connecting rod 2043. The clamp handle 2044 allows the clamp jaw 2041 to be raised either manually or automatically, allowing for optical fiber 2110 to be inserted, rotated, or removed.

Figure 38:
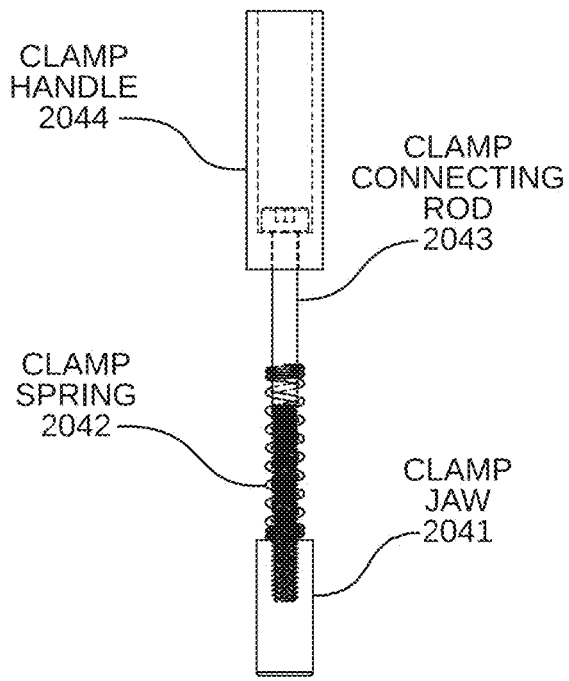
FIG. 38 is an X-ray view of the fiber clamp, showing internal components and their arrangement.
Figure 39:
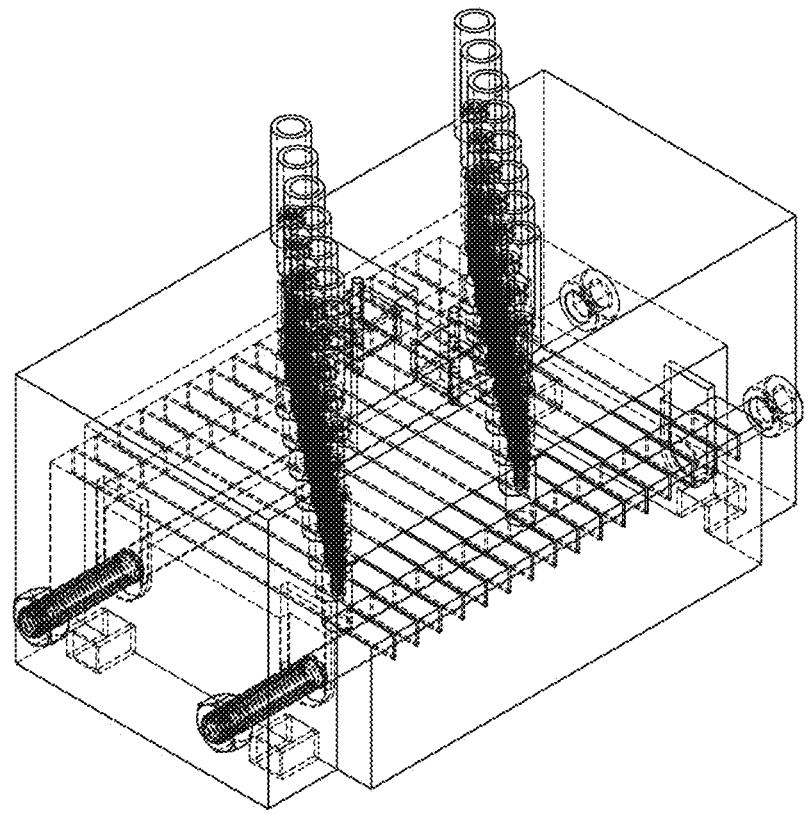
FIG. 39 is an X-ray view of the clamp assembly, illustrating the internal structure of the fiber clamps and guide assembly.
Figure 40:
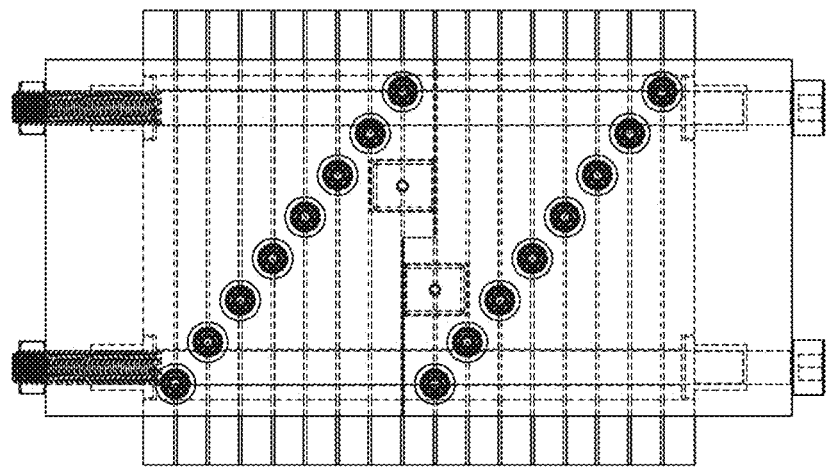
FIG. 40 is another X-ray view of the clamp assembly, showing fiber clamp engagement.
Figure 41:
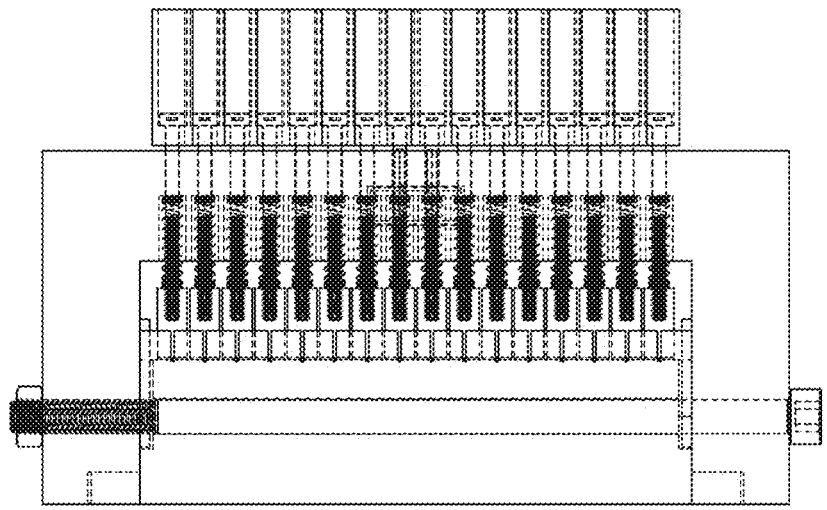
FIG. 41 is an additional X-ray view of the clamp assembly, revealing interlocking components.
Figure 42:
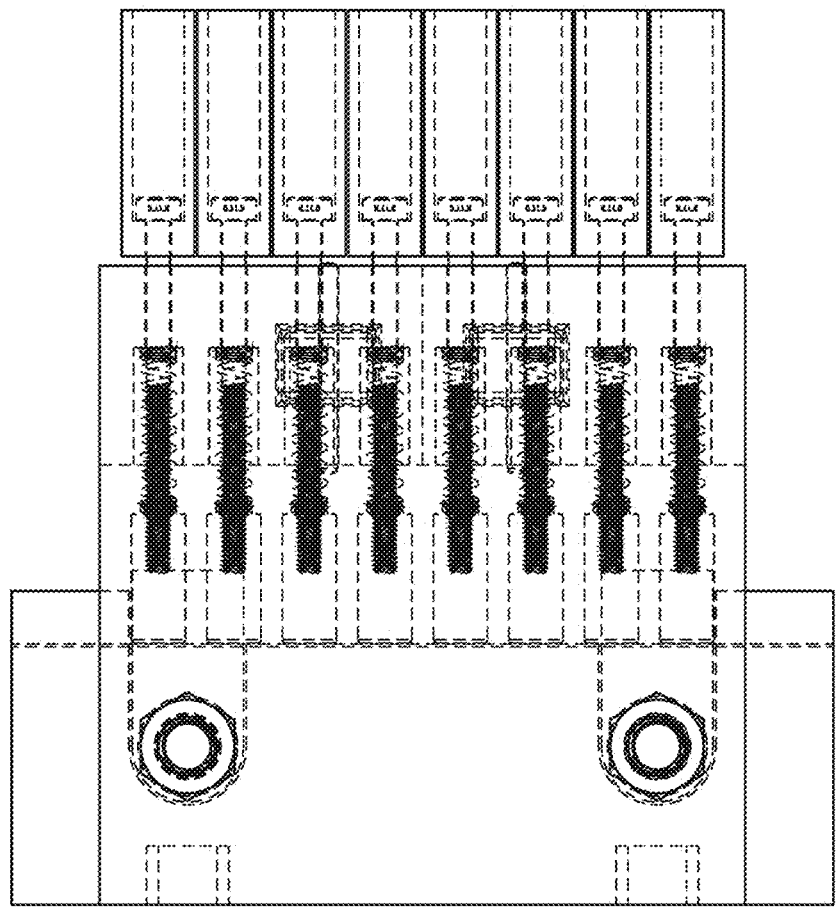
FIG. 42 is yet another X-ray view of the clamp assembly, providing a structural breakdown of the components.

FIG. 38 is an X-ray view of the fiber clamp 2017. The internal components, including the clamp jaw 2041, clamp connecting rod 2043, and clamp spring 2042, are shown.

FIGS. 39-42 are X-ray views of the clamp assembly 2011, revealing internal components and interlocking connections.

Figure 43:
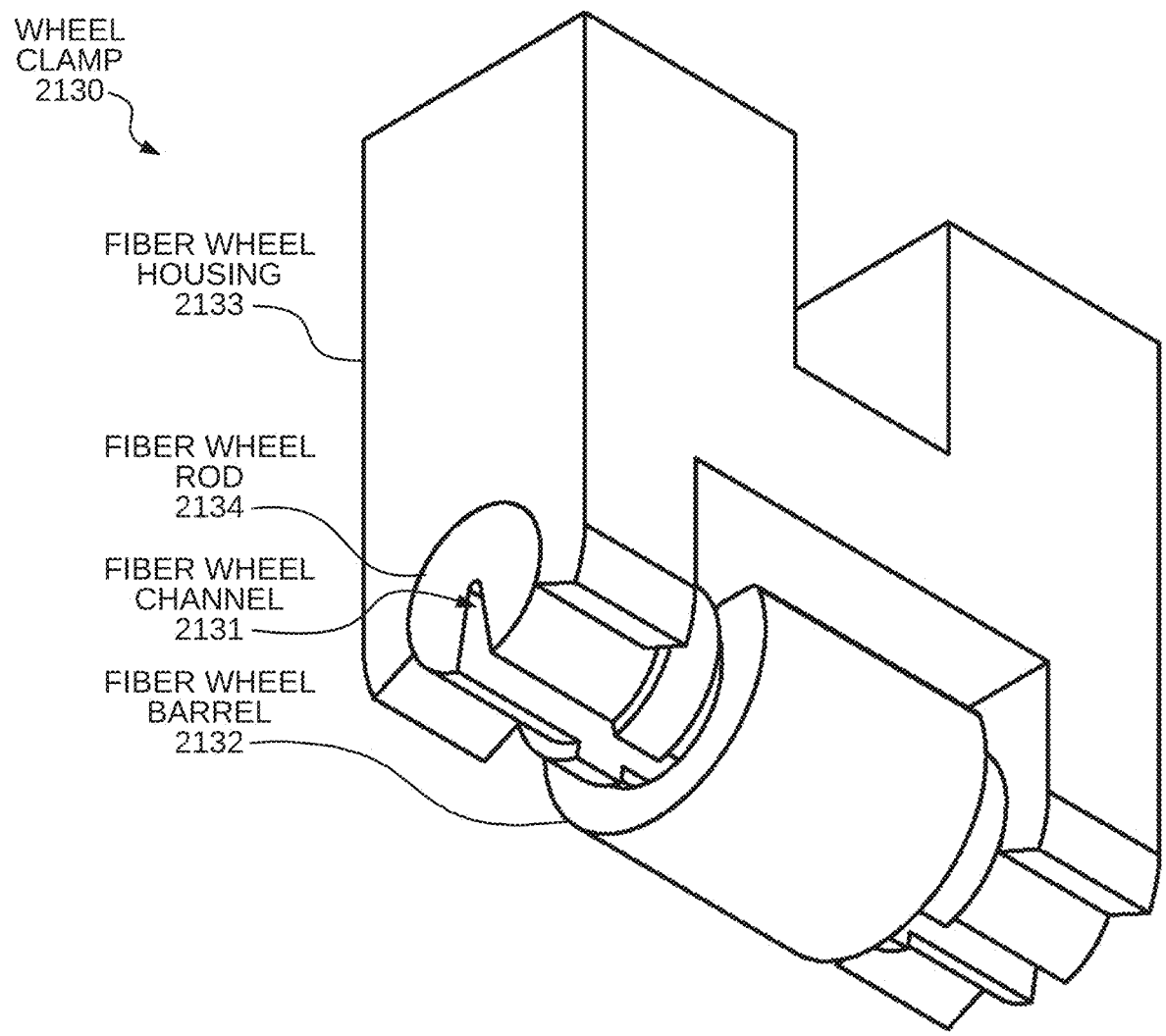
FIG. 43 is a perspective view of a wheel clamp, illustrating the fiber contact components.

FIG. 43 is a perspective view of a wheel clamp 2130. The wheel clamp 2130 is used to rotate individual optical fibers. The wheel clamp 2130 comprises a fiber wheel rod 2134, a fiber wheel barrel 2132, and a fiber wheel housing 2133. Fiber wheel rod 2134 is mounted within the fiber wheel housing 2133 such that fiber wheel rod 2134 can rotate. Fiber wheel rod 2134 comprises a fiber wheel channel 2131, which serves to hold an optical fiber within the wheel clamp 2130. Fiber wheel barrel 2132 is connected to the fiber wheel rod 2134 allowing fiber wheel rod 2134 to be rotated either manually or automatically. The rotation of the fiber wheel rod 2134 results in the rotation of the optical fiber held within the fiber wheel channel 2131. In some embodiments, fiber wheel barrel 2132 contacts a linear actuator such that linear motion from the linear actuator results in rotation of the fiber wheel barrel 2132, similarly to a rack-and-pinion system. In some embodiments, fiber wheel barrel 2132 can be coupled and decoupled from the fiber wheel rod 2134. In other embodiments, fiber wheel barrel 2132 is permanently coupled to fiber wheel rod 2134. In one embodiment where fiber wheel barrel 2132 contacts a linear actuator, the fiber wheel housing 2133 can be raised or lowered, decoupling or coupling the fiber wheel barrel 2132 to the linear actuator.

In some embodiments, the wheel clamp is fabricated using machining. In some such embodiments, the fiber wheel housing is machined from aluminum, while the fiber wheel rod is machined from polyetheretherketone (PEEK).

Figure 44:
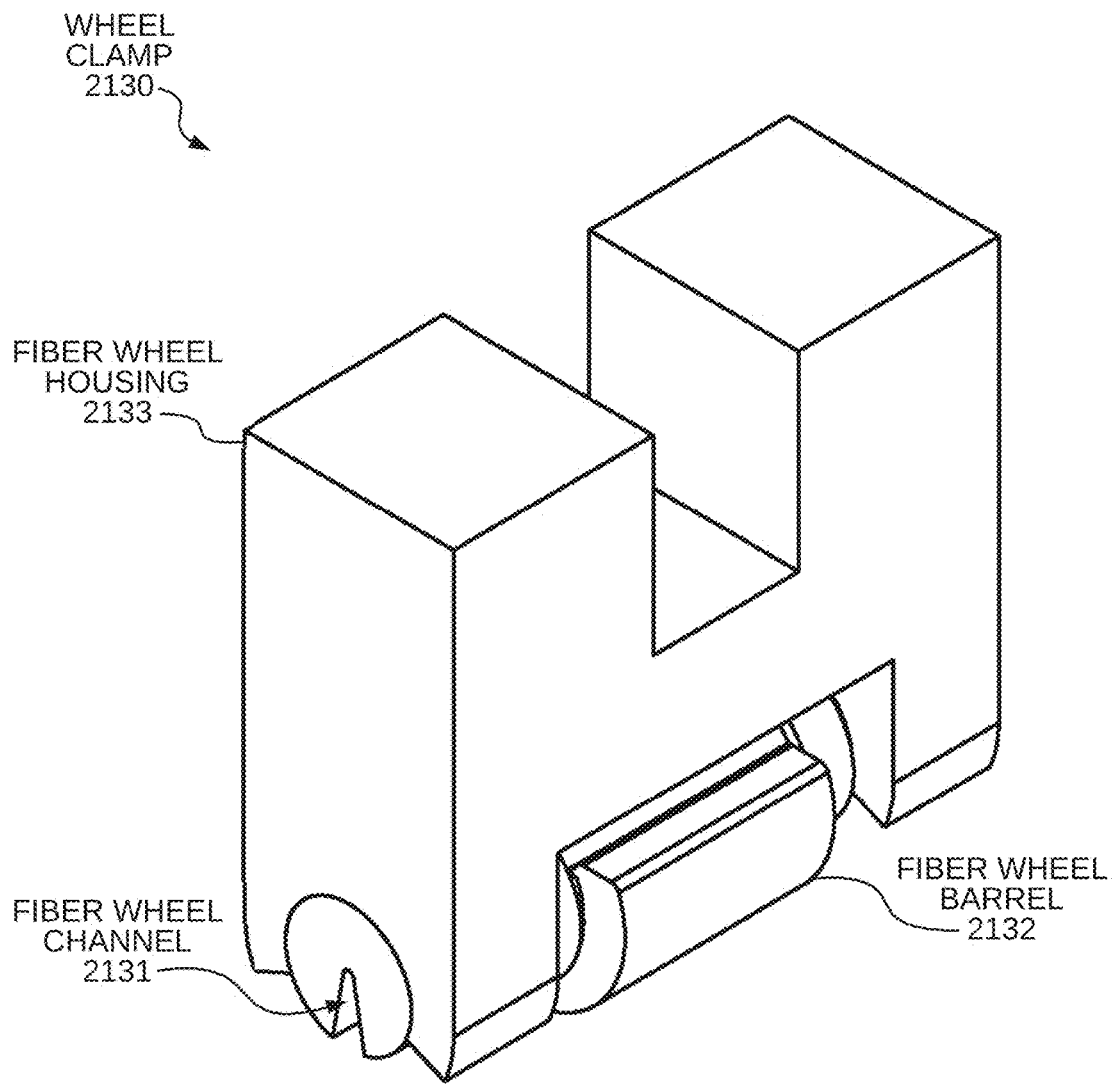
FIG. 44 is another perspective view of the wheel clamp, showing the alignment and rotation features.

FIG. 44 is another perspective view of the wheel clamp 2130, showing structural details.

Figure 45:
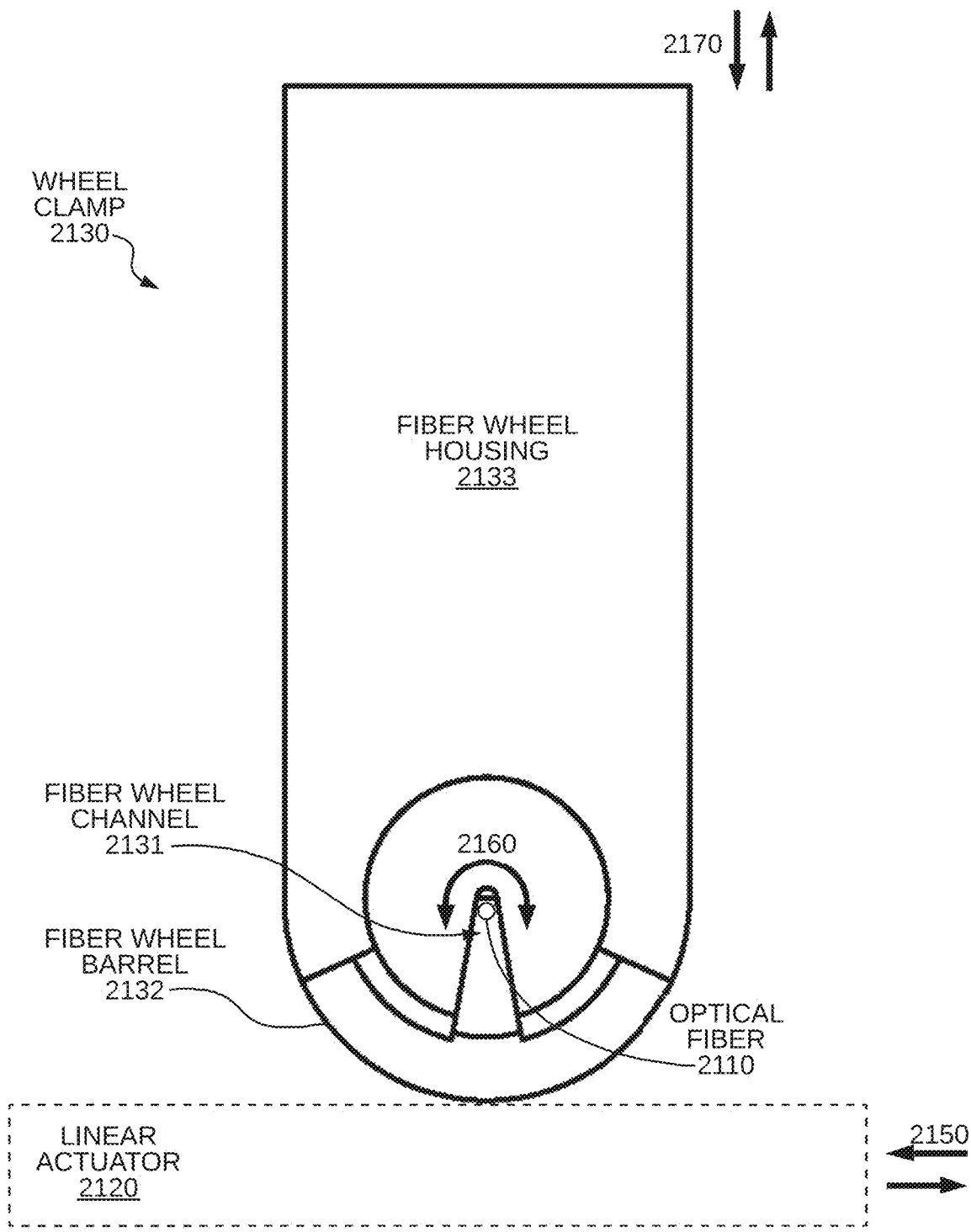
FIG. 45 is a front view of the wheel clamp, highlighting the wheel jaw and fiber channel rod.

FIG. 45 is a front view of an embodiment of a wheel clamp 2130 with a linear actuator 2120 in operation. Wheel clamp 2130 is able to be raised or lowered, as shown by vertical motion 2170. When lowered, a fiber wheel barrel 2132 contacts the surface of the linear actuator 2120. The linear movement 2150 of the linear actuator 2120 is converted to rotational motion 2160 of the fiber wheel channel. The surface of the linear actuator 2120 acts as a rack in a rack-and-pinion system, where the fiber wheel barrel 2132 acts as a pinion.

In a fiber rotator system, a plurality of wheel clamps are lowered to contact a linear actuator. As the linear actuator moves, the fiber wheel barrels within the plurality of wheel clamps rotate. This rotation is transferred to the optical fibers contained within the wheel clamps. When a fiber detection and alignment system detects that an optical fiber has been aligned, the corresponding wheel clamp housing is raised. This decouples the fiber wheel barrel from the linear actuator, maintaining the orientation of the optical fiber as it was when the fiber was determined to be aligned. A base clamp can additionally be engaged, further preserving the orientation of the optical fiber. The linear actuator continues to move until all optical fibers are determined to be aligned.

Figure 46:
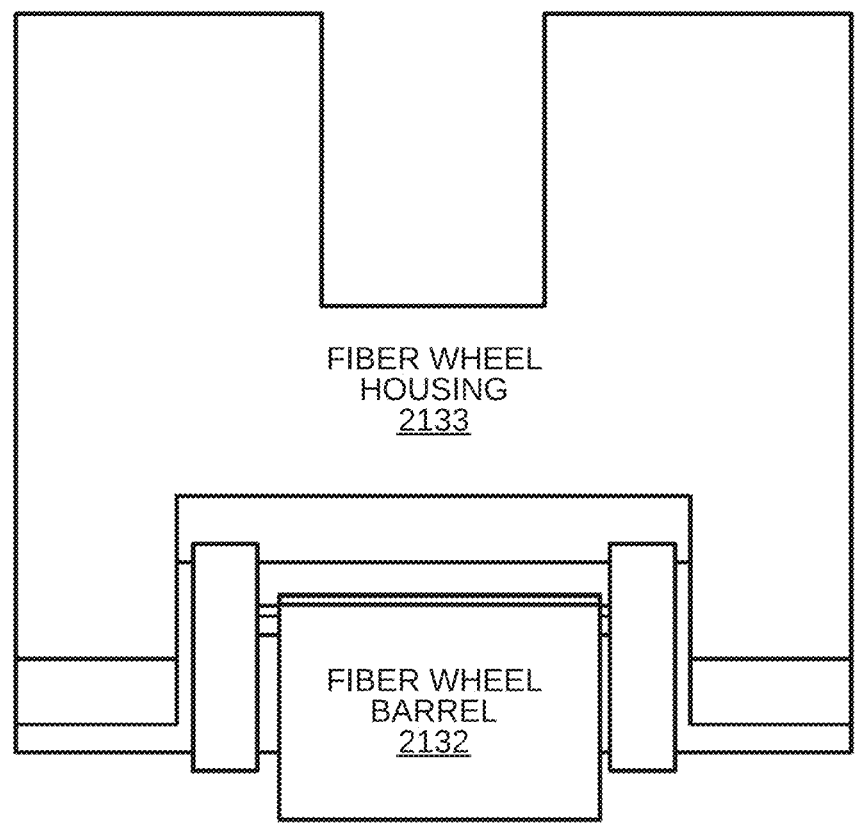
FIG. 46 is a side view of the wheel clamp, showing the interaction between the fiber guide and actuator.

FIG. 46 is a side view of the wheel clamp 2130.

Figure 47:
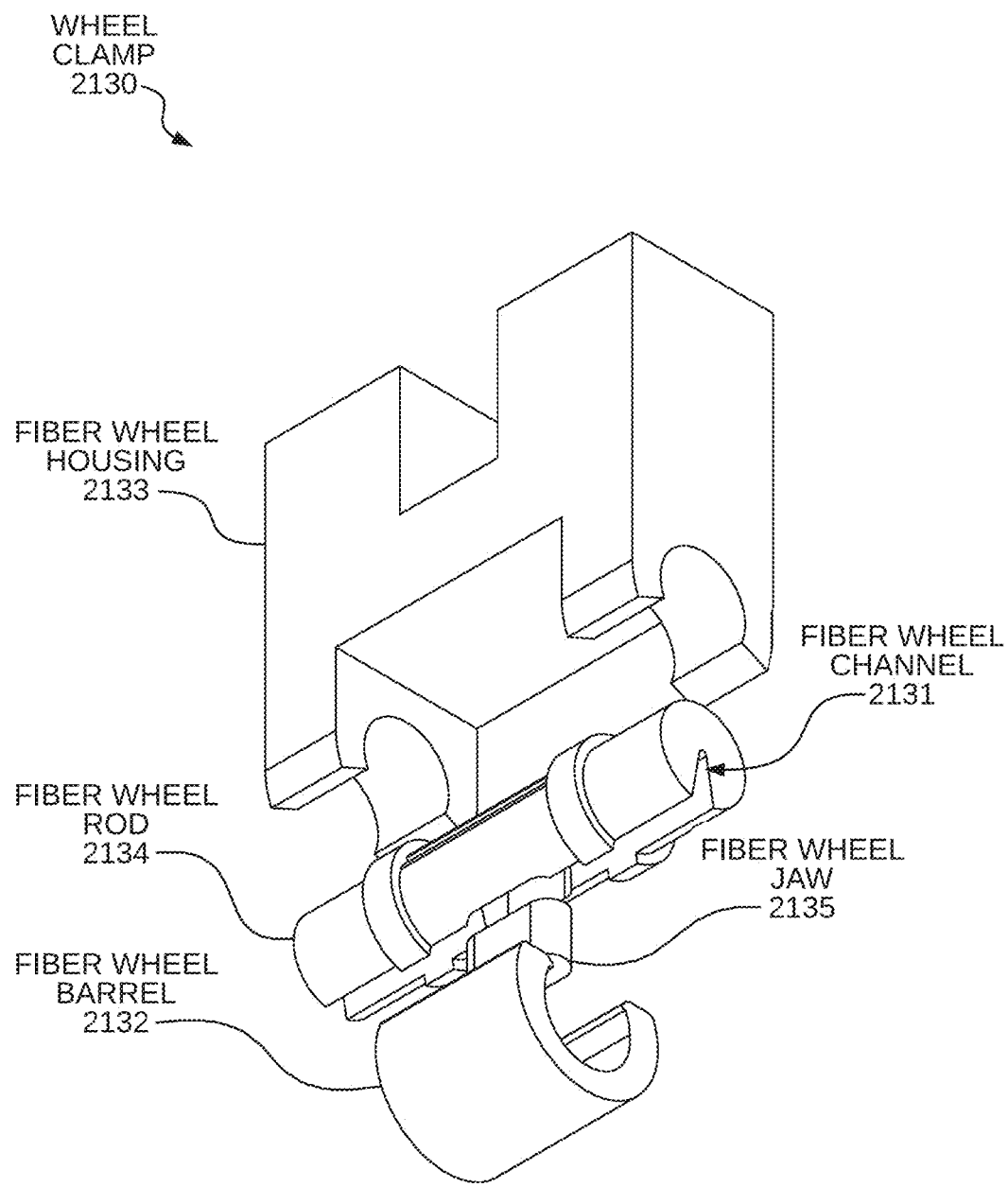
FIG. 47 is an exploded view of the wheel clamp, detailing the linear actuator contactor, wheel jaw, fiber channel rod, and wheel guide.

FIG. 47 is an exploded view of the wheel clamp 2130. The wheel clamp includes a fiber wheel rod 2134, a fiber wheel housing 2133, and a fiber wheel barrel 2132. In some embodiments, wheel clamp 2130 further comprises a fiber wheel jaw 2135. Fiber wheel jaw 2135 acts to maintain the orientation of an optical fiber within fiber wheel channel 2131 relative to the fiber wheel rod 2134.

Figure 48:
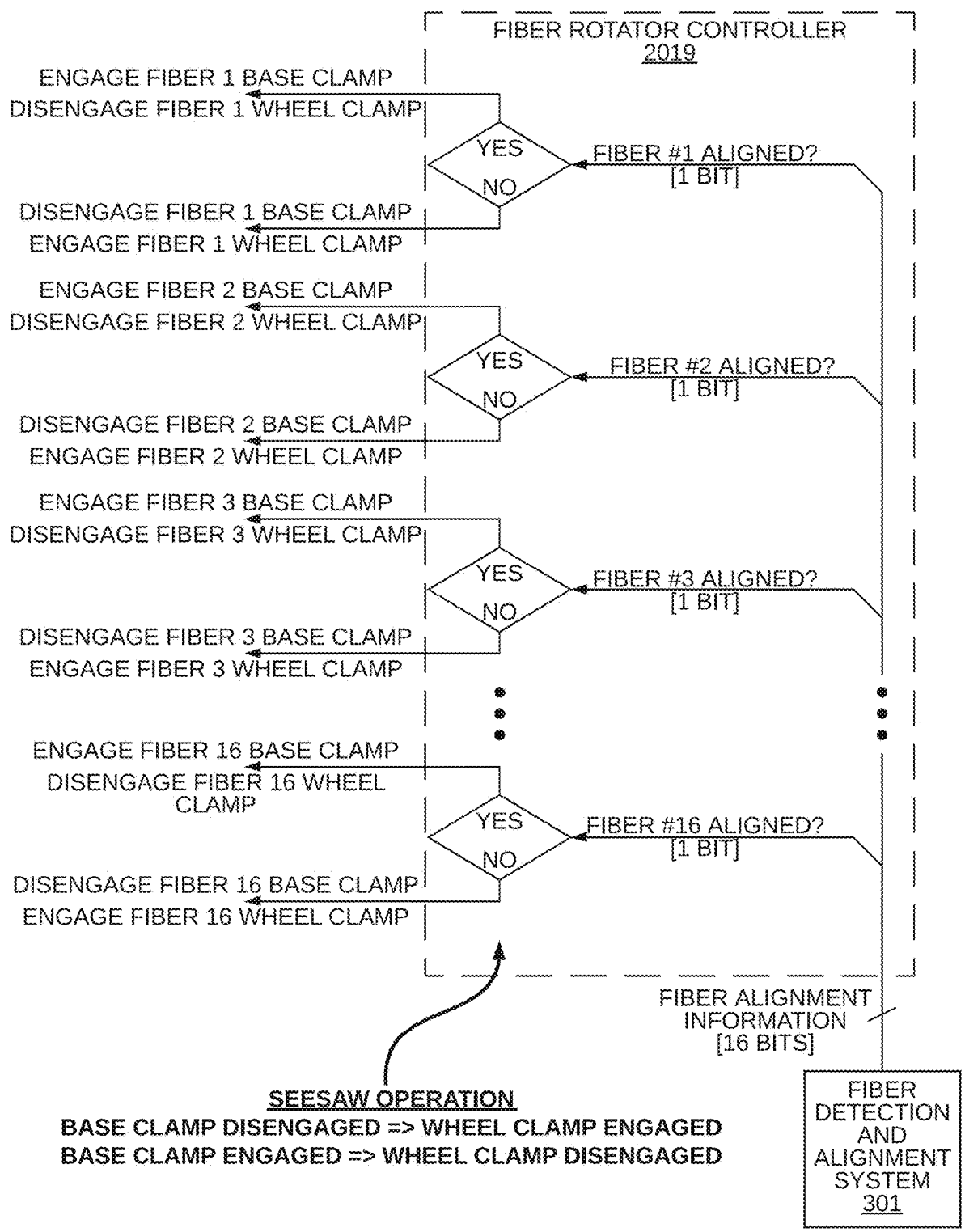
FIG. 48 is a detailed diagram of the fiber rotator controller, showing how it receives alignment information from the fiber detection and alignment system and controls the engagement of fiber clamps and wheel clamps.

FIG. 48 is a detailed diagram of the fiber rotator controller 2019 in accordance with one embodiment. The fiber rotator controller 2019 receives fiber alignment information from the fiber detection and alignment system 301. The fiber detection and alignment system 301 analyzes image data obtained from fiber end faces to determine whether each fiber is aligned. The fiber alignment information is transmitted as a multi-bit signal, with each bit corresponding to the alignment status of an individual fiber.

For each fiber, the fiber rotator controller 2019 performs control operations based on its alignment status. If a fiber is detected as aligned, the fiber rotator controller 2019 sends a command to the corresponding fiber base clamp to engage, securing the fiber to the base of the clamp assembly. Simultaneously, the fiber rotator controller 2019 sends a command to the corresponding wheel clamp to disengage, preventing further rotation of the aligned fiber.

If a fiber is not yet aligned, the fiber rotator controller 2019 maintains the fiber base clamp in a disengaged state, allowing free rotation. The fiber rotator controller 2019 ensures that the corresponding wheel clamp remains engaged so that the fiber continues to rotate as the linear actuator moves.

The fiber rotator controller 2019 operates in a seesaw fashion, where each fiber is either clamped to the base or engaged with the wheel clamp, but not both simultaneously. This iterative process continues until all fibers are aligned. Once alignment is achieved for all fibers, the fiber rotator controller 2019 can trigger an alert to notify a user or transition the system to a final secured state.

Figure 49:
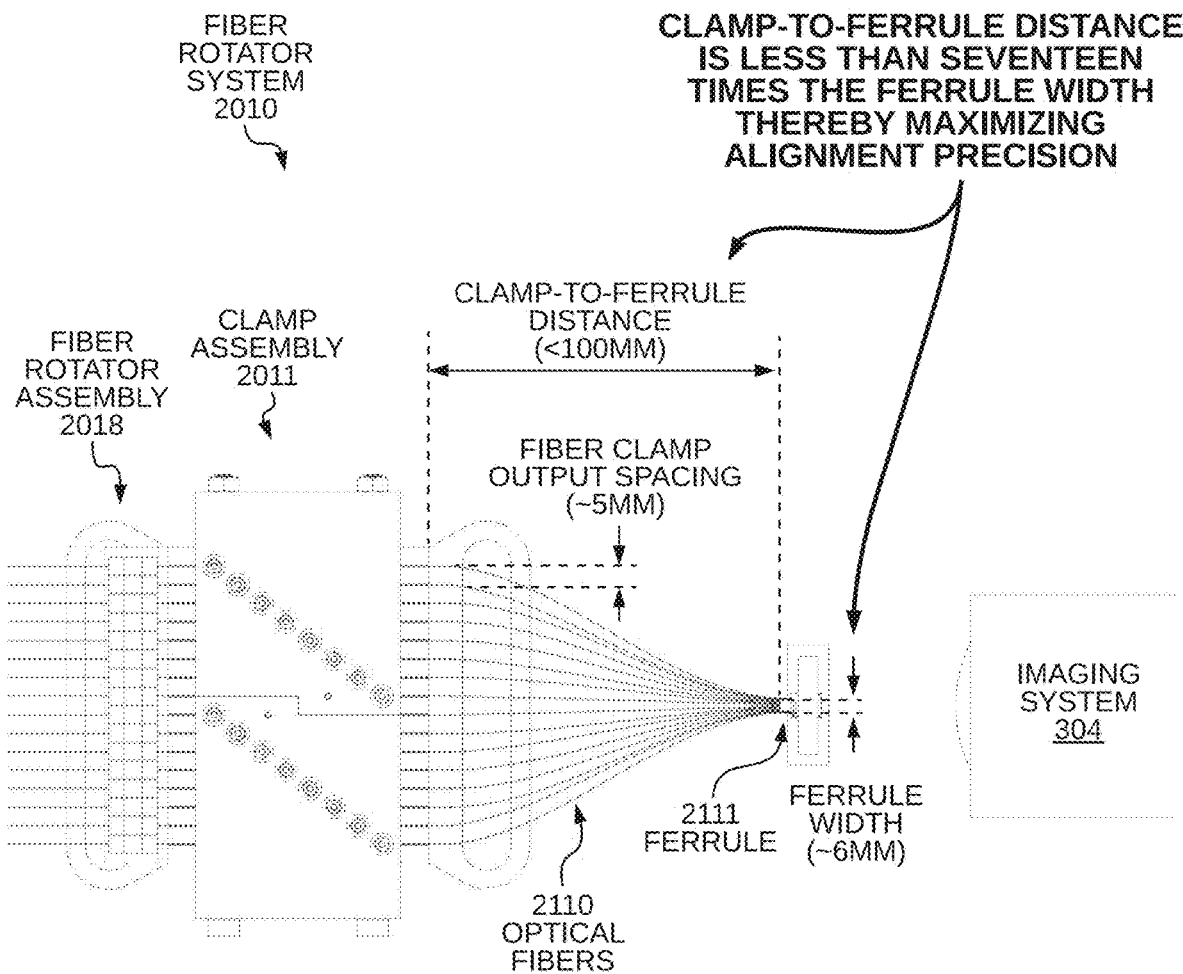
FIG. 49 is a diagram of a top view of the fiber rotator system.

FIG. 49 is a diagram of a top view of the fiber rotator system 2010. The optical fibers terminate at a ferrule 2111, where an imaging system 304 can observe stress rods within each optical fiber. In one embodiment of a fiber rotator system, a clamp-to-ferrule distance is less than seventeen times a ferrule width thereby maximizing alignment precision. In various embodiments, the distance between the clamp assembly 2011 and the ferrule 2111 is less than or equal to twenty times the distance between each fiber at the point where the fibers are clamped to the base. This prevents undesirable rotation of the optical fibers 2110 within the ferrule 2111 while the fibers are clamped inside the clamp assembly 2011.

Figure 50:
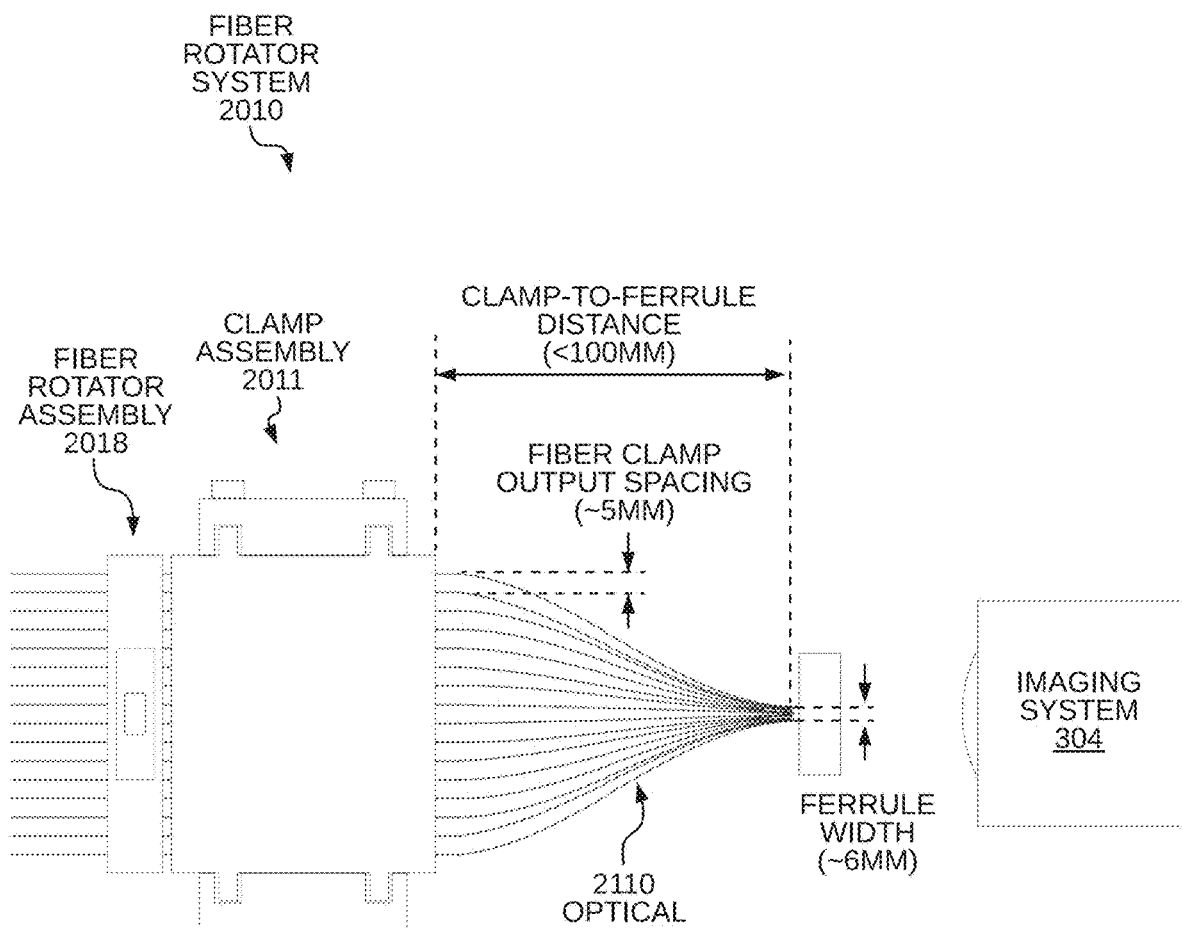
FIG. 50 is a diagram of a bottom view of the fiber rotator system.

FIG. 50 is a diagram of a bottom view of the fiber rotator system 2010.

Figure 51:
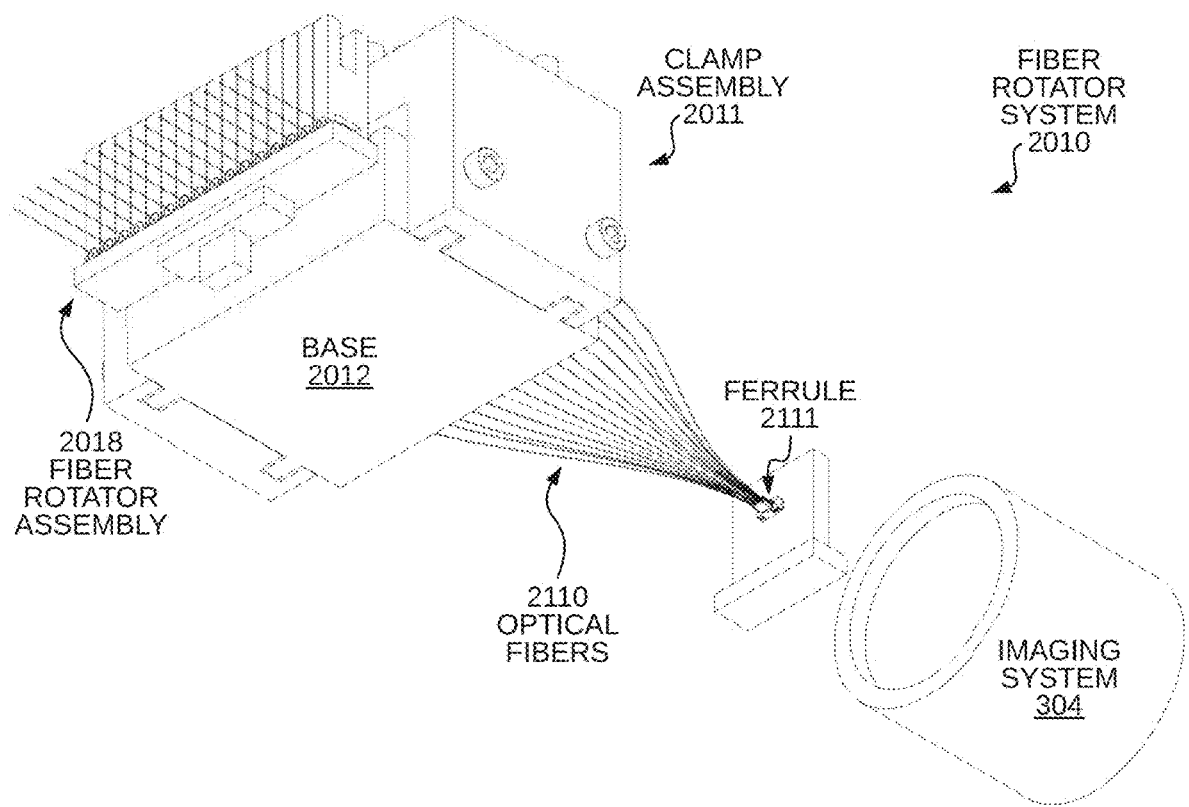
FIG. 51 is a diagram of a bottom perspective view of the fiber rotator system.

FIG. 51 is a diagram of bottom perspective view of the fiber rotator system 2010.

Figure 52:
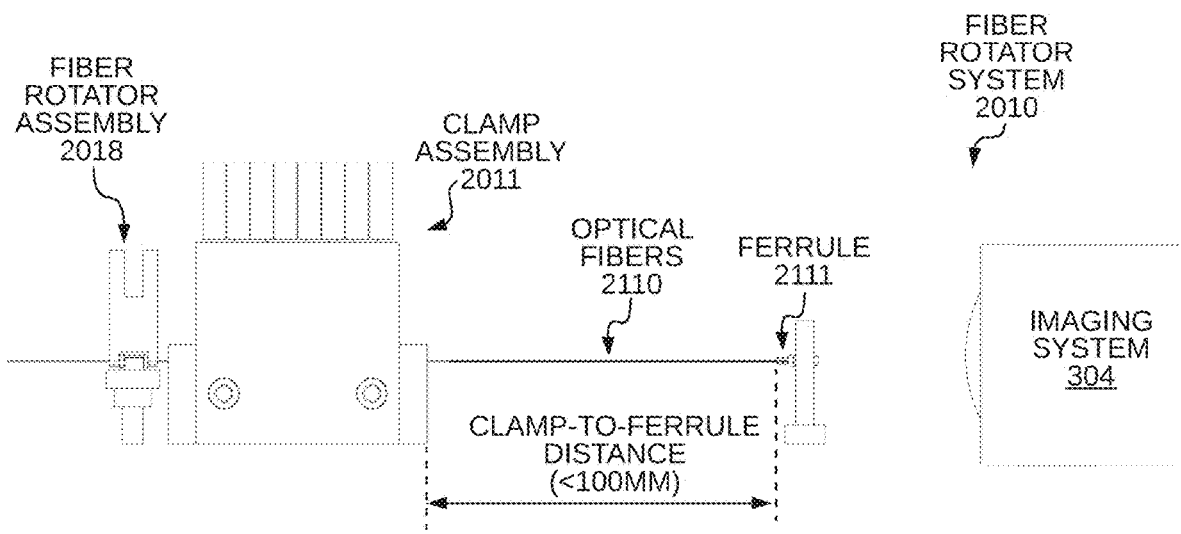
FIG. 52 is a diagram of a side view of the fiber rotator system.

FIG. 52 is a diagram of side view of the fiber rotator system 2010.

Accordingly, various modifications, adaptations, and combinations of various features of the described embodiments can be practiced without departing from the scope of the invention as set forth in the claims.

What is claimed is:

1. A fiber rotator system comprising:
   a clamp assembly having a plurality of fiber channels, wherein the clamp assembly includes a base, a plurality of fiber clamps, and a guide assembly, and wherein the guide assembly is disposed above the base;
   a fiber rotator assembly having a plurality of fiber wheel channels, wherein the fiber rotator assembly includes a linear actuator and a plurality of wheel clamps, and wherein each wheel clamp is disposed above the linear actuator; and
   a fiber rotator controller, wherein the fiber rotator controller is configured to receive fiber alignment information from a fiber detection and alignment system, wherein the fiber detection and alignment system includes an image sensor configured to obtain image data of fiber end faces, and wherein the fiber detection and alignment system predicts whether fiber is aligned based on the image data using one or more neural networks.

2. The fiber rotator system of claim 1, wherein each fiber wheel channel aligns with a respective fiber base channel.

3. The fiber rotator system of claim 1, wherein each of the fiber clamps is selectively engageable to clamp fiber against the base of the clamp assembly.

4. The fiber rotator system of claim 1, wherein each of the wheel clamps is selectively engageable such that as a clamped wheel clamp rotates, a fiber within the clamped wheel clamp also rotates and such that as an unclamped wheel clamp rotates, a fiber within the unclamped wheel clamp does not rotate.

5. The fiber rotator system of claim 1, wherein each of the wheel clamps is selectively engageable such that as a clamped wheel clamp rotates, a fiber within the clamped wheel clamp also rotates and such that as an unclamped wheel clamp does not rotate.

6. The fiber rotator system of claim 1, wherein the guide assembly comprises two interlocking cantilevered components.

7. The fiber rotator system of claim 1, wherein the guide assembly connects to the base via one or more interlocking connections.

8. The fiber rotator system of claim 1, wherein the fiber rotator system is configured to rotate multiple Polarization Maintaining (PM) fibers simultaneously thereby forming a PM ribbon, and wherein the base is configured to attach to an optical breadboard.

9. The fiber rotator system of claim 1, wherein each fiber clamp comprises:
 a jaw;
 a connecting rod;
 a spring; and
 a handle.

10. The fiber rotator system of claim 1, wherein each wheel clamp comprises:
 a linear actuator contactor;
 a wheel jaw;
 a fiber channel rod; and
 a wheel guide.

11. The fiber rotator system of claim 1, wherein the fiber rotator controller is also configured to control the linear actuator to extend and retract, wherein the fiber rotator controller is also configured to selectively engage and disengage the fiber clamps and wheel clamps based on the fiber alignment information received from the fiber detection and alignment system.

12. A method comprising:
 placing a plurality of polarization maintaining (PM) fibers of a multi-fiber optical fiber cable into a plurality of fiber channels of a clamp assembly, the clamp assembly comprising a base, a plurality of fiber clamps, and a guide assembly a channel of a base of a clamp assembly;
 placing the plurality of stripped ends of PM fibers of the multi-fiber optical fiber cable into a plurality of wheel clamps of a fiber rotator assembly, each wheel clamp having a fiber wheel channel aligned with the corresponding fiber channel of the clamp assembly;
 rotating the plurality of wheel clamps using a linear actuator;
 detecting fiber alignment using a fiber detection and alignment system, wherein the fiber detection and alignment system includes an image sensor configured to obtain image data of fiber end faces; wherein the fiber detection and alignment system predicts whether fiber is aligned based on the image data using one or more neural networks;
 transmitting fiber alignment information from the fiber detection and alignment system to a fiber rotator controller;
 determining, by the fiber rotator controller, whether any PM fibers are newly aligned;
 clamping any newly aligned PM fibers to the base of the clamp assembly;
 disengaging the wheel clamps of any newly aligned fibers; and
 determining whether all of the PM fibers are aligned.

13. The method of claim 12, wherein the fiber detection and alignment system utilize a machine learning system to detect PM fiber alignment, and wherein a clamp-to-ferrule distance is less than seventeen times a ferrule width.

14. The method of claim 12, further comprising:
 alerting a user when all of the PM fibers are aligned.

15. The method of claim 12, wherein the linear actuator is used to rotate the plurality of wheel clamps such that the wheel clamps include contact portions that contact and rotate along with the linear actuator.

16. The method of claim 12, wherein the clamp assembly and wheel clamps operate in a seesaw fashion such that when a PM fiber is clamped to the base, then a respective wheel clamp is disengaged, and when the PM fiber is unclamped from the base, then the respective wheel clamp is engaged.

17. The method of claim 12, further comprising:
 assembling a guide assembly by attaching cantilevered components together.

18. The method of claim 17, further comprising:
 attaching the guide assembly over the base via one or more interlocking connections.

19. A system comprising:
an optical fiber cable, wherein the optical fiber cable comprises multiple optical fibers;
a clamp assembly comprising a base and a plurality of fiber clamps;
a fiber rotator assembly comprising a linear actuator and a plurality of wheel clamps;
a fiber detection and alignment system comprising an image sensor and a neural network configured to predict fiber alignment based on image data;
a fiber rotator controller configured to receive fiber alignment information from the fiber detection and alignment system; and
means for individually clamping optical fibers to selectively prevent or promote rotation of each optical fiber.

* * * * *